(12) United States Patent
Roy

(10) Patent No.: US 11,926,344 B1
(45) Date of Patent: Mar. 12, 2024

(54) AUTONOMOUS VEHICLE HAVING LIGHT PROJECTOR FOR ILLUMINATING GROUND UNDER PEDESTRIANS AND CYCLISTS

(71) Applicant: Matthew MacGregor Roy, Ottawa (CA)

(72) Inventor: Matthew MacGregor Roy, Ottawa (CA)

(*) Notice: Subject to any disclaimer, the term of this patent is extended or adjusted under 35 U.S.C. 154(b) by 569 days.

(21) Appl. No.: 17/228,536

(22) Filed: Apr. 12, 2021

Related U.S. Application Data

(60) Provisional application No. 63/019,404, filed on May 3, 2020.

(51) Int. Cl.
| | |
|---|---|
| *B60W 60/00* | (2020.01) |
| *G06V 20/56* | (2022.01) |
| *G08G 1/01* | (2006.01) |
| *G08G 1/04* | (2006.01) |

(52) U.S. Cl.
CPC ......... *B60W 60/0017* (2020.02); *G06V 20/56* (2022.01); *G08G 1/0145* (2013.01); *G08G 1/04* (2013.01); *B60W 2554/4044* (2020.02)

(58) Field of Classification Search
None
See application file for complete search history.

(56) References Cited

U.S. PATENT DOCUMENTS

| | | | | |
|---|---|---|---|---|
| 2019/0197882 A1* | 6/2019 | Camras | ................ | H05B 47/115 |
| 2019/0202336 A1* | 7/2019 | Kumar | .................... | H05B 47/12 |
| 2019/0259284 A1* | 8/2019 | Khadloya | .............. | G06V 10/25 |
| 2020/0135023 A1* | 4/2020 | Wang | ..................... | B60Q 5/005 |
| 2020/0375006 A1* | 11/2020 | Erickson | .............. | B60Q 1/0035 |

* cited by examiner

*Primary Examiner* — James J Lee
*Assistant Examiner* — Wenyuan Yang

(57) ABSTRACT

An autonomous vehicle includes a sensor detecting an object in a vicinity of the autonomous vehicle, a processor coupled to the sensor to receive sensor data from the sensor, wherein the processor is configured to process the sensor data to recognize that the object is a pedestrian or cyclist. The processor cooperates with the sensor to track the pedestrian or cyclist. The processor determines if the pedestrian or cyclist satisfies a notification criterion and, upon determining that the pedestrian or cyclist satisfies the notification criterion, the processor outputs an illumination signal. A light projector receives the illumination signal and projects a beam of light onto a portion of a road on which the pedestrian or cyclist is currently situated to visually notify the pedestrian or cyclist that the autonomous vehicle is presently tracking the pedestrian or cyclist.

20 Claims, 56 Drawing Sheets

AUTONOMOUS VEHICLE HAVING LIGHT PROJECTOR FOR ILLUMINATING GROUND UNDER PEDESTRIANS AND CYCLISTS

CROSS-REFERENCE TO RELATED APPLICATIONS

This application claims priority from U.S. Provisional Patent Application 63/019,404 entitled "AUTONOMOUS VEHICLE HAVING LIGHT PROJECTOR FOR ILLUMINATING GROUND UNDER PEDESTRIANS AND CYCLISTS" filed May 3, 2020.

TECHNICAL FIELD

The present invention relates generally to autonomous vehicles and, in particular, to techniques for autonomous vehicles to interact with pedestrians and cyclists.

BACKGROUND

Autonomous vehicles employ sophisticated sensors and algorithms to track and avoid pedestrians and cyclists and to obey the rules of the road. Absent visual cues or notifications, pedestrians and cyclists may not be able to tell whether an autonomous vehicle approaching them is actually aware of their presence. Faced with such uncertainty, pedestrians and cyclists may be uncomfortable interacting with autonomous vehicles and may become overly cautious, leading to slower and more inefficient traffic flow.

Accordingly, it is highly desirable to provide a new technology to signify to pedestrians and cyclists that the autonomous vehicle is aware of their presence.

SUMMARY

In general, embodiments of the present invention provide an autonomous vehicle that illuminates the road surface or ground under or near a pedestrian or cyclist using a light projector such as a laser to indicate to the pedestrian or cyclist that the autonomous vehicle is aware of the presence of the pedestrian or cyclist. The illumination is meant to reassure the pedestrian or cyclist that the autonomous vehicle is tracking the pedestrian or cyclist.

An aspect of the disclosure is an autonomous vehicle having a chassis, a plurality of wheels rotationally mounted to the chassis, a body supported by the chassis and a sensor supported by the body, the sensor detecting an object in a vicinity of the autonomous vehicle, the sensor generating sensor data for the object. The autonomous vehicle includes a processor communicatively coupled to the sensor to receive the sensor data from the sensor. The processor is configured to process the sensor data to recognize that the object is a pedestrian or cyclist. The processor is configured to cooperate with the sensor to track the pedestrian or cyclist. The processor is further configured to determine if a road surface beneath the pedestrian or cyclist is to be illuminated and, upon determining that the road surface beneath the pedestrian or cyclist is to be illuminated, to output an illumination signal. The autonomous vehicle further includes a light projector supported by the body and coupled to the processor to receive the illumination signal, wherein the light projector, in response to receiving the illumination signal, projects a beam of light onto the road surface beneath the pedestrian or cyclist to visually notify the pedestrian or cyclist that the autonomous vehicle is presently tracking the pedestrian or cyclist.

The foregoing presents a simplified summary of the invention in order to provide a basic understanding of some aspects of the invention. This summary is not an exhaustive overview of the invention. It is not intended to identify essential, key or critical elements of the invention or to delineate the scope of the invention. Its sole purpose is to present some concepts in a simplified form as a prelude to the more detailed description that is discussed later. Other aspects of the invention are described below in relation to the accompanying drawings.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
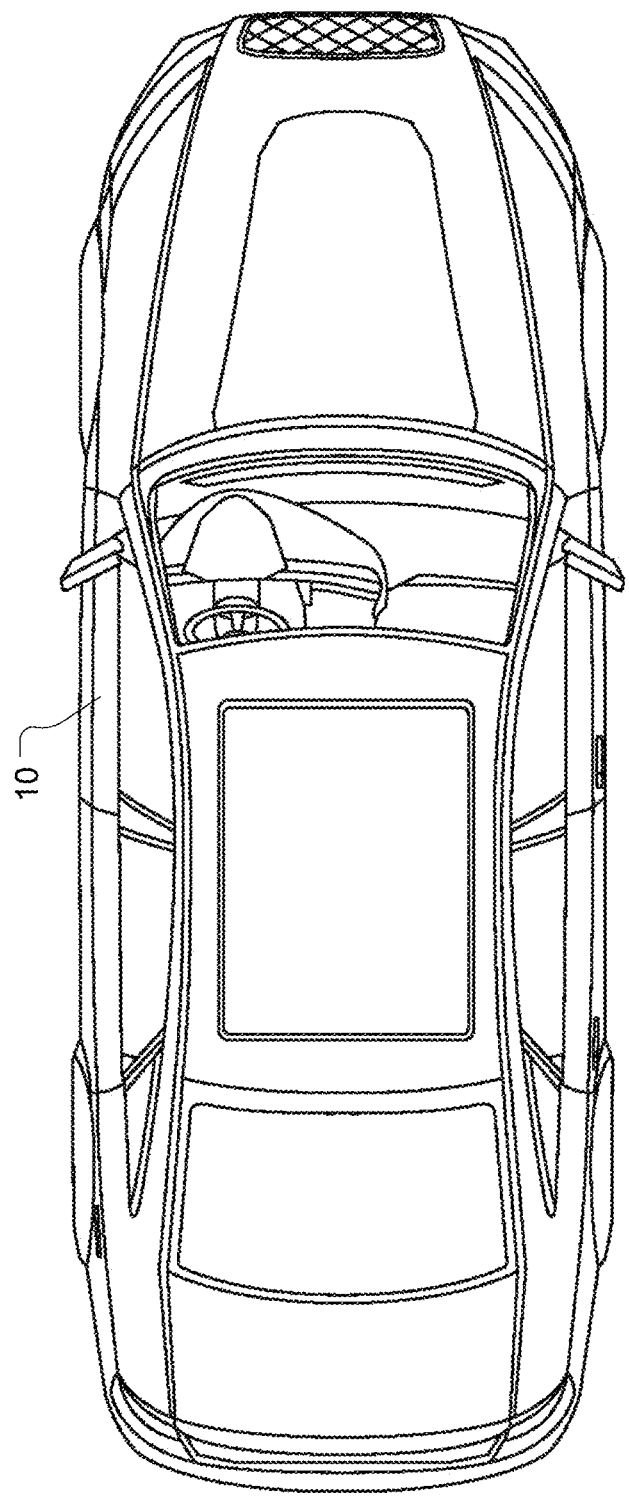
FIG. 1 is a top view of an autonomous vehicle having a light projector in accordance with an embodiment of the present invention.
Figure 2:
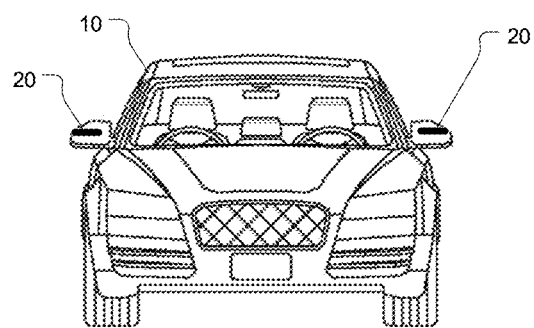
FIG. 2 is a front view of the vehicle of FIG. 1.
Figure 3:
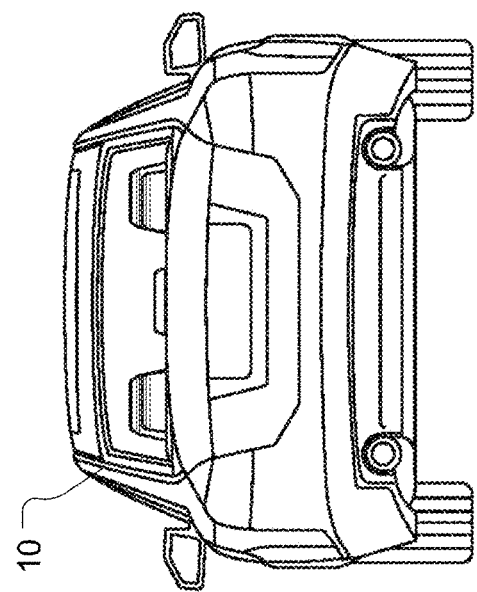
FIG. 3 is a rear view of the vehicle of FIG. 1.
Figure 4:
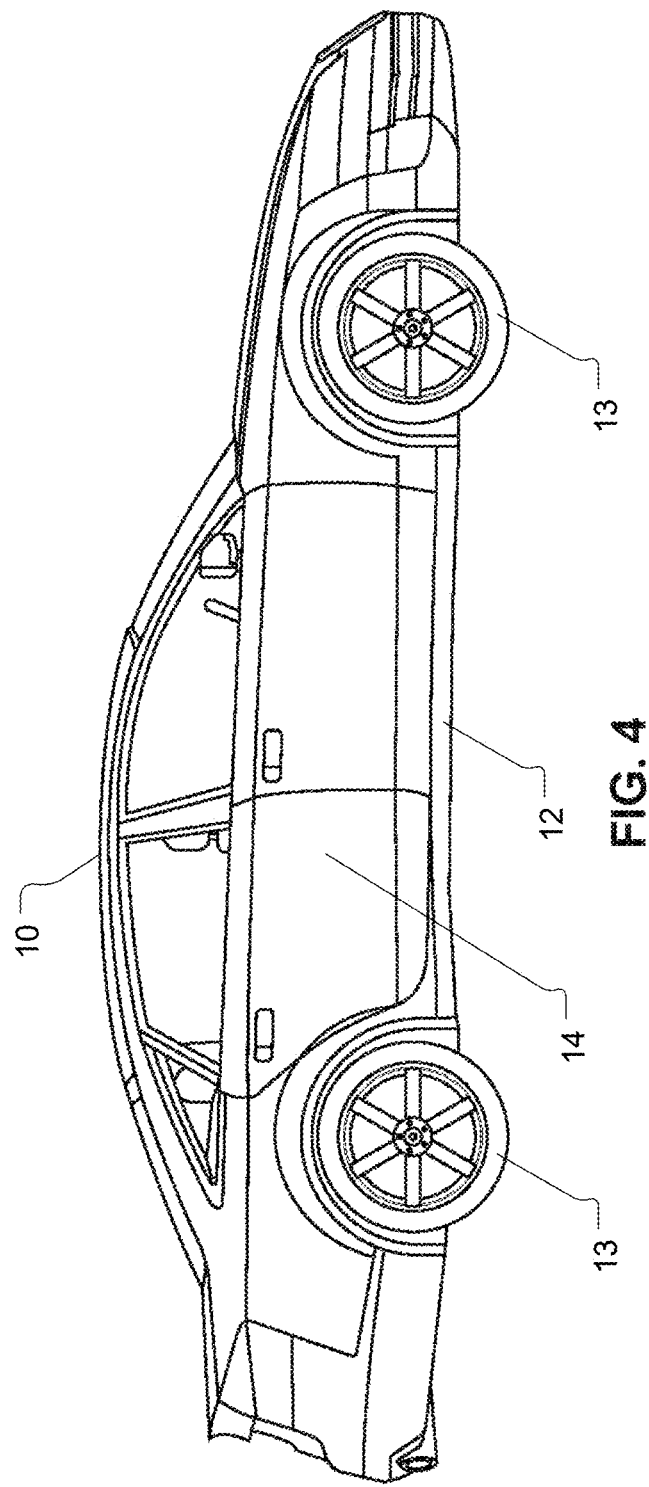
FIG. 4 is a right side view of the vehicle of FIG. 1.
Figure 5:
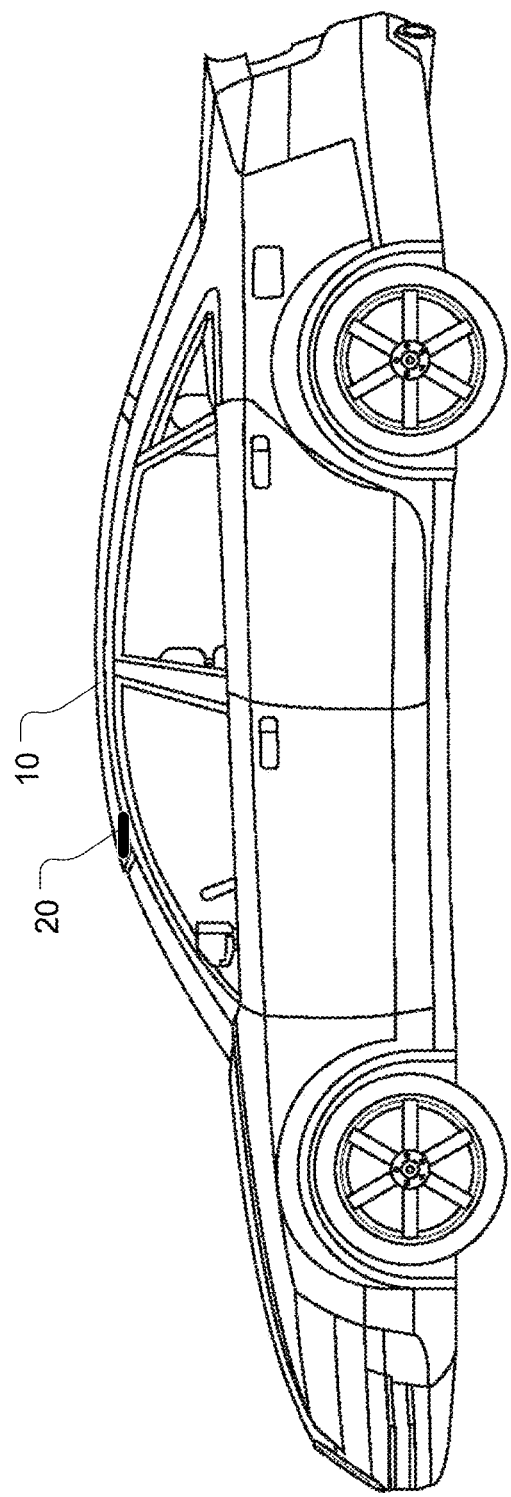
FIG. 5 is a left side view of the vehicle of FIG. 1.

Disclosed herein are various embodiments of an autonomous vehicle having a light projector for illuminating the ground (i.e. road surface or pavement) under a pedestrian or cyclist for visually notifying the pedestrian or cyclist that the autonomous vehicle is aware of the pedestrian or cyclist, i.e. that the autonomous vehicle is tracking the pedestrian or cyclist. The autonomous vehicle has a chassis, a plurality of wheels rotationally mounted to the chassis, a body supported by the chassis and a sensor supported by the body. The sensor detects an object in a vicinity of the autonomous vehicle, the sensor generating sensor data for the object. The autonomous vehicle includes a processor communicatively coupled to the sensor to receive the sensor data from the sensor. The processor is configured to process the sensor data to recognize that the object is a pedestrian or cyclist. The processor is configured to cooperate with the sensor to track the pedestrian or cyclist. The processor is further configured to determine if a road surface beneath the pedestrian or cyclist is to be illuminated and, upon determining that the road surface beneath the pedestrian or cyclist is to be illuminated, to output an illumination signal. The autonomous vehicle further includes a light projector supported by the body and coupled to the processor to receive the illumination signal, wherein the light projector, in response to receiving the illumination signal, projects a beam of light onto the road surface beneath the pedestrian or cyclist to visually notify the pedestrian or cyclist that the autonomous vehicle is presently tracking the pedestrian or cyclist.

FIGS. 1-5 depict one exemplary implementation of an autonomous vehicle 10 (AV), i.e. a self-driving vehicle. The embodiments of this invention may be applied or adapted to a human-driven vehicle or a mixed-mode vehicle that has an assisted-driving system for partially driving the vehicle 10 in conjunction with driver input. The autonomous vehicle 10 may be gas powered, electric, hybrid-electric, hydrogen-powered, or powered by any other means. The autonomous vehicle 10 includes, in the illustrated embodiment, a vehicle chassis 12 and a plurality of wheels 13. The vehicle 10 includes an engine or electric motor supported by the chassis and mechanically connected to one or more of the wheels for providing traction to the one or more of the wheels. The vehicle includes a braking system and a steering system for steering the vehicle via a steering mechanism. The vehicle may include a powertrain to transfer power from the motor to the drive wheels. For some vehicles, the powertrain may include, in addition to the motor (engine), a transmission gearbox, a drive shaft, and a differential. For an electric vehicle implementation, the vehicle includes a rechargeable battery or plurality of rechargeable batteries.

For the purposes of this specification, the term "autonomous vehicle" is meant to encompass any land-based vehicle such as a car (sedan, station wagon, hatchback, etc.), van, minivan, sports utility vehicle (SUV), crossover-type vehicle, bus, minibus, truck, tractor-trailer, semi-trailer.

The terms "autonomous vehicle" and "self-driving vehicle" are meant to synonymously encompass any vehicle having environment-detecting sensors and a processor, controller, computer, computing device or computer system for autonomously steering, accelerating and braking the vehicle, i.e. self-driving or driving autonomously, without a driver physically touching, interacting with or providing input to the steering wheel, accelerator pedal and brake pedal. The vehicle of FIGS. 1-5 also includes a plurality of sensors i.e. environment-detecting sensors. The sensors may include RADAR, LIDAR, cameras and ultrasonic rangefinders. The autonomous vehicle of FIGS. 1-5 further includes a processor configured to receive analog or digital signals (data) from the sensors and to generate steering, acceleration and braking control signals for controlling the steering system, the motor and the braking system of the vehicle. The processor may generate a steering control signal, an acceleration control signal and a braking control signal based on the signals received from the sensors. The processor may also generate other control signals for other subsystems and equipment on the vehicle, e.g. a turn indicator light control signal, a horn control signal, a headlight control signal, a transmission selector signal, an ignition shutoff signal, an ignition start-up signal, a door lock signal, a door unlock signal, a sunroof open signal, a sunroof close signal, a climate control signal, a seat heater signal, a windshield defroster signal, a windshield wiper activation signal, a wiper fluid squirt signal, to name but a few.

The processor may be any microprocessor, computer, computing device, or microcontroller. As will be appreciated, in a variant, there may be multiple processors or computers working together, e.g. networked together via data buses, communication cables, or wireless links to share computational loads or to perform different tasks. In one embodiment, the vehicle comprises a self-driving computer or computing device that has a microprocessor operatively coupled to a memory, e.g. a flash memory and/or random access memory (RAM). The memory may store system data, configuration files and user-related data. There may be multiple memory devices in the vehicle. In a variant, data may be stored in a cloud-based memory accessible by the vehicle.

The processor may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The processor may be part of a computing system that includes a chipset for controlling communications between the one or more processors and one or more of the other components of the system. The one or more processors may also include one or more application-specific integrated circuits (ASICs) or application-specific standard products (ASSPs) for handling specific data processing functions or tasks.

The memory may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read-only memory (EEPROM), non-volatile RAM (NVRAM), universal serial bus (USB) removable memory, or any suitable combination thereof.

The autonomous vehicle further includes a Global Navigation Satellite System (GNSS) receiver for receiving satellite signals and for determining a current location of the self-driving vehicle. The GNSS receiver may be a Global Positioning System (GPS) receiver that decodes satellite signals transmitted by orbiting GNSS satellites. The GNSS (or GPS) receiver may be part of the vehicle navigation system. The GNSS or GPS receiver (e.g. in the form of a chip or chipset) receives GNSS/GPS radio signals transmitted from one or more orbiting GNSS/GPS satellites. References herein to "GPS" are meant to include Assisted GPS and Aided GPS. Although the present disclosure refers expressly to the "Global Positioning System", it should be understood that this term and its abbreviation "GPS" are being used expansively to include any satellite-based navigation-signal broadcast system, and would therefore include other systems used around the world including Beidou (COMPASS), Galileo, GLONASS, IRNSS, and QZSS.

The Society of Automotive Engineers (SAE) has defined multiple levels of autonomous vehicle operation. At levels 0-2, a human driver monitors or controls the majority of the driving tasks, primarily without assistance from the vehicle. For example, at level 0 ("no automation"), a human driver is responsible for all vehicle operations. At level 1 ("driver assistance"), the vehicle occasionally assists with steering, acceleration, or braking, but the driver is still responsible for the vast majority of the vehicle control. At level 2 ("partial automation"), the vehicle controls steering, acceleration, and braking under certain circumstances without human interaction. At levels 3-5, the vehicle assumes more driving-related tasks. At level 3 ("conditional automation"), the vehicle handles steering, acceleration, and braking under certain circumstances as well as monitoring of the driving environment. Level 3 only requires the driver to intervene occasionally. At level 4 ("high automation"), the vehicle handles the same tasks as at level 3 but without relying on the driver to intervene in certain driving modes. At level 5 ("full automation"), the vehicle handle all, or almost all, tasks without any driver intervention. In the present specification, "autonomous vehicle" is meant primarily to be a level 5 vehicle although it will be appreciated that the technology described herein may be adapted or applied to vehicles having lower levels of autonomy.

Figure 6:
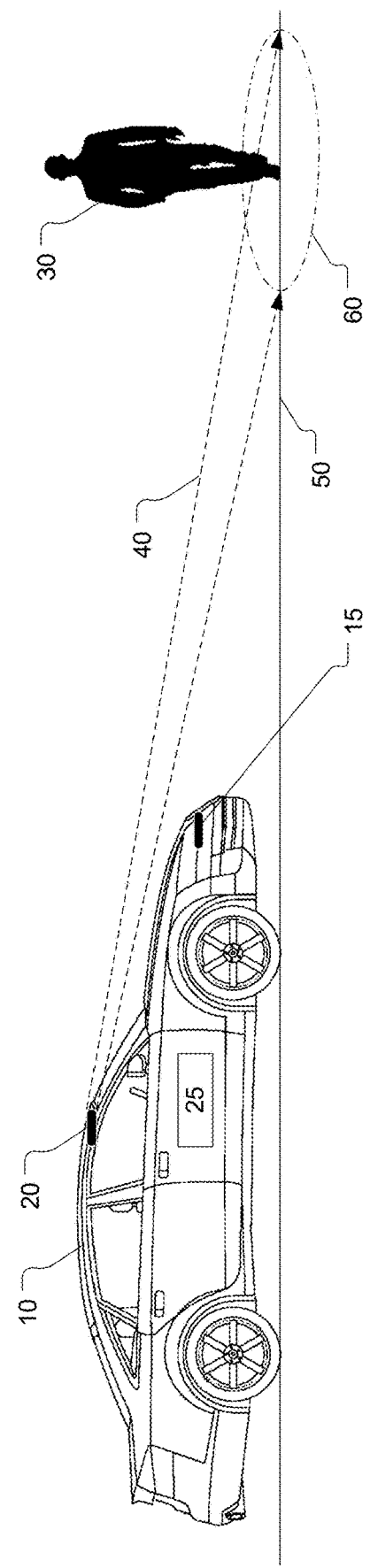
FIG. 6 depicts an autonomous vehicle illuminating the ground beneath a pedestrian to visually notify the pedestrian that the autonomous vehicle is tracking the pedestrian.

In at least some of the embodiments of the present invention, as depicted in FIG. 6, the autonomous vehicle 10 includes a chassis 12, a plurality of wheels 13 rotationally mounted to the chassis 12 and a body 14 supported by the chassis 12. The autonomous vehicle (AV) 10 includes a sensor 15 supported by the body 14 for detecting an object in a vicinity of the autonomous vehicle 10. The object may be a pedestrian or cyclist. The sensor 15 generates sensor data (e.g. image data) for the object. The sensor may be a camera, LIDAR, RADAR or any equivalent sensor. The AV 10 may have multiple sensors 15. The expression "in a vicinity" of the vehicle means generally within sensor range, e.g. within LIDAR range, camera range or RADAR range. This may be, for example, within 100 meters, or more specifically within 50 meters, and even more specifically within 20 meters. The vicinity within which detection is performed may also be a function of the vehicle speed, increasing at higher speeds and decreasing at lower speeds.

In the embodiment depicted in FIG. 6, the autonomous vehicle (AV) 10 includes a processor 25 communicatively coupled to the sensor 15 to receive the sensor data from the sensor 15. The processor 25 is configured to process the sensor data to recognize that the object is a pedestrian or cyclist. The processor 25 is configured to cooperate with the sensor 15 to track the pedestrian 30 or cyclist. The processor 25 is further configured to determine if a road surface beneath the pedestrian 30 or cyclist is to be illuminated and, upon determining that the road surface beneath the pedestrian 30 or cyclist is to be illuminated, to output an illumination signal. The illumination signal causes a light, light source or illumination source (referred to herein as a "light projector") to illuminate the road surface beneath the pedestrian 30 or cyclist.

Figure 7:
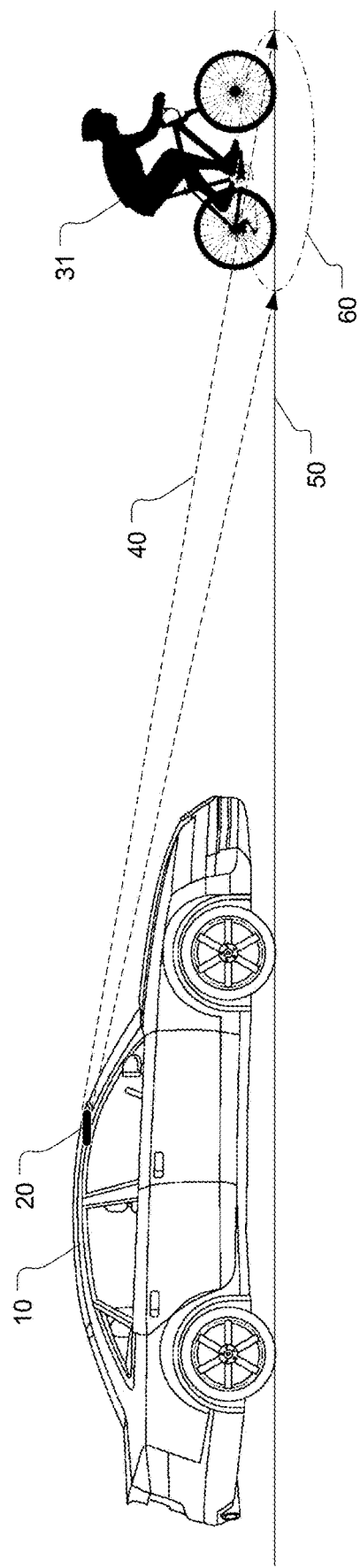
FIG. 7 depicts an autonomous vehicle illuminating the ground beneath a cyclist to visually notify the cyclist that the autonomous vehicle is tracking the cyclist.

In the embodiment depicted in FIG. 6, the AV 10 further includes a light projector 20 supported by the body and coupled to the processor 25 to receive the illumination signal (projector activation signal), wherein the light projector 20, in response to receiving the illumination signal, projects a beam of light 40 onto the road surface 50 beneath the pedestrian 30 or cyclist to visually notify the pedestrian 30 or cyclist that the autonomous vehicle 10 is presently tracking (i.e. is aware of) the pedestrian 30 or cyclist. In the embodiment depicted in FIG. 6, the beam of light forms an illumination, e.g. an illuminated circle 60, beneath the pedestrian 30. The shape of the illumination may be circular, annular, star-shaped, elliptical, oblong, polygonal (e.g. triangular, square, rectangular, pentagonal, hexagonal, octagonal, etc.). As depicted by way of example in FIG. 7, the light projector 20 of the AV 10 projects an illuminated circle 60 beneath a cyclist 31. The illumination 60 may be used to illuminate the ground beneath the pedestrian 30 or the cyclist 31 whether the pedestrian 30 or the cyclist 31 is stationary or moving. In the latter case, the light projector 20, in at least some embodiments, dynamically adjusts or moves the position or placement of the illumination 60 so it remains beneath the moving the pedestrian 30 or the cyclist 31 as the pedestrian or cyclist is moving. In one embodiment, the illumination or illuminated shape is centered beneath the pedestrian or cyclist. In another embodiment, the illumination or illuminated shape is beneath the pedestrian or cyclist but not centered, i.e. offset. For example, the illuminated shape may extend more in a direction in which the pedestrian/cyclist is facing or a direction in which the pedestrian/cyclist is traveling. In yet another embodiment, the illumination or illuminated shape is projected on the pavement in front of the pedestrian/cyclist without being directly beneath the pedestrian/cyclist. The ground includes pavement, road, street, highway, driveway, path, parking lot, underground garage, sidewalk, or any other drivable surface whether paved with asphalt or other equivalent material, or made of stone, gravel, dirt, etc. The cyclist for the purposes of this specification includes a person riding a bicycle, e-bike, moped, scooter, motorcycle, tricycle or motorized tricycle, or a person riding in a wheelchair. For the purposes of this specification, the term "pedestrian" shall mean a person who is walking, running, jogging, or engaged in another activity like skating with roller skates or roller-type in-line skates, skateboarding, cross-country skiing, etc.

The light projector 20 may be a laser projector, LED projector, lamp projector or other visible-light projection system. The laser projector comprise, for example, a semiconductor laser diode. Other laser technologies, e.g. solid state laser or gas laser, may be used. The laser projector may comprise one laser light source for monochrome projection or three sources, i.e. RGB (red, green, and blue) for polychromatic projection.

The illumination 60 visually signals to the pedestrian 30 or the cyclist 31 that the AV 10 is aware of the pedestrian 30 or the cyclist 31, i.e. that the AV is tracking the pedestrian 30 or the cyclist 31. By illuminating the pedestrian or cyclist, the latter is informed that the vehicle is aware of his or her presence, thereby giving the pedestrian or cyclist confidence that the AV 10 will act safely to avoid the pedestrian or cyclist or to stop or yield for the pedestrian or cyclist. This improves traffic fluidity because the pedestrian or cyclist does not need to wait for the AV to come to a stop or to initiate a turn or other maneuver before the pedestrian or cyclist can react or make a move.

Figure 8:
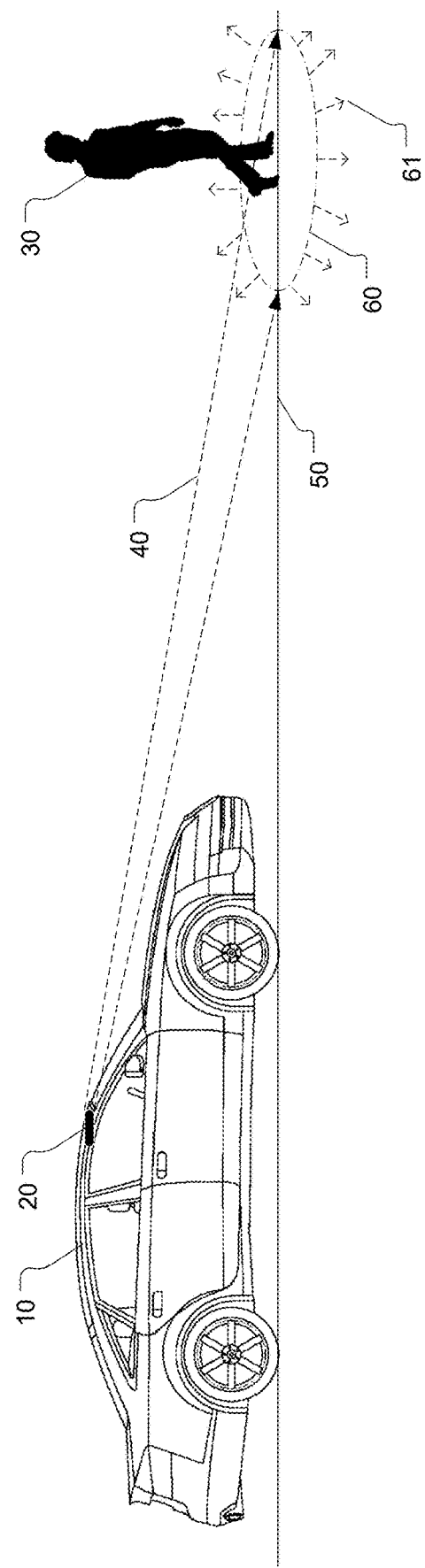
FIG. 8 depicts an autonomous vehicle illuminating the ground beneath a pedestrian using a strobe light to visually notify the pedestrian that the autonomous vehicle is tracking the pedestrian.

In the embodiment depicted in FIG. 8, the light projector 20 of the autonomous vehicle 10 projects a strobing beam of light beneath the pedestrian or cyclist. The strobing beam of light may be useful to draw attention to the pedestrian or cyclist. The beam of light may be a strobing beam that creates a flashing illumination 61 on the road surface 50, i.e. causes the illumination 61 to flash or blink light.

Figure 9:
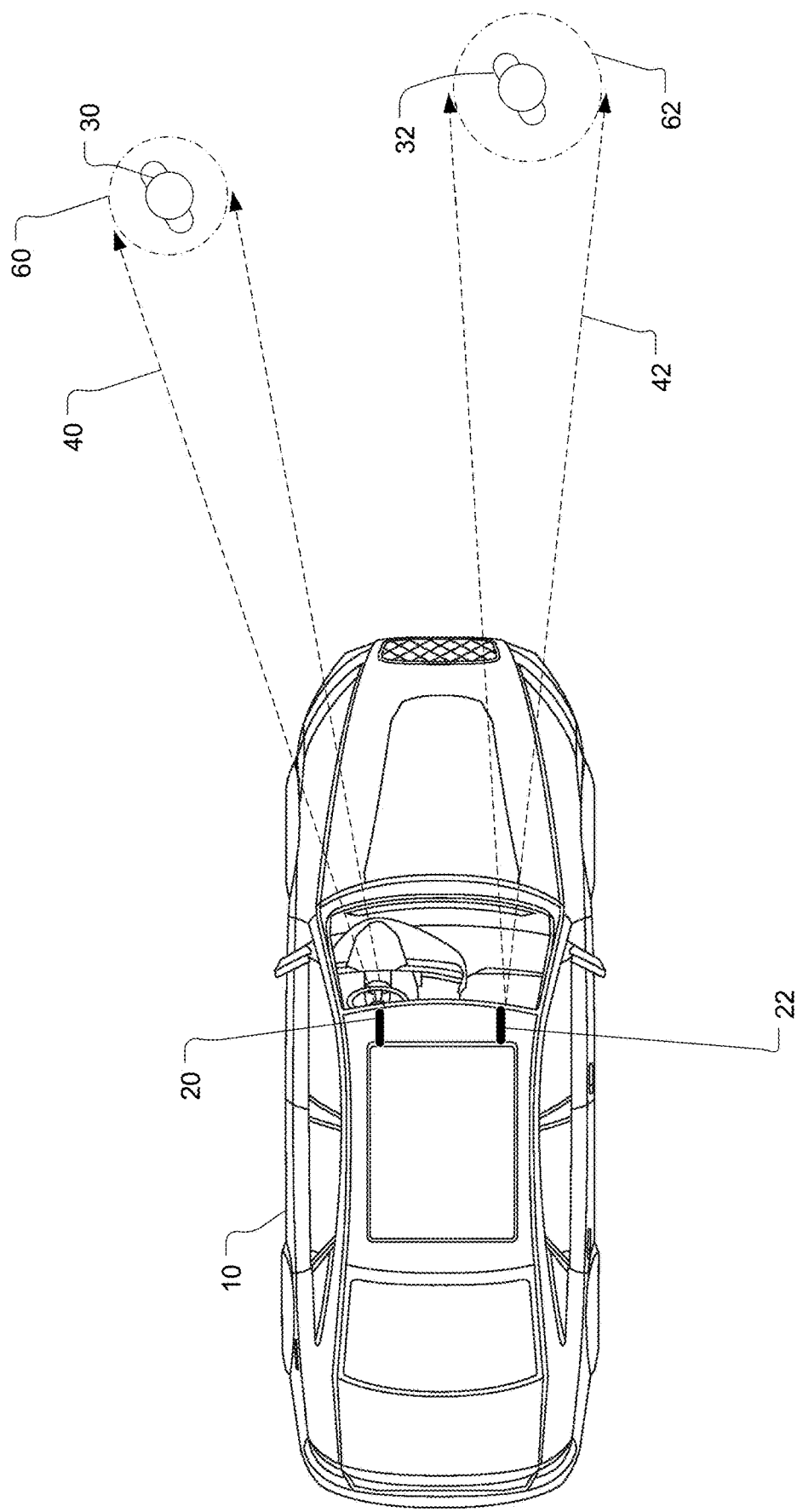
FIG. 9 depicts an autonomous vehicle illuminating the ground beneath two pedestrians to visually notify both pedestrians that the autonomous vehicle is tracking both pedestrians.

In the embodiment of FIG. 9, the autonomous vehicle 10 includes a plurality of light projectors 20, 22 to simultaneously illuminate multiple pedestrians or cyclists. As depicted in FIG. 9, the AV has two roof-mounted light projectors 20, 22, i.e. the AV has a first light projector 20 and a second light projector 22. In this example, the first light projector 20 illuminates the ground beneath a first pedestrian 30 and the second light projector 22 illuminates the ground beneath a second pedestrian 32. In this example, the first light projector 20 projects a first beam of light 40 to create a first illuminated shape 60 beneath the first pedestrian 30 whereas the second light projector 22 projects a second beam of light 42 to create a second illuminated shape 62 beneath the second pedestrian 32. The first and second illuminated shapes 60, 62 may be of different shapes and/or different sizes. The first and second beams of light 40, 42 may be the same color or different colors.

Figure 10:
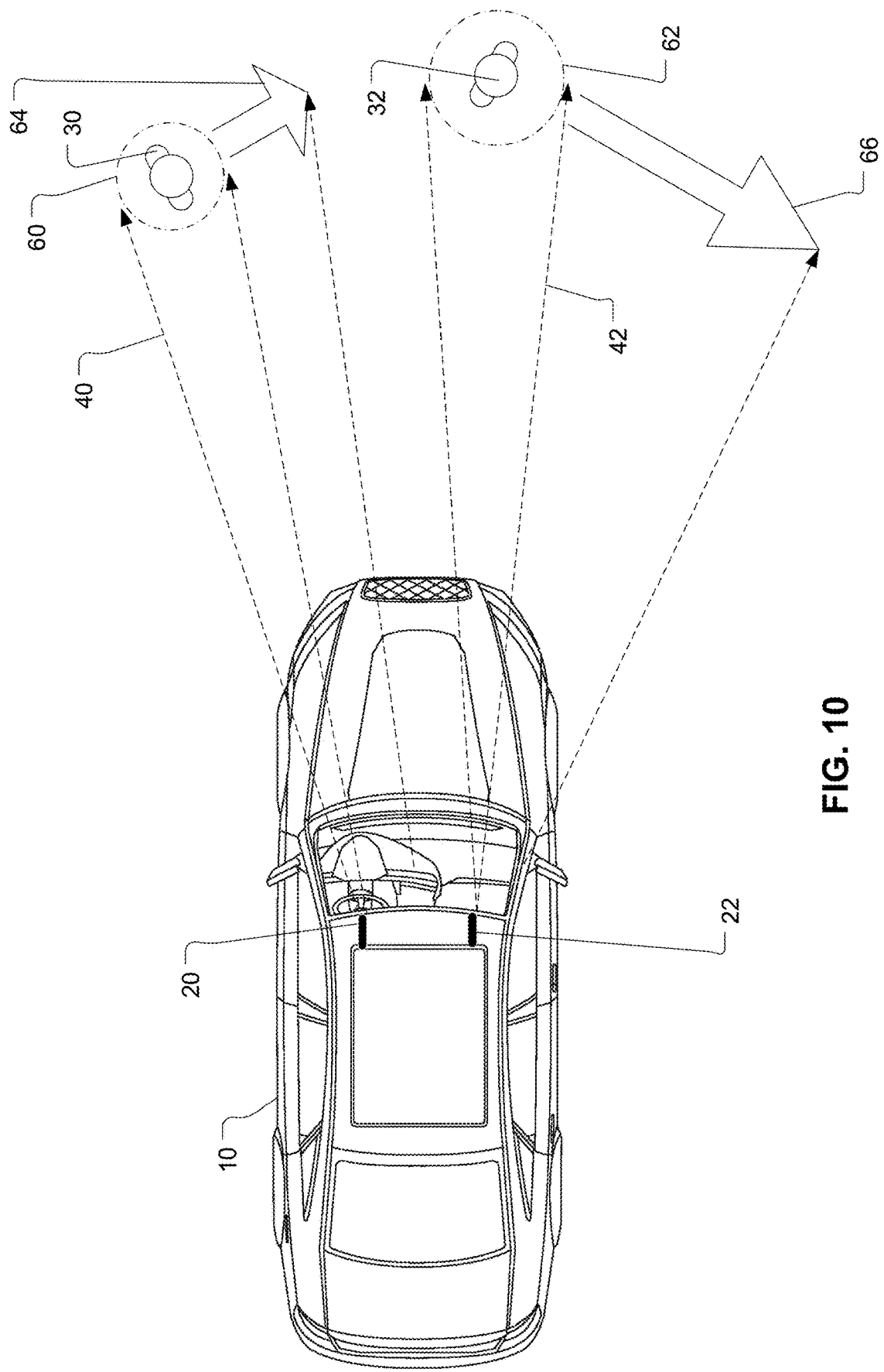
FIG. 10 depicts an autonomous vehicle illuminating the ground beneath two pedestrians to visually notify both pedestrians that the autonomous vehicle is tracking both pedestrians and also projecting arrows indicating the inferred directions of travel for each of the pedestrians.

In one embodiment, as depicted in FIG. 10, the autonomous vehicle 10 uses the processor 25 to infer a direction of travel of the pedestrian 30 or cyclist 31. The processor may draw the inference regarding the direction of travel by monitoring the current or recent direction of travel of the pedestrian or cyclist and optionally also using the road direction or road curvature (or the direction and/or curvature of a sidewalk or bike path) as an indication of where the pedestrian or cyclist is heading. The processor may also detect hand signs, gestures or gesticulations of the pedestrian or cyclist and/or a head orientation or head direction to infer the direction of travel. The light projector 20 projects a directional indicator 64, 66 on the road surface 50 indicative of an inferred direction of travel of the pedestrian 30 or cyclist 31. In the example of FIG. 10, the AV 10 projects a first directional indicator 64 for the inferred direction of the first pedestrian 30 and projects a second directional indicator 66 for the inferred direction of the second pedestrian 32. The length of each arrow, in one embodiment, may be proportional to an inferred speed of the pedestrian.

Figure 11:
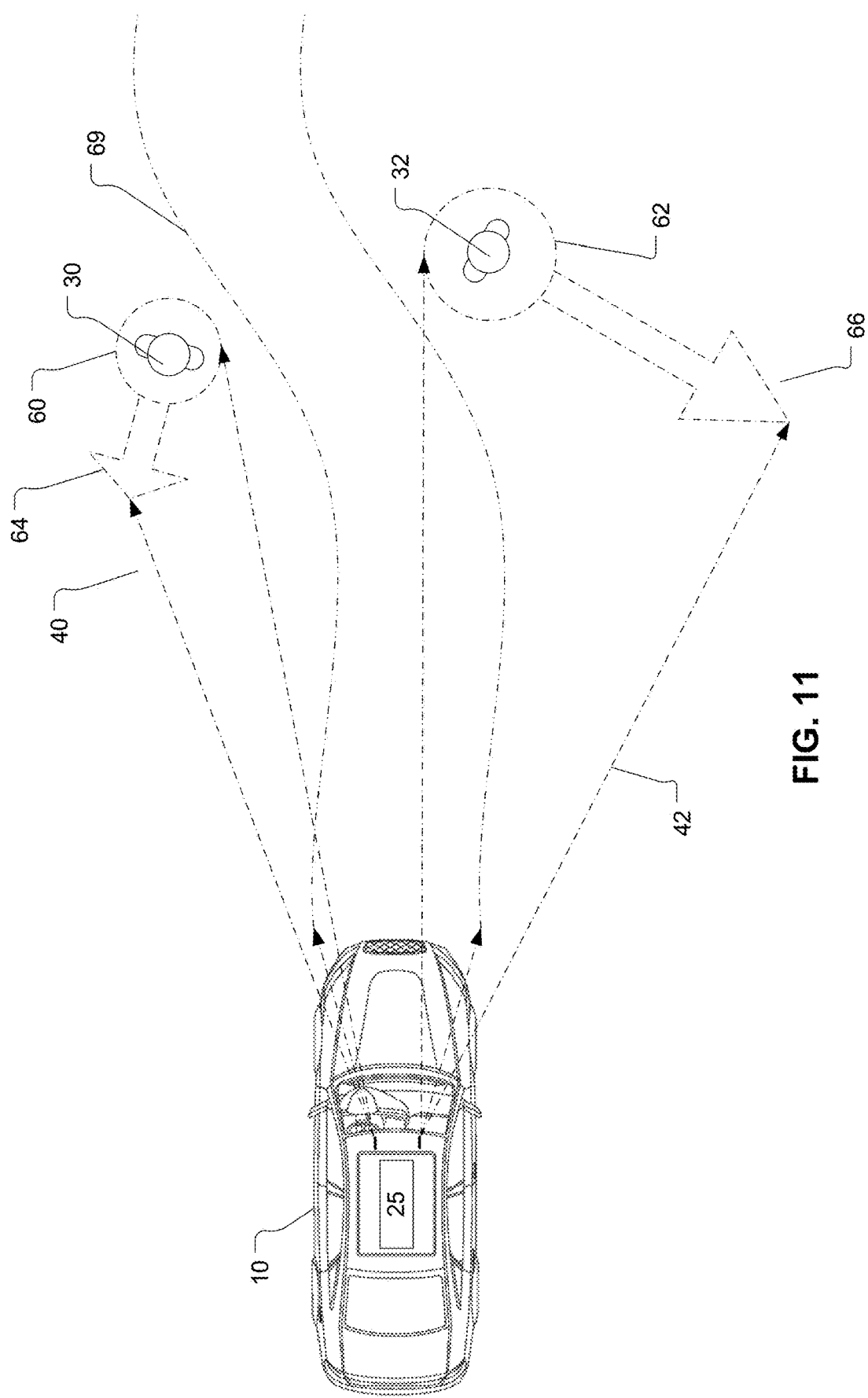
FIG. 11 depicts an autonomous vehicle illuminating the ground beneath two pedestrians to visually notify both pedestrians that the autonomous vehicle is tracking both pedestrians and also projecting arrows indicating the inferred directions of travel for each of the pedestrians and further projecting an intended route.

In the embodiment depicted in FIG. 11, the processor 25 causes the light projector 20 to project a pair of parallel lines 69 on the road surface 50 illuminating an intended path of the autonomous vehicle 10. In a variant, the lines 69 are a different color than the illuminated circles 60, 62. In a variant, if one or both of the illuminated circles 60, 62 is or are too close to the lines 69, the circle(s) 60, 62 may flash and/or the lines may flash as a warning to the pedestrian(s) 30, 32.

Figure 12:
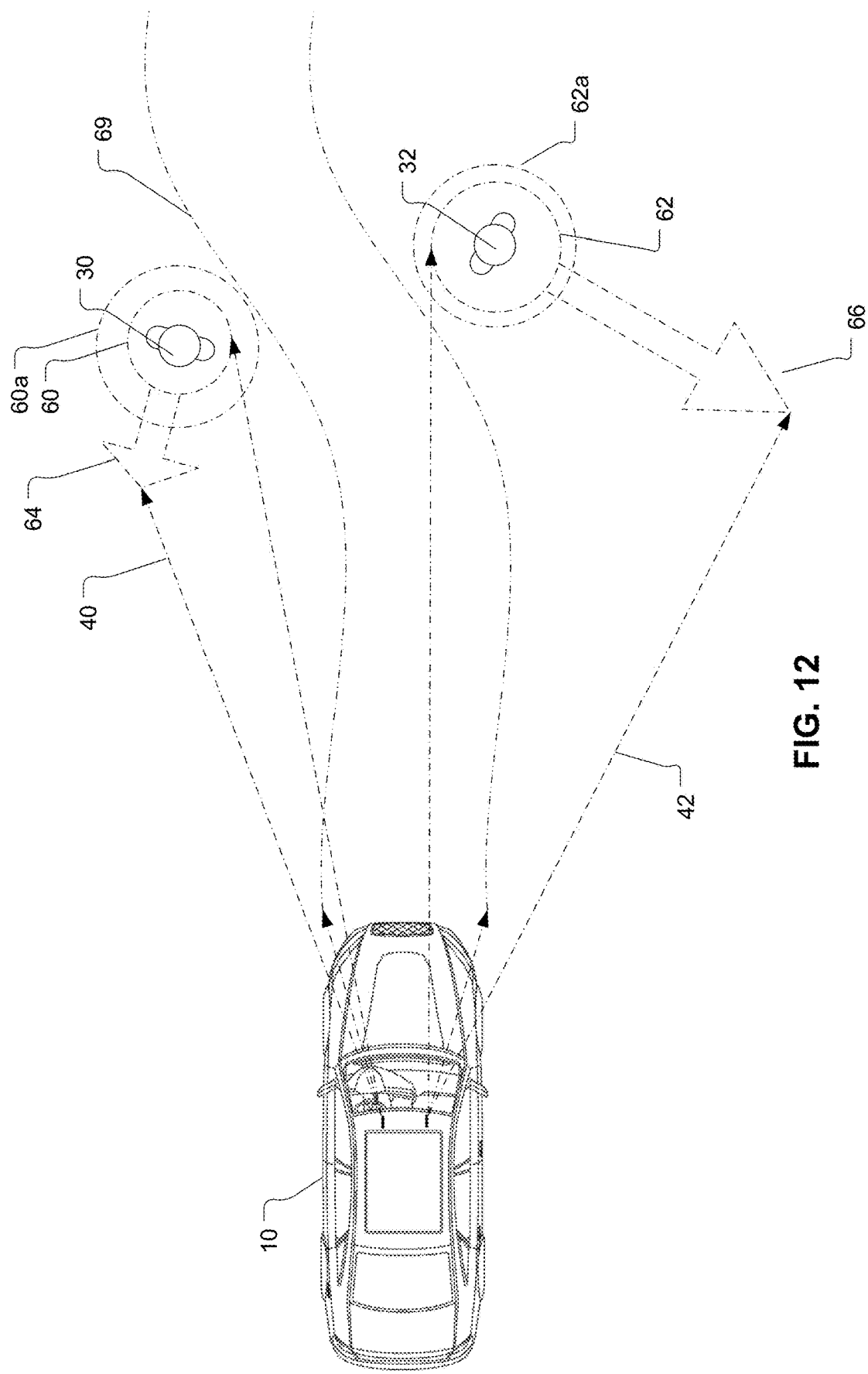
FIG. 12 depicts an autonomous vehicle projecting concentric circles representing a lateral margin of variation predicted for each pedestrian.

In the embodiment depicted in FIG. 12, the autonomous vehicle 10 uses the processor 25 to compute a lateral margin of variation (e.g. a safety margin) for the pedestrian or cyclist to account for variations in the predicted movement of the pedestrian or cyclist. In FIG. 12, the light projectors 20, 22 project beams of light 40, 42 illuminating a lateral margin of variation 60a, 62a expected by the autonomous vehicle for the first and second pedestrians 30, 32, respectively. In this example, the lateral margins 60a, 62b are concentric circles around the illuminated circles 60, 62, respectively. The first radial gap between the first margin 60a and the first circle 60 may be different from the second radial gap between the second margin 62a and the second circle 62.

Figure 13:
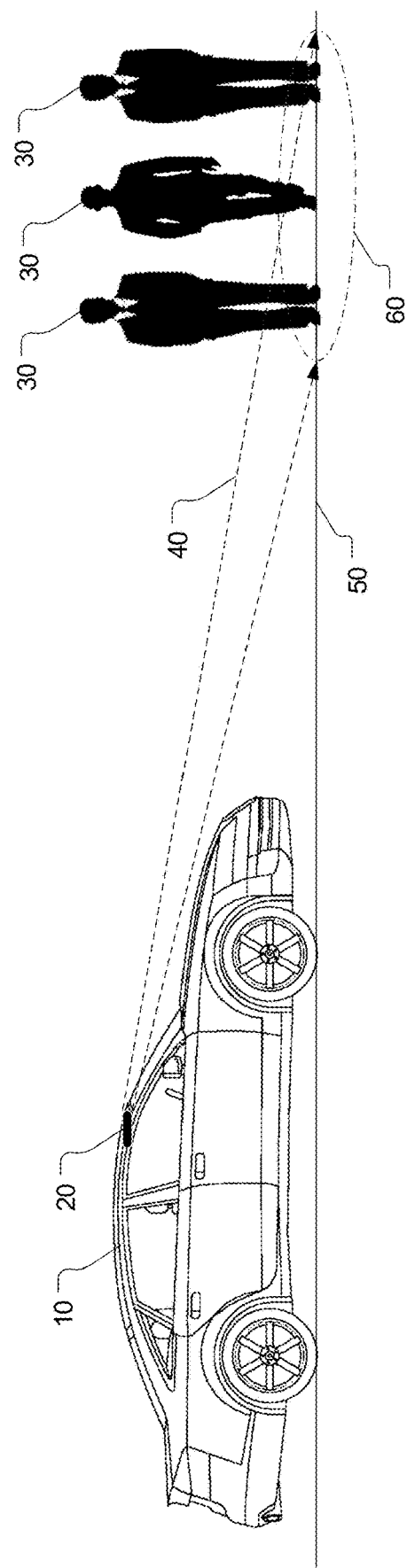
FIG. 13 depicts an autonomous vehicle illuminating the ground with a single circle or polygonal beneath a cluster of pedestrians.

As depicted in FIG. 13, the autonomous vehicle 10 uses the processor 25 to detect a cluster of pedestrians 30 or cyclists and causes the light projector to illuminate a common zone on the road encompassing the cluster of pedestrians 30 or cyclists. In the example of FIG. 13, there are three pedestrians 30. In this example, a single consolidated shape 60 is illuminated by the light projector 20 on the road surface 50 beneath the cluster of pedestrians 30. In FIG. 13, the shape 60 is a single circle although it may be another polygonal shape beneath the cluster of pedestrians 30.

Figure 14:
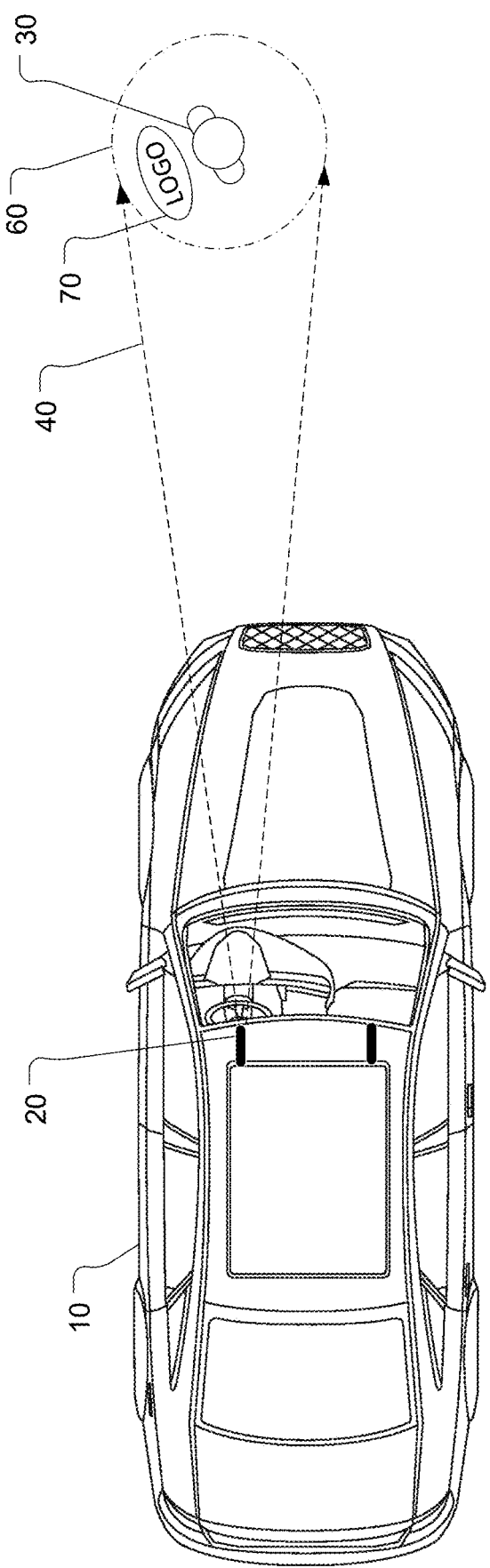
FIG. 14 depicts an autonomous vehicle projecting a logo in front of a pedestrian.

In the embodiment depicted by way of example in FIG. 14, the autonomous vehicle (AV) 10 projects a logo 70 on the road surface 50 in front of a pedestrian 30 to enable the pedestrian to correlate the illuminated shape 60 with the make of the AV 10. This is useful if there are two vehicles approaching the pedestrian. The logo informs the pedestrian which of the two vehicles is tracking the pedestrian. The logo 70 may be projected as part of the illuminated circle 60 as shown in this figure or, alternatively, outside of the illuminated circle. The orientation of the logo 70 may optionally be based on a face direction of the pedestrian and/or a direction of travel of the pedestrian.

In one embodiment, the light projector projects an icon, image, symbol or other visual indicator using a light color to match a pedestrian's or cyclist's clothing color (or a predominant color that the pedestrian or cyclist is wearing).

In another embodiment, the processor of the AV selects a light color for the light beam to match an exterior color of the body of the autonomous vehicle to facilitate the pedestrian or cyclist correlating the illuminated shape with the AV. In a variant, the logo may be logo of the vehicle may be projected with a colored frame or circle surrounding the logo in which the color of the colored frame or circle marches the color of the car.

Figure 15:
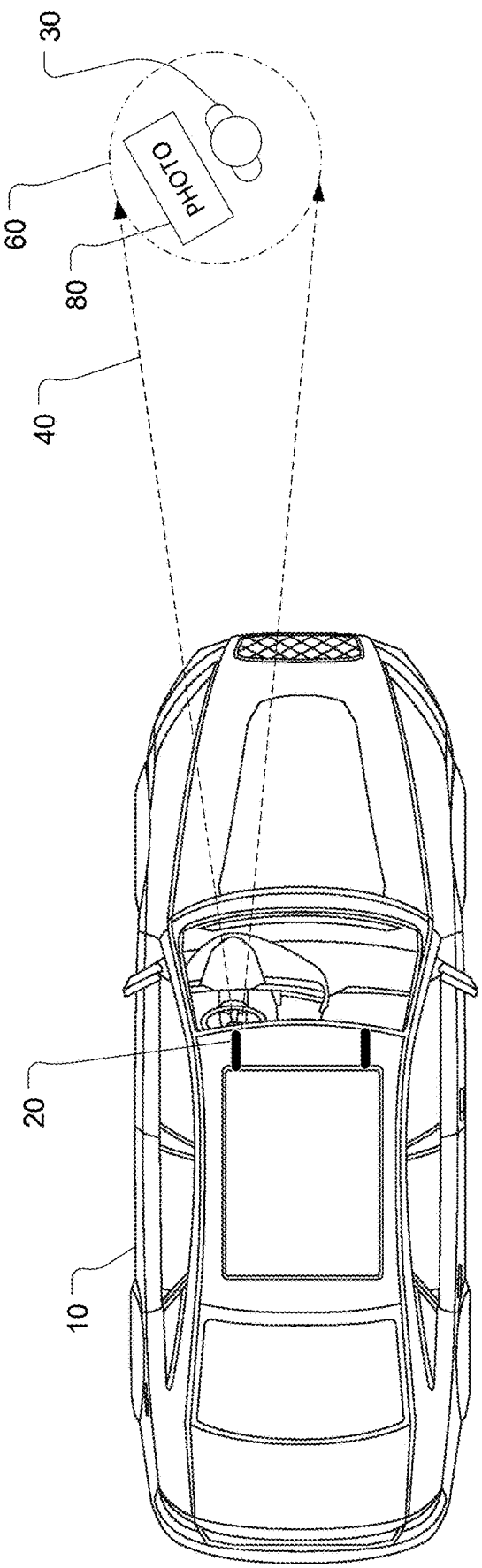
FIG. 15 depicts an autonomous vehicle projecting a photo in front of a pedestrian.

In the embodiment of FIG. 15, the light projector 20 projects on the road surface a photographic image 80 that represents the pedestrian or cyclist. The photograph image may be captured using a camera of the AV. The photographic image enables the pedestrian to recognize himself or herself and thus the pedestrian may readily deduce that the AV is tracking him or her. The photographic image 80 may be projected as part of the circular shape 60 or superimposed on the circular shape 60. The image 80 may be within the circular shape as shown or outside of it. Another shape (e.g. square, rectangular, polygonal) may be used.

Figure 16:
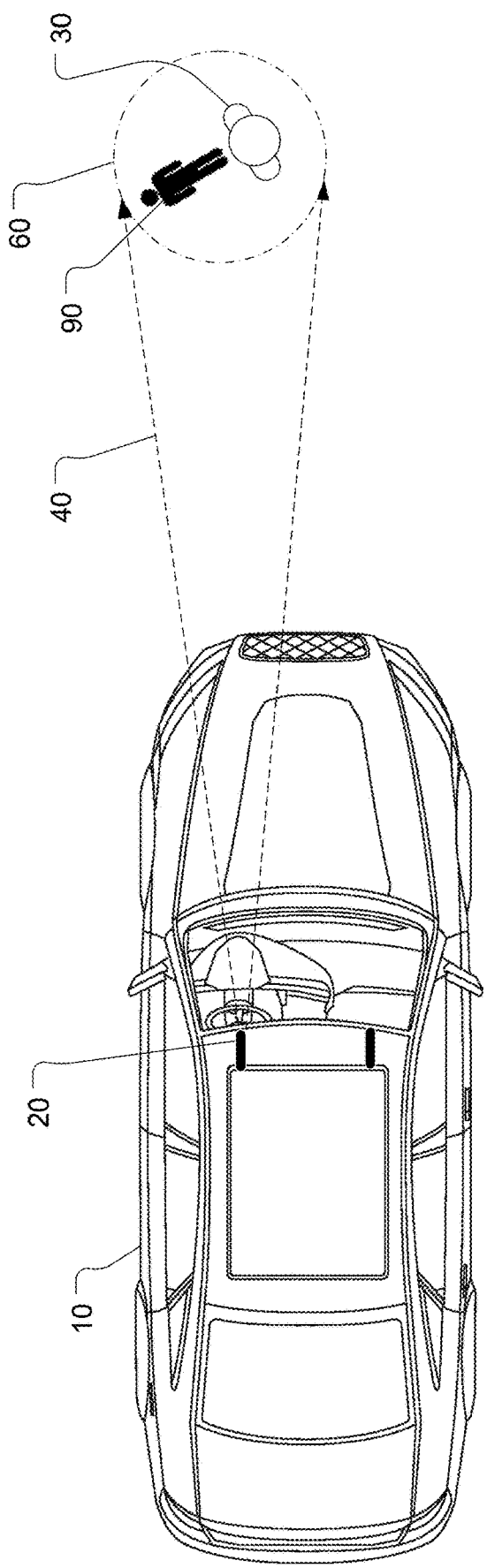
FIG. 16 depicts an autonomous vehicle projecting an icon in front of a pedestrian.

In the embodiment of FIG. 16, the light projector 20 projects an icon 90 on the road surface 50. The icon may be a person as shown in FIG. 16, or a more specific icon, e.g. an icon of a walking person, an icon of a bicycle, an icon of a wheelchair, an icon of a stroller, male, female, adult, child, etc. The icon may be determined by the camera and processor using machine vision technologies that recognize the type of person and then generate and project the icon based on the type of person.

Figure 17:
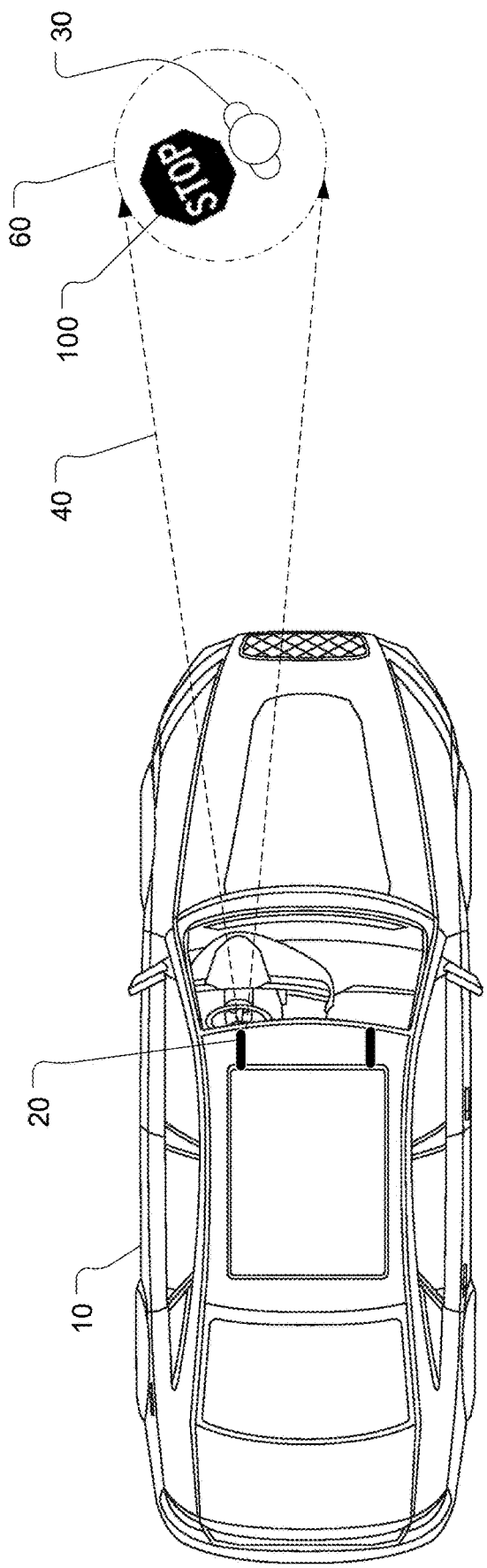
FIG. 17 depicts an autonomous vehicle projecting a stop sign in front of a pedestrian.
Figure 18:
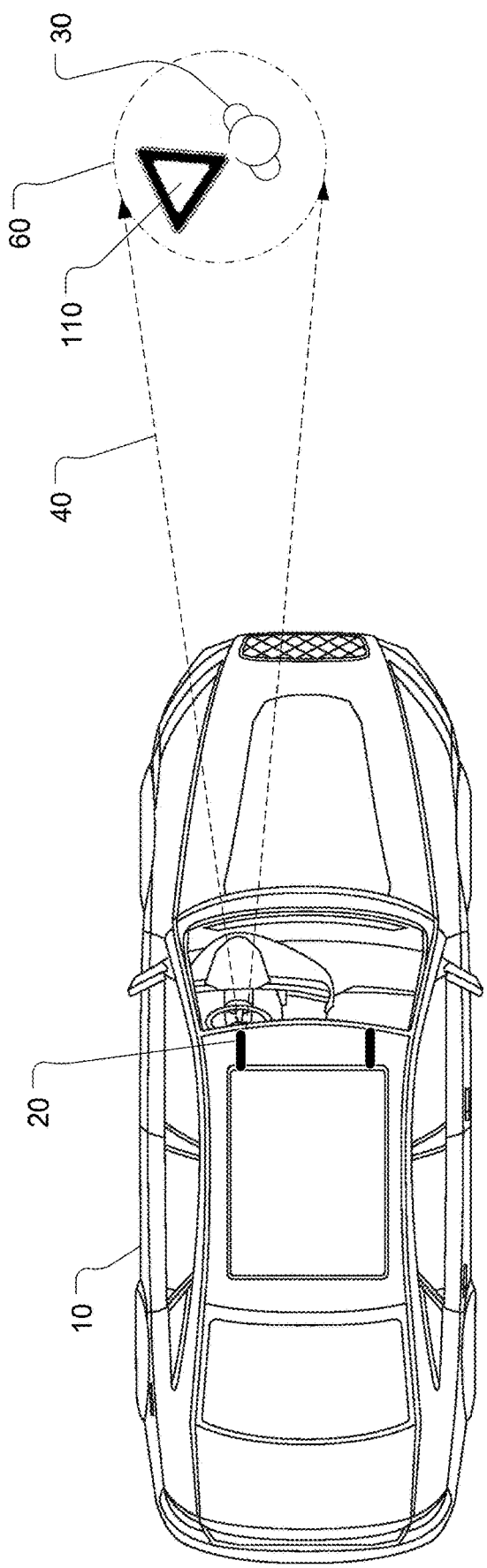
FIG. 18 depicts an autonomous vehicle projecting a yield sign in front of a pedestrian.

In at least some embodiments, as depicted in FIG. 17, the autonomous vehicle 10 uses the light projector 20 to project a message to the pedestrian 30 or cyclist on the road surface 50. The message may be a road sign such as a stop sign 100 as shown by way of example in FIG. 17. As another example, the road sign may be a yield sign 110 as shown in FIG. 18. The message 100 may be part of the illuminated shape 60 as shown or outside of it. In one embodiment, the message is dynamically oriented based on an instantaneous face direction of the pedestrian or cyclist.

Figure 19:
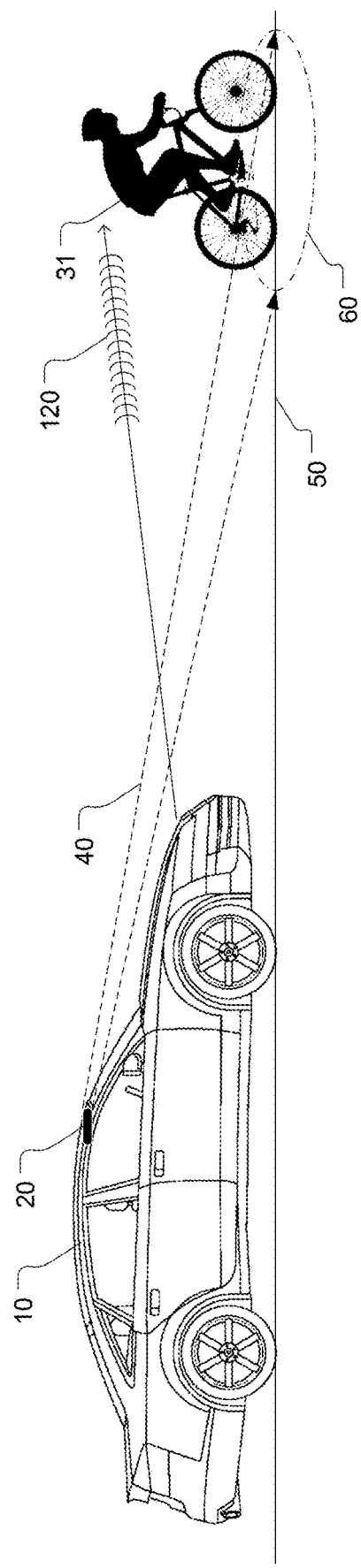
FIG. 19 depicts an autonomous vehicle projecting a circular light beneath a cyclist and also emitting an audible alarm to alert the cyclist.

In at least some embodiments, the autonomous vehicle 10 has a beam-forming horn to alert a pedestrian or cyclist in addition to the visual notification provided by the light projector(s). In the embodiment of FIG. 19, the autonomous vehicle 10 includes a beam-forming horn to direct a horn sound 120 at the cyclist 31 if the cyclist moves unexpectedly into an intended path of the autonomous vehicle. In one variant, the autonomous vehicle 10 projects a flashing light (e.g. a flashing circular light or flashing polygonal light) beneath a cyclist before emitting an audible alarm to alert the cyclist. The AV may include a beamforming horn such as the one disclosed in U.S. Pat. No. 8,751,106 (entitled Directional Horn and Method of Use) which is hereby incorporated by reference.

Figure 20:
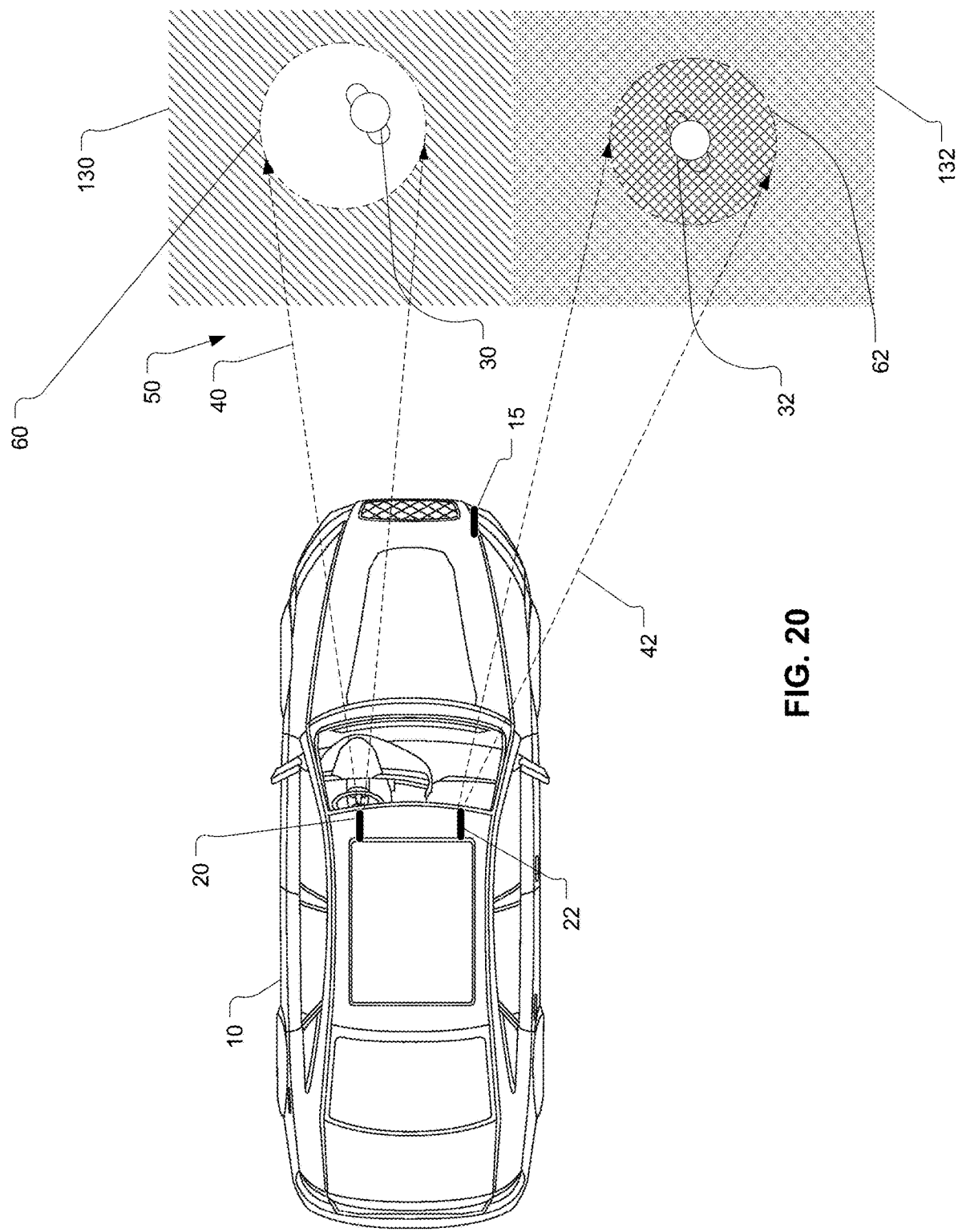
FIG. 20 depicts an autonomous vehicle using two differently colored laser lights to illuminate two differently colored road surfaces.

In the embodiment of FIG. 20, the autonomous vehicle comprises a camera 15 for detecting a color of the road surface 50 beneath the pedestrian or cyclist. The processor of the AV selects a light color based on the color of the road surface and cooperates with the light projector to project the beam of light using a selected light color that provides contrast when projected on the road surface. In the example depicted in FIG. 20, the AV 10 has first and second light projectors 20, 22 for projecting first and second light beams 40, 42, respectively, to illuminate first and second shapes 60, 62 beneath first and second pedestrians 30, 32. In this example, the first and second pedestrians 30, 32 are standing on first and second colored portions of the road surface 130, 132. By colored portions, these may be different shades of grey, e.g. a wet zone of pavement and a dry zone of pavement, a snow-covered zone of pavement and a bare zone of pavement, a newly paved zone and a worn-out zone, etc. In this example, the processor selects a first light color for the first beam of light 40 to be projected from the first projector 20 to contrast with the first colored portion 130 of the road surface. Similarly, the processor selects a second light color for the second beam of light 42 to be projected from the second projector 22 to contrast with the second colored portion 132 of the road surface. As a result, the first and second illuminated shapes 60, 62 are more visible on the first and second colored portions 130, 132 of the road surface 50.

Figure 21:
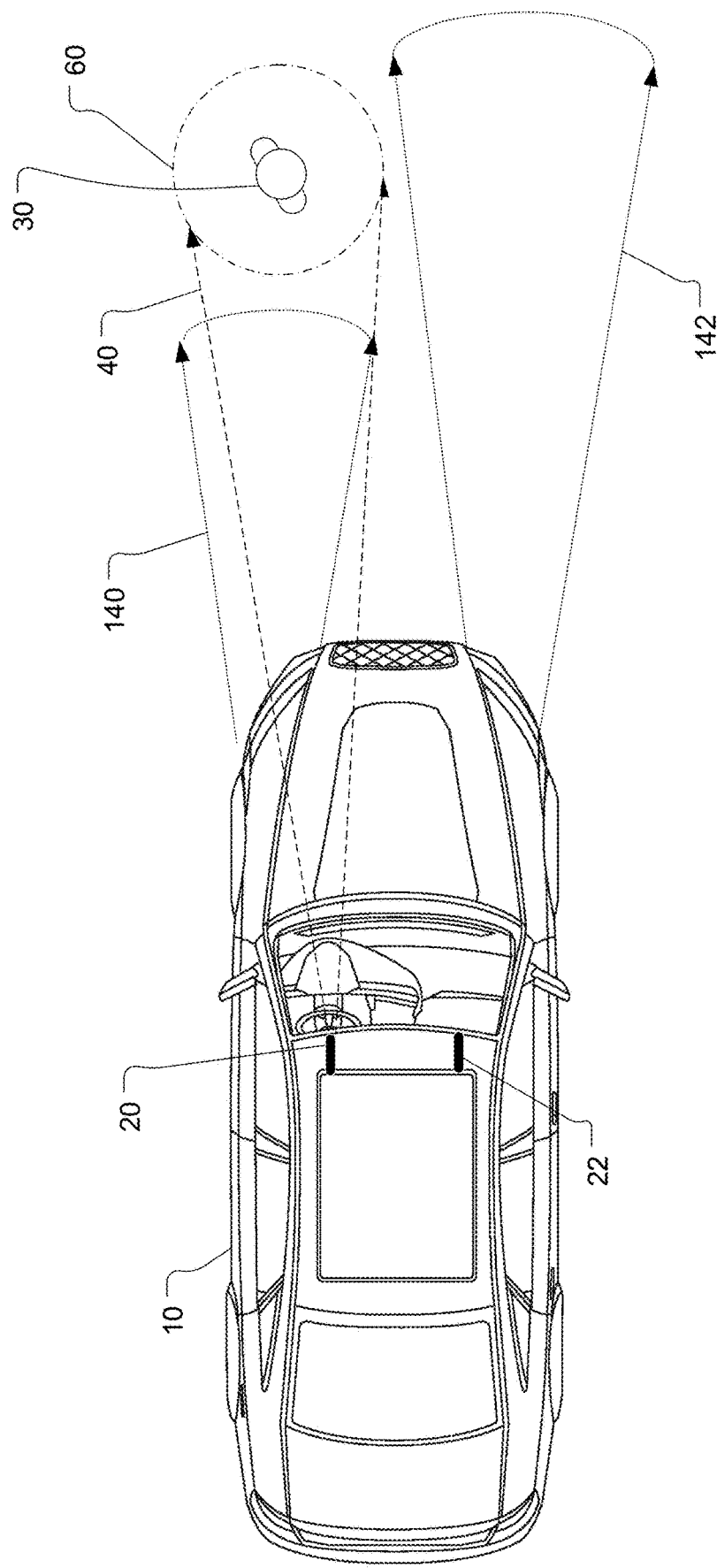
FIG. 21 depicts an autonomous vehicle adjusting its headlights to compensate for the light emitted by the light projector.

In the embodiment of FIG. 21, the autonomous vehicle 10 comprises adjustable headlights that are automatically adjustable (e.g. by signals from the processor) in direction and/or intensity to reduce interference with the beam(s) of light from the light projector(s) of the AV. In this example, the headlights adjust the headlight beams 140, 142 to avoid or at least minimize interference with the illuminated shape 60. In another embodiment, the processor of the autonomous vehicle cooperates with the light projector to adjust the intensity of the light emitted from the light projector. The intensity may be adjusted based on the ambient luminosity. The AV may include an ambient light sensor to sense the ambient luminosity. The processor may increase the intensity of the light from the light projector for bright conditions (e.g. during daytime) and reduce the intensity of the light from the light projector in dim conditions (e.g. at night).

Figure 22:
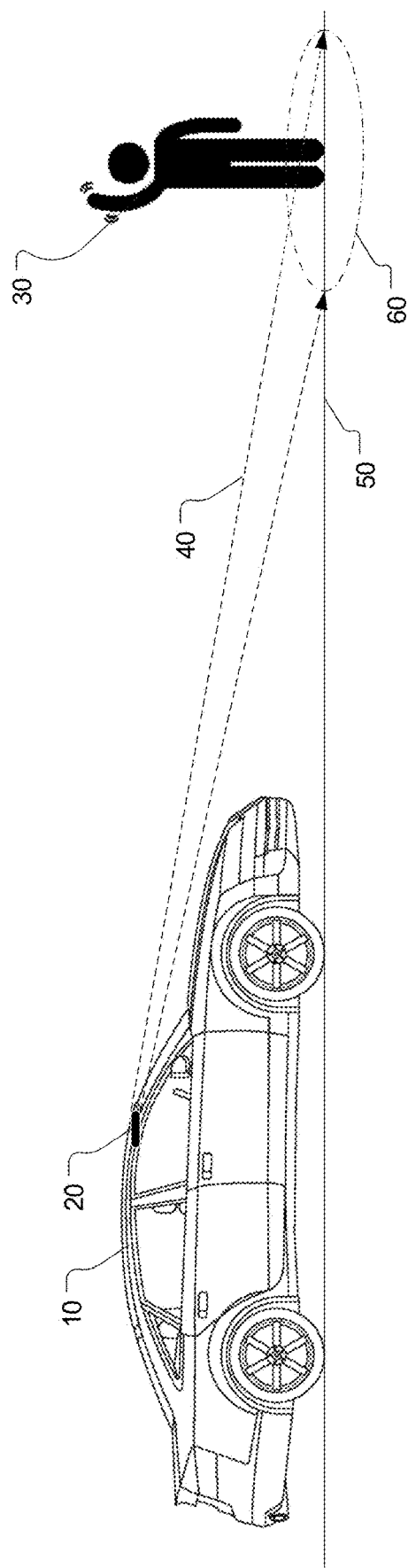
FIG. 22 depicts an autonomous vehicle adjusting the projected light in response to recognizing a pedestrian's gesture.
Figure 23:
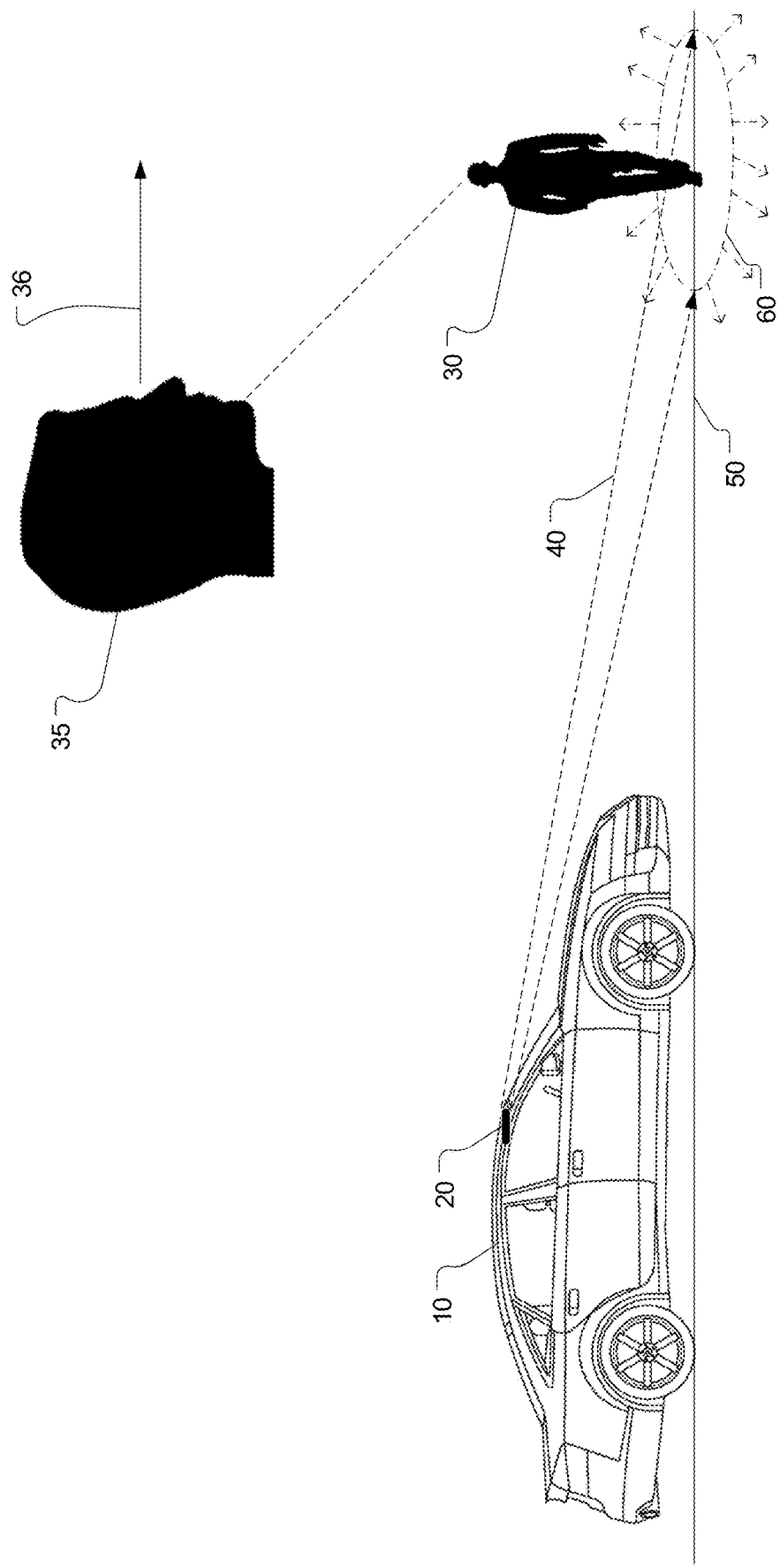
FIG. 23 depicts an autonomous vehicle projecting a flashing light beneath a pedestrian in response to detecting that the pedestrian is not looking at the vehicle.
Figure 24:
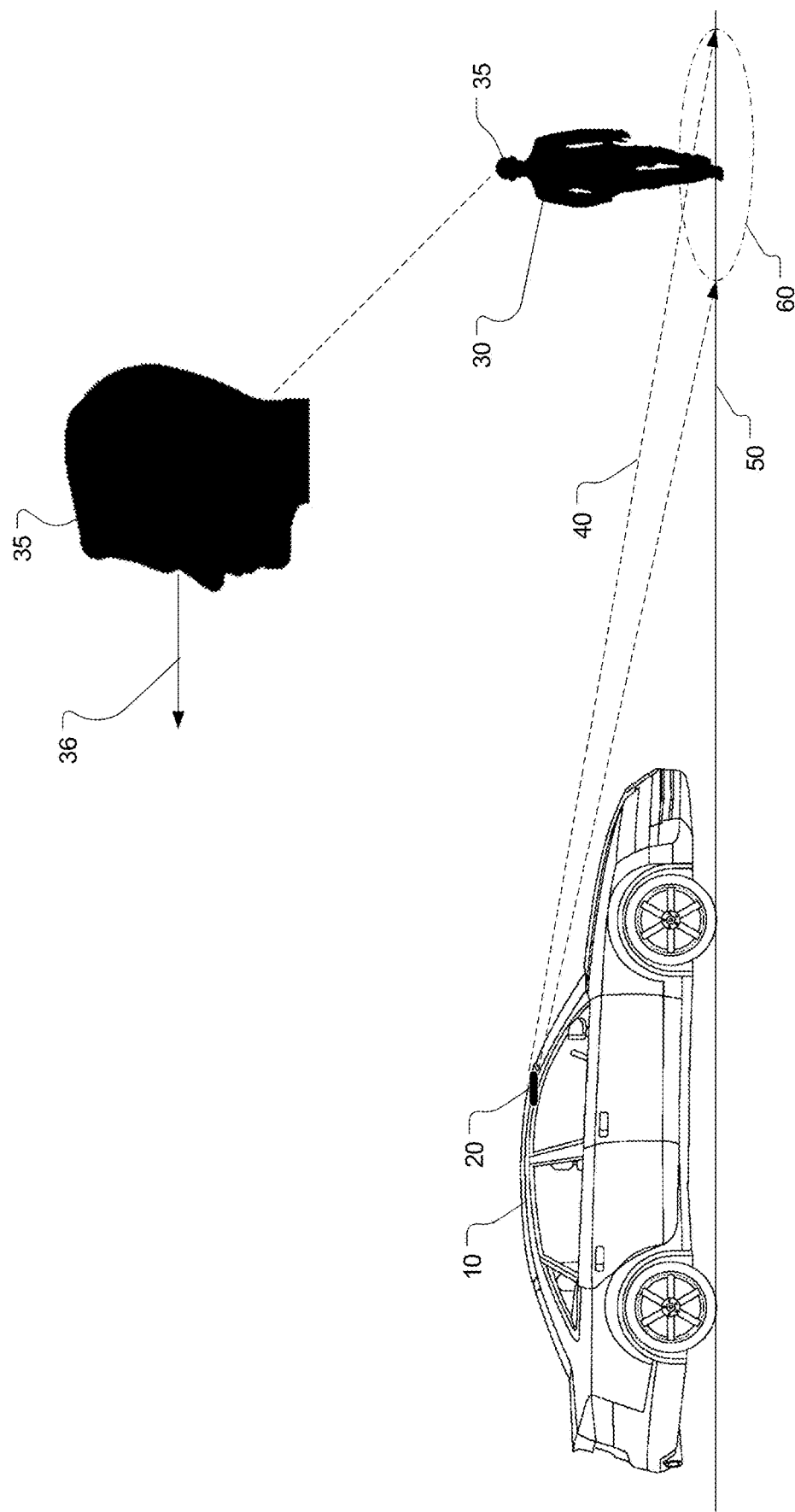
FIG. 24 depicts an autonomous vehicle projecting a solid light beneath a pedestrian in response to detecting that the pedestrian is looking at the vehicle.

As depicted by way of example in FIGS. 22-24, the AV 10 may adjust, diminish or shut off the light beam in response to the camera of the autonomous vehicle detecting pedestrian reactions (or cyclist reactions). For example, in one embodiment, the processor of the autonomous vehicle cooperates with a camera to detect a face direction of the pedestrian or cyclist. In this embodiment, the processor uses the face direction to determine whether to project a strobing beam of light or a solid beam of light. For example, as shown in FIG. 22, the processor of the autonomous vehicle causes the light projector to change from the strobing beam of light to the solid beam of light in response to detecting a gesture (gesticulation, hand wave, arm wave, etc.) made by the pedestrian 30 or cyclist. As another example, as shown in FIG. 23-24, the processor of the AV causes the light projector to change from the strobing beam of light (FIG. 23) to the solid beam of light (FIG. 24) in response to detecting that a face direction 36 of a face 35 of the pedestrian or cyclist has changed to point toward the autonomous vehicle.

The light projectors 20, 22 may be forward-facing, rearward-facing and/or side-facing. For example, the light projectors may be roof-mounted, mirror-mounted and/or side-mounted. The light projectors may be fixed or rotatable.

Figure 25:
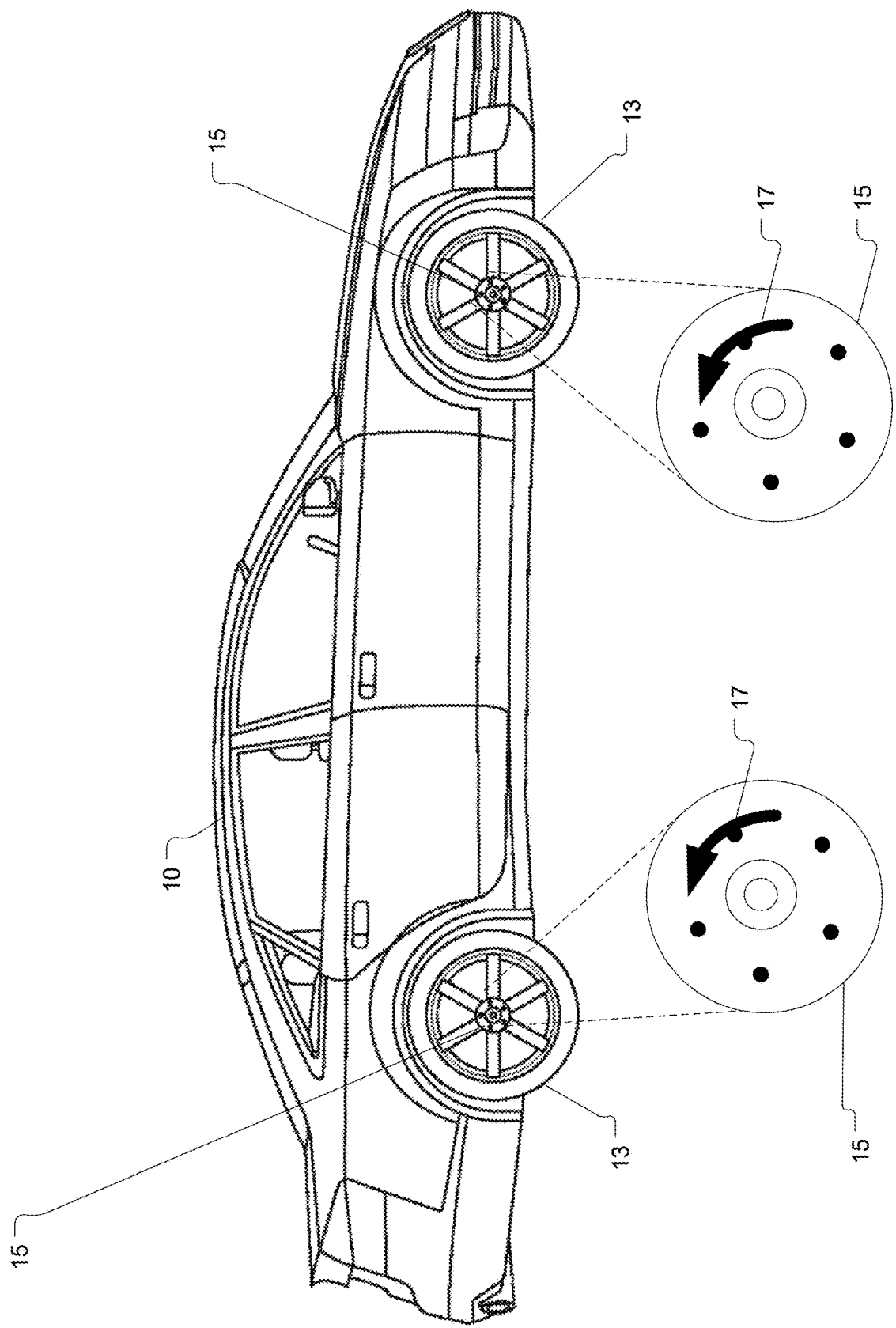
FIG. 25 depicts an autonomous vehicle having wheel hub displays for displaying a drive direction for the vehicle, wherein the drive direction is rearward in this example.
Figure 26:
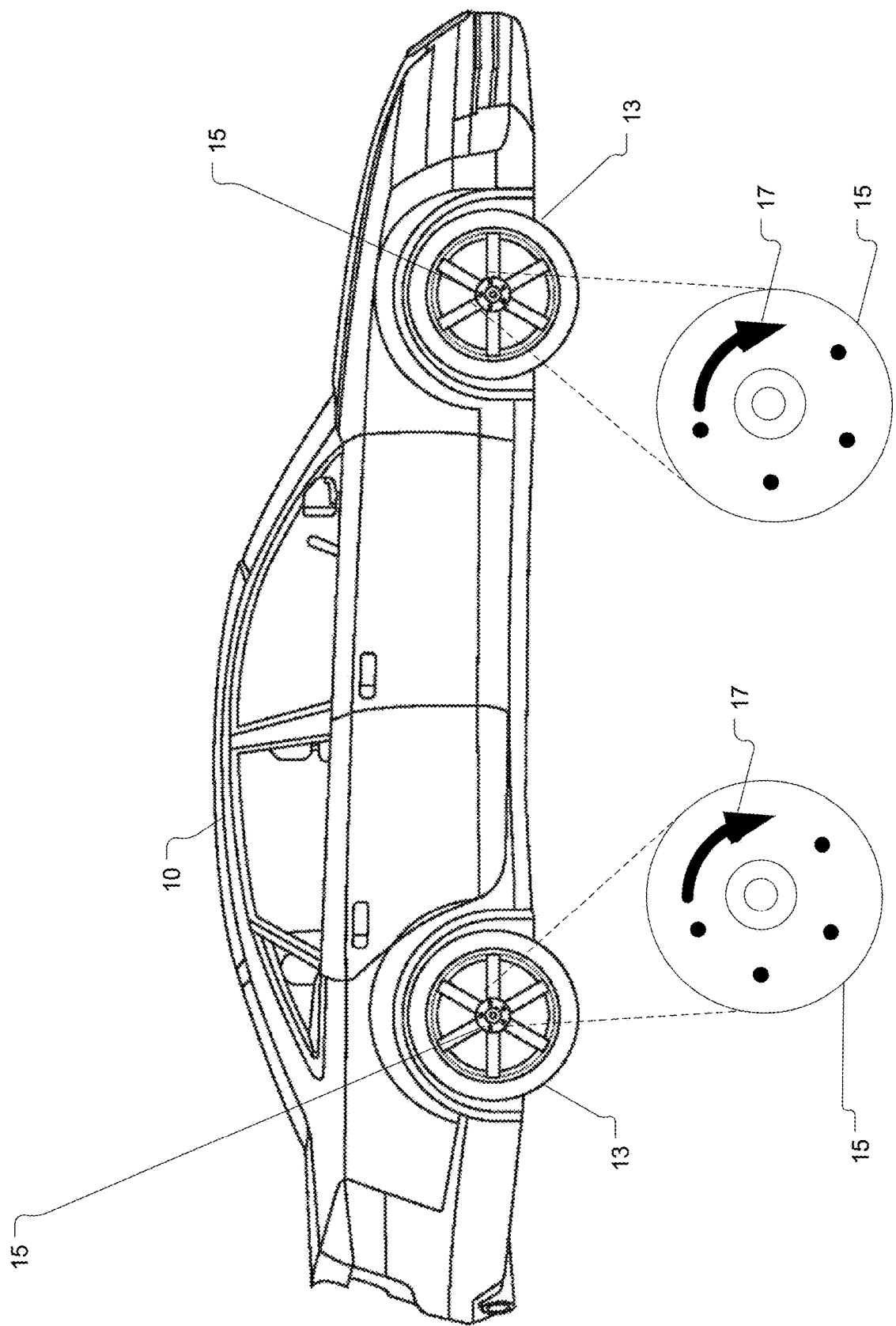
FIG. 26 depicts an autonomous vehicle having wheel hub displays for displaying a drive direction for the vehicle, wherein the drive direction is forward in this example.

In the embodiment depicted in FIG. 25, the autonomous vehicle 10 has wheel hub displays 15 mounted to the wheels 13 for displaying drive information 17. In this example, the wheel hub displays 15 are axially centered or rotationally decoupled from the 13 wheels to remain in a fixed (e.g. substantially horizontal) orientation when the wheels 13 rotate. The wheel hub displays 15 may include any suitable type of display, e.g. LED, LCD, etc. The drive information 17 in this example are directional indicators, e.g. curved arrows showing the intended direction of rotation of the wheels. This may be used to forewarn a pedestrian or cyclist which way the vehicle is about to move, e.g. forward or backward. In FIG. 25, the curved arrows indicate the AV is about to back up. In FIG. 26, the curved arrows indicate the AV is about to move forward.

Figure 27:
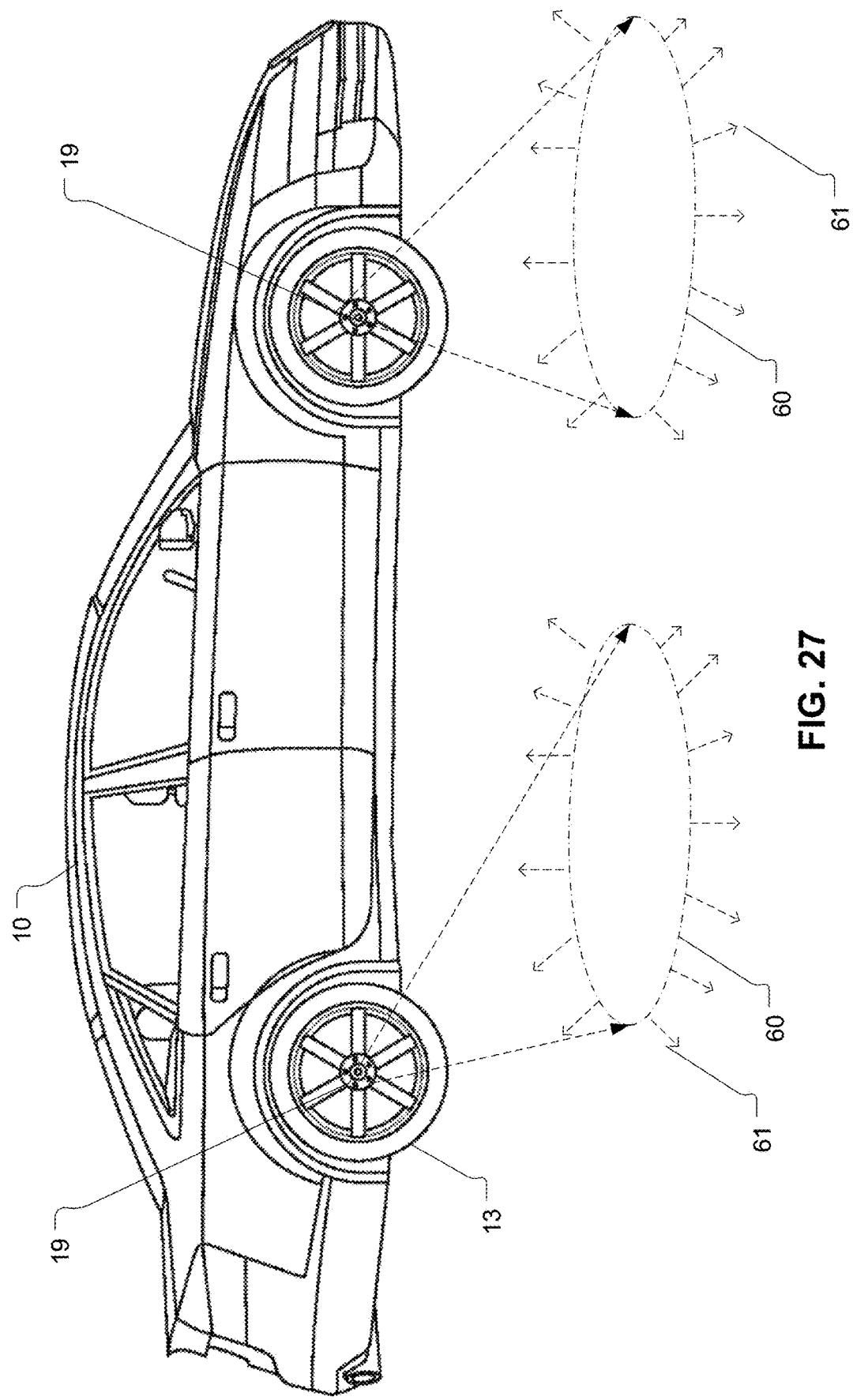
FIG. 27 depicts an autonomous vehicle having wheel hub light projectors for projecting light on the road surface from the wheel hub light projectors.

In the embodiment depicted in FIG. 27, the autonomous vehicle 10 comprises wheel hub projectors 19 for projecting drive information on the road surface or illuminating the zone beneath a pedestrian or cyclist. The wheel hub projectors 19 may project beams to provide illuminated shapes 60 and optionally also flashing shapes 61.

Figure 28:
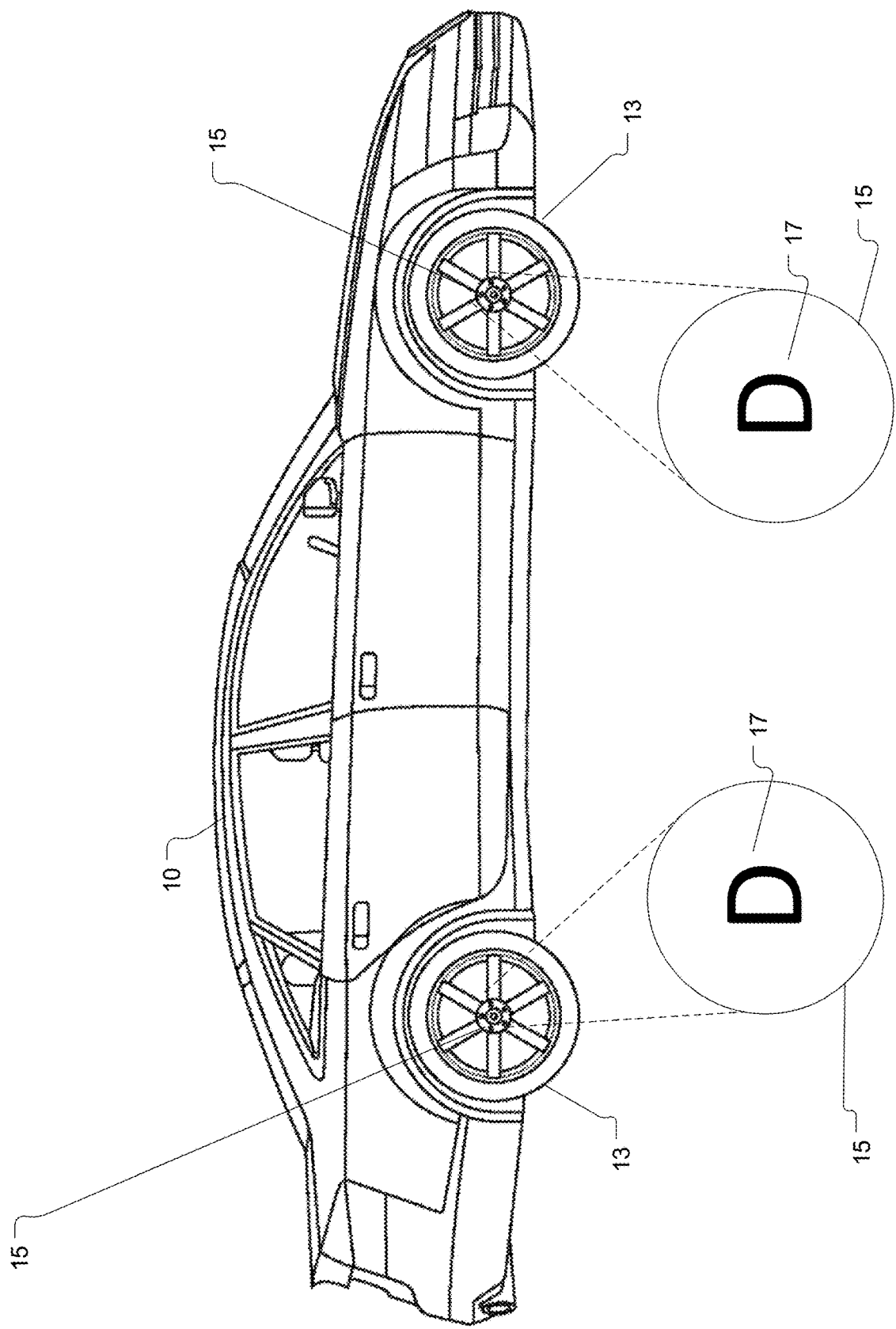
FIG. 28 depicts an autonomous vehicle having wheel hub displays for displaying a drive mode for the vehicle, wherein the wheel hub displays the drive mode as "D" (for drive) in this example.
Figure 29:
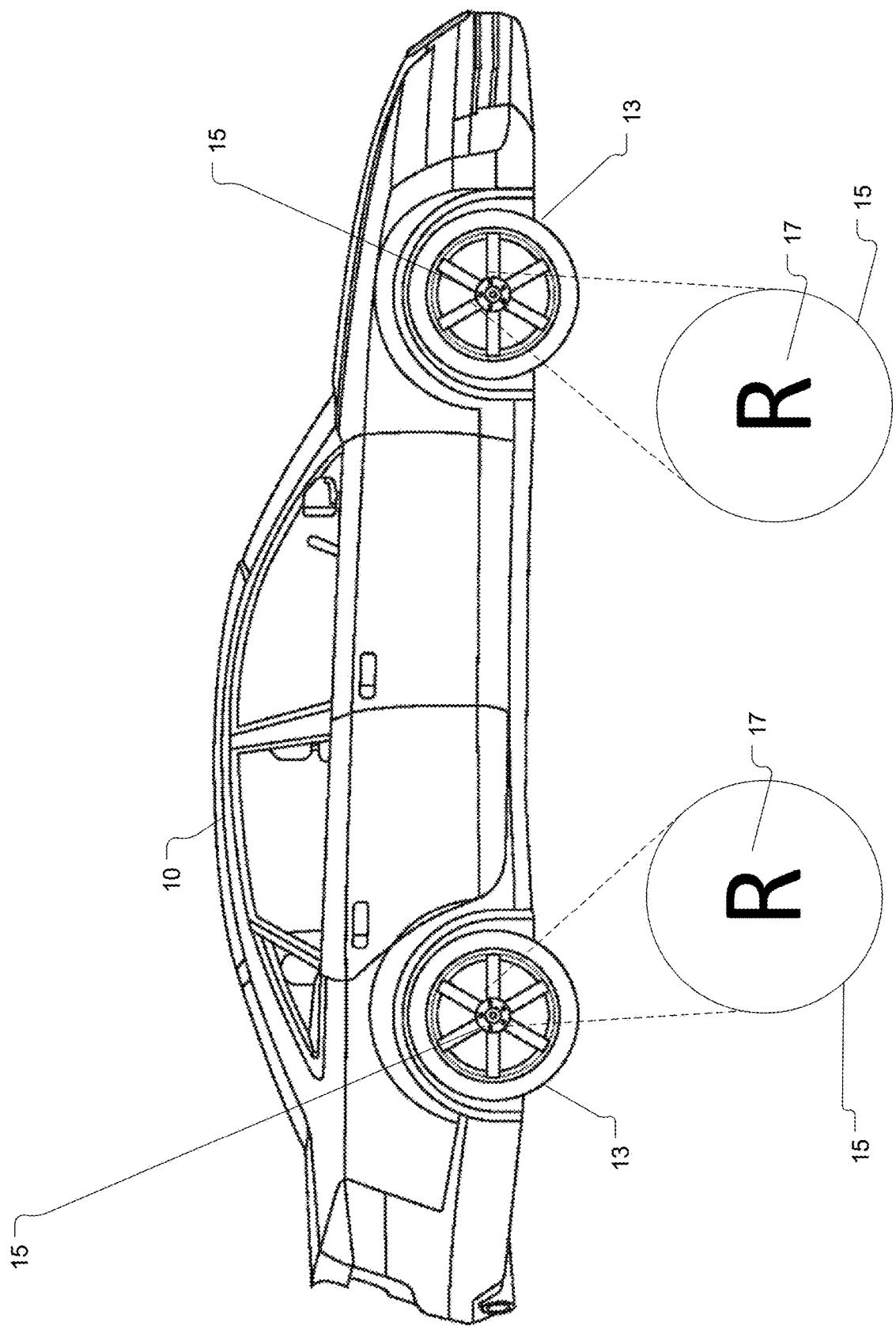
FIG. 29 depicts an autonomous vehicle having wheel hub displays for displaying a drive mode for the vehicle, wherein the wheel hub displays the drive mode as "R" (for reverse) in this example.
Figure 30:
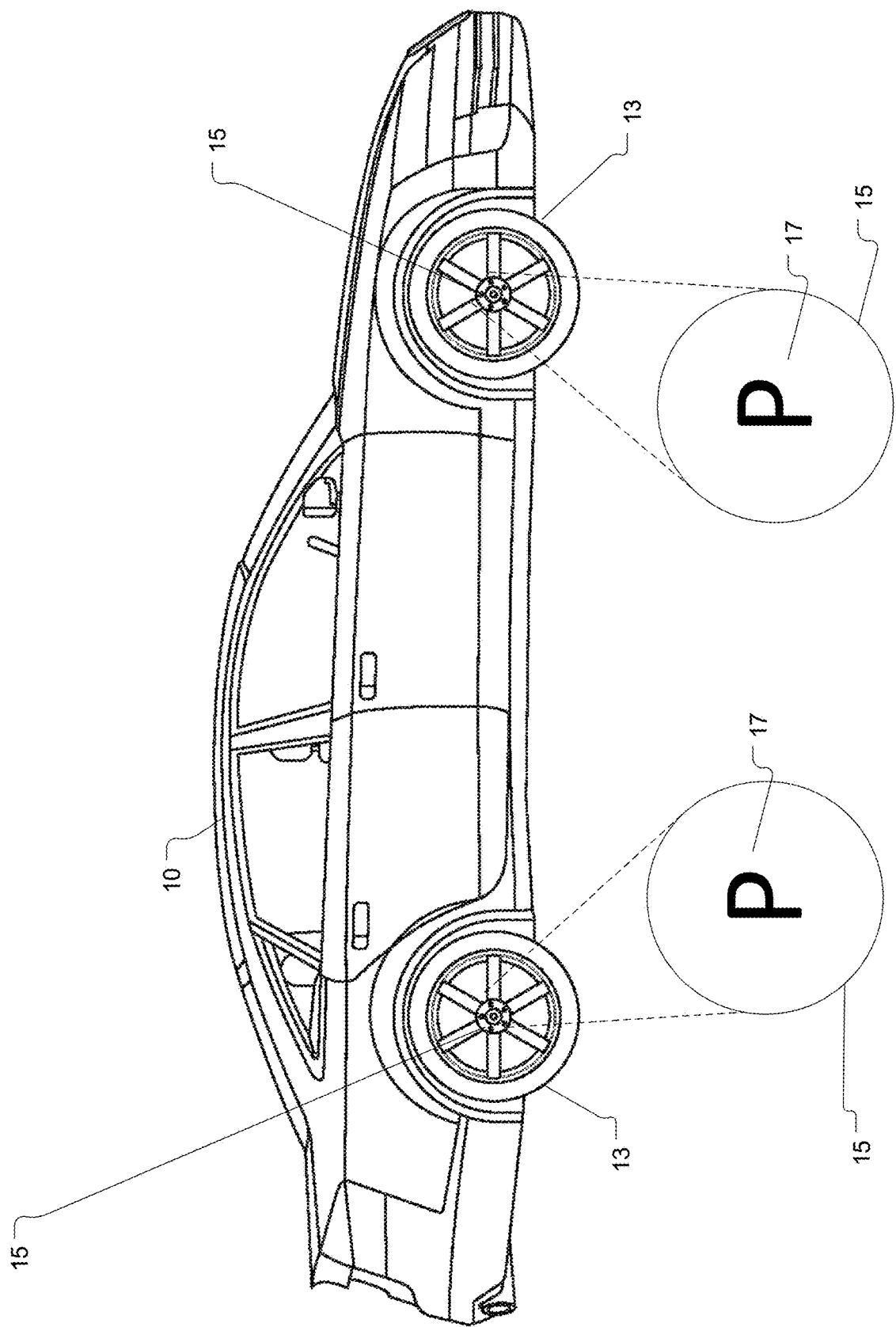
FIG. 30 depicts an autonomous vehicle having wheel hub displays for displaying a drive mode for the vehicle, wherein the wheel hub displays the drive mode as "P" (for park) in this example.

As shown by way of example in FIGS. 28-30, the wheel hub displays (or alternatively wheel hub projectors) may display various forms of drive information. For example, as shown in FIGS. 28-30, the wheel hub displays 15 may display drive information 17 that includes a drive mode for the vehicle (e.g. a vehicle transmission mode). For example, FIG. 28 depicts an autonomous vehicle 10 having wheel hub displays for displaying a drive mode for the vehicle, wherein the wheel hub displays the drive mode as "D" (for drive). FIG. 29 depicts an autonomous vehicle 10 having wheel hub displays for displaying a drive mode for the vehicle, wherein the wheel hub displays the drive mode as "R" (for reverse) in this example. FIG. 30 depicts an autonomous vehicle 10 having wheel hub displays for displaying a drive mode for the vehicle, wherein the wheel hub displays the drive mode as "P" (for park) in this example.

Figure 31:
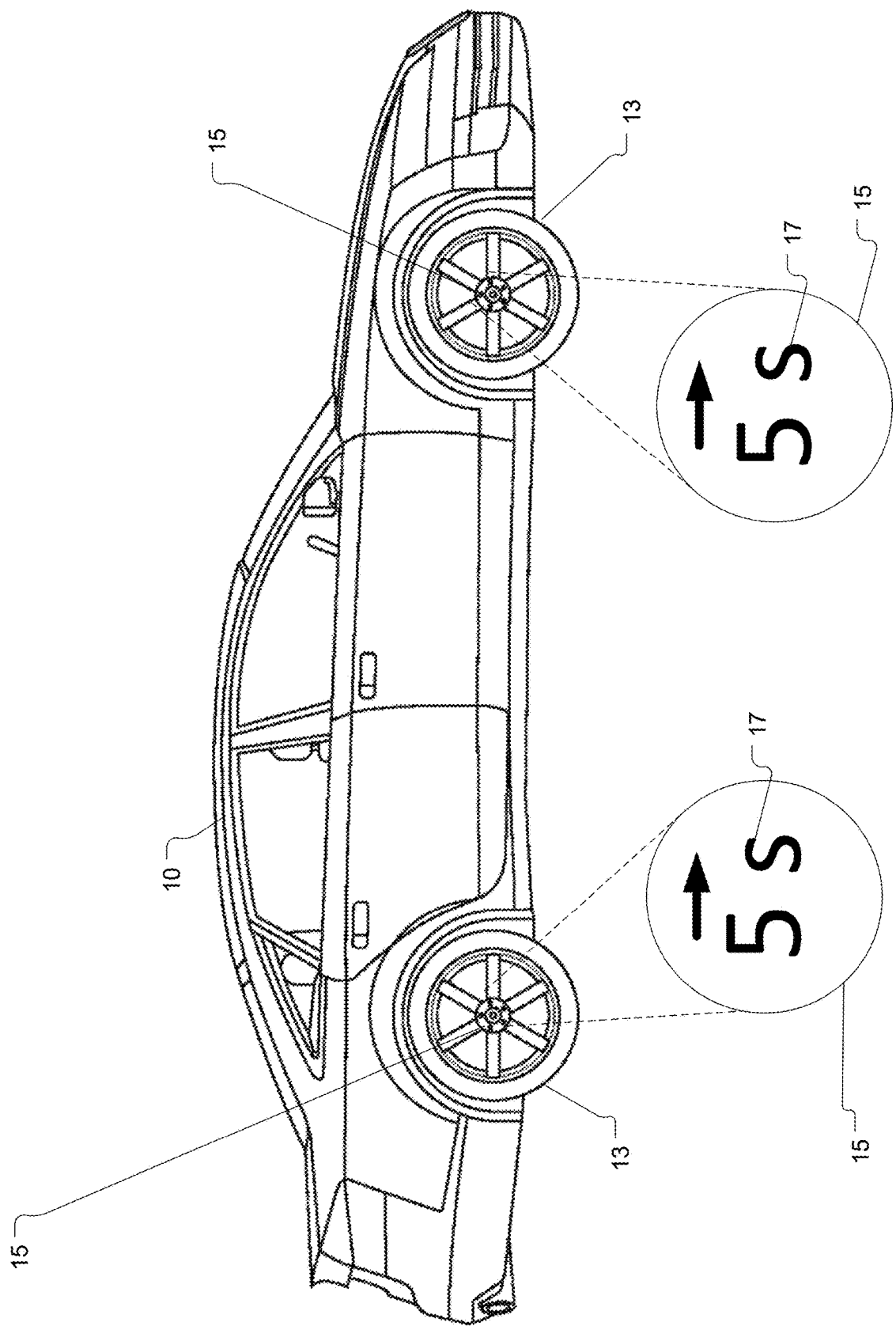
FIG. 31 depicts an autonomous vehicle having wheel hub displays for displaying drive information for the vehicle, wherein the drive information indicates that the vehicle will drive forward in 5 seconds in this example.
Figure 32:
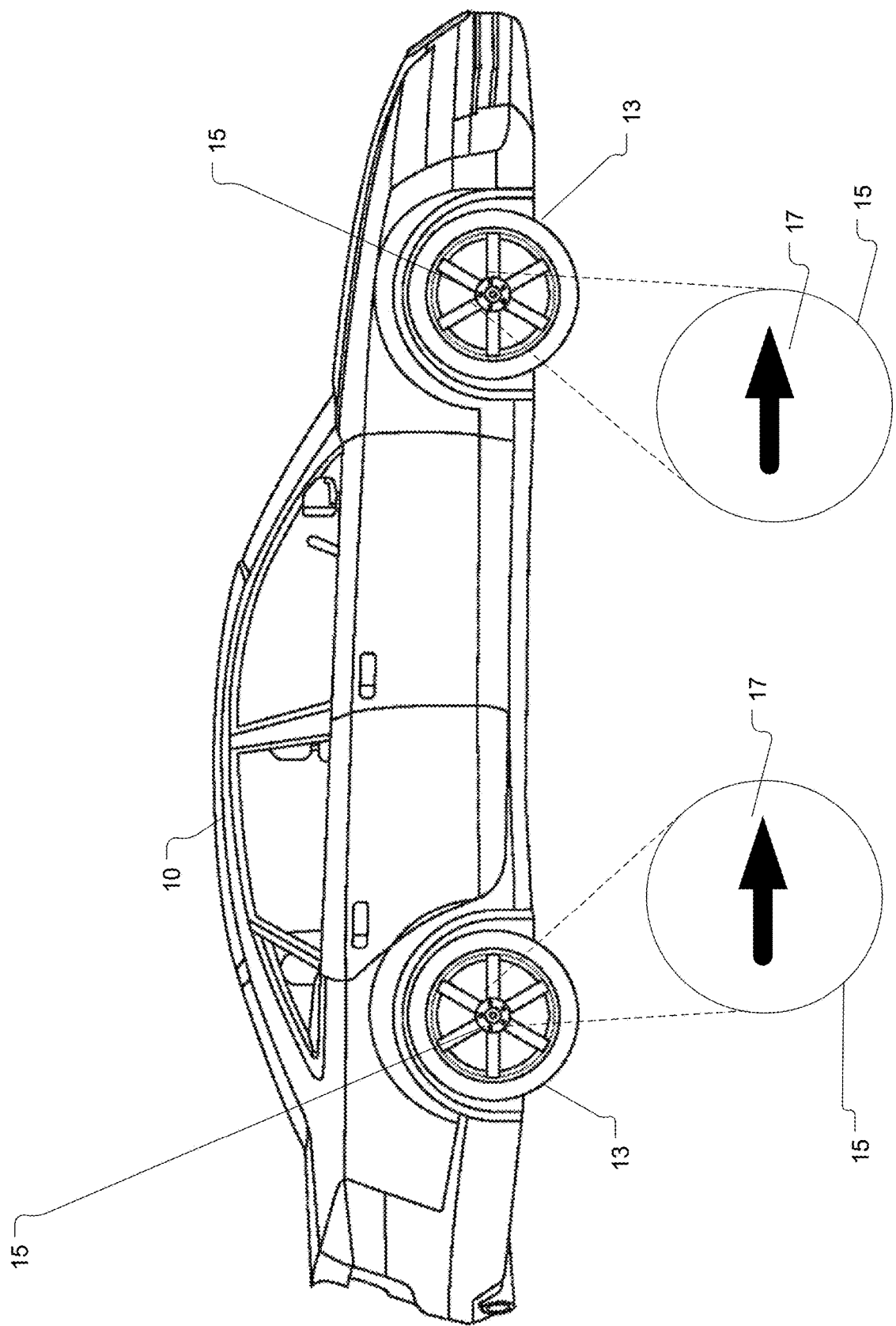
FIG. 32 depicts an autonomous vehicle having wheel hub displays for displaying drive information for the vehicle, wherein the drive information indicates that the vehicle will drive forward in this example.
Figure 33:
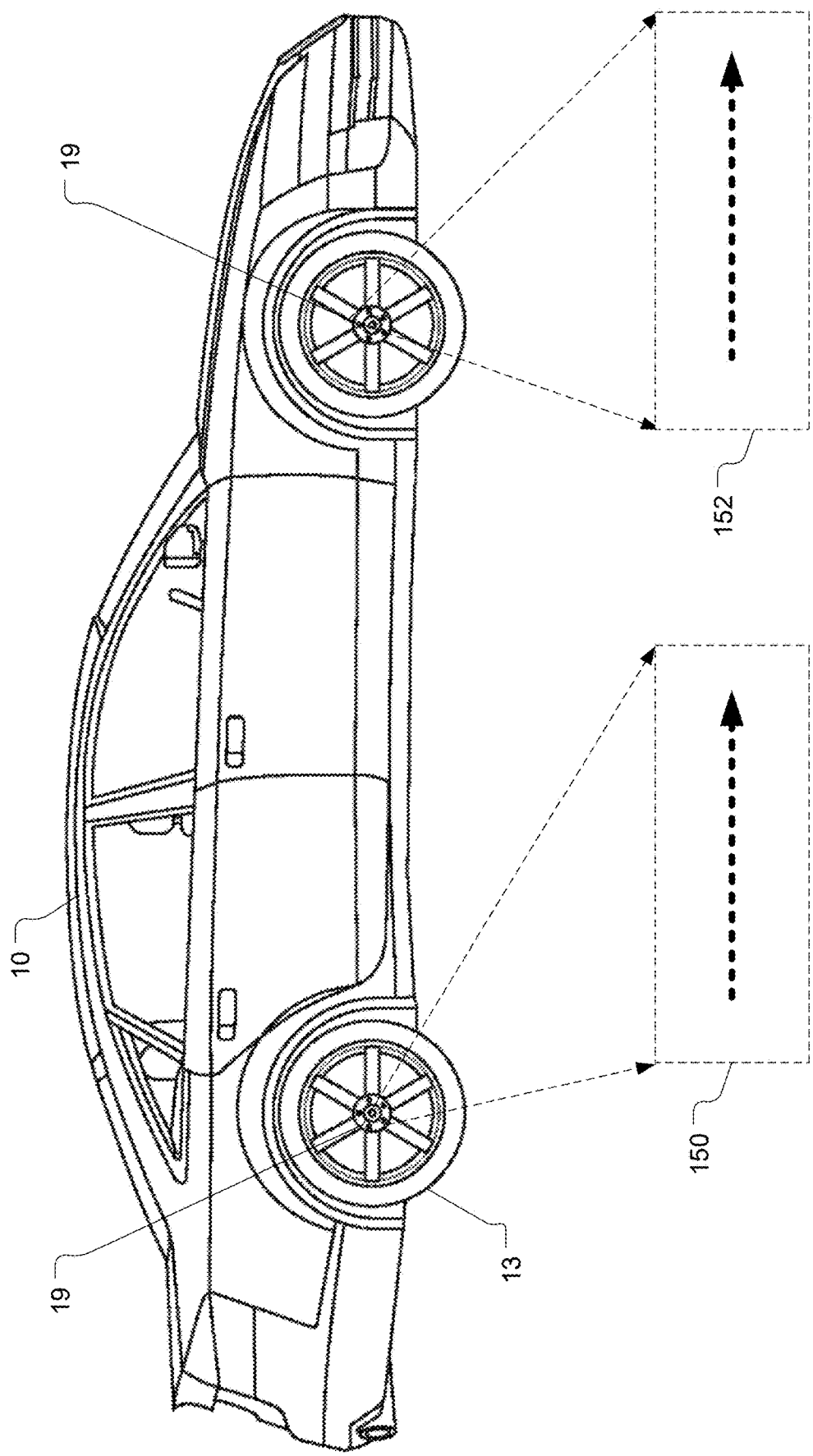
FIG. 33 depicts an autonomous vehicle having wheel hub light projectors for projecting drive information on the road surface.
Figure 34:
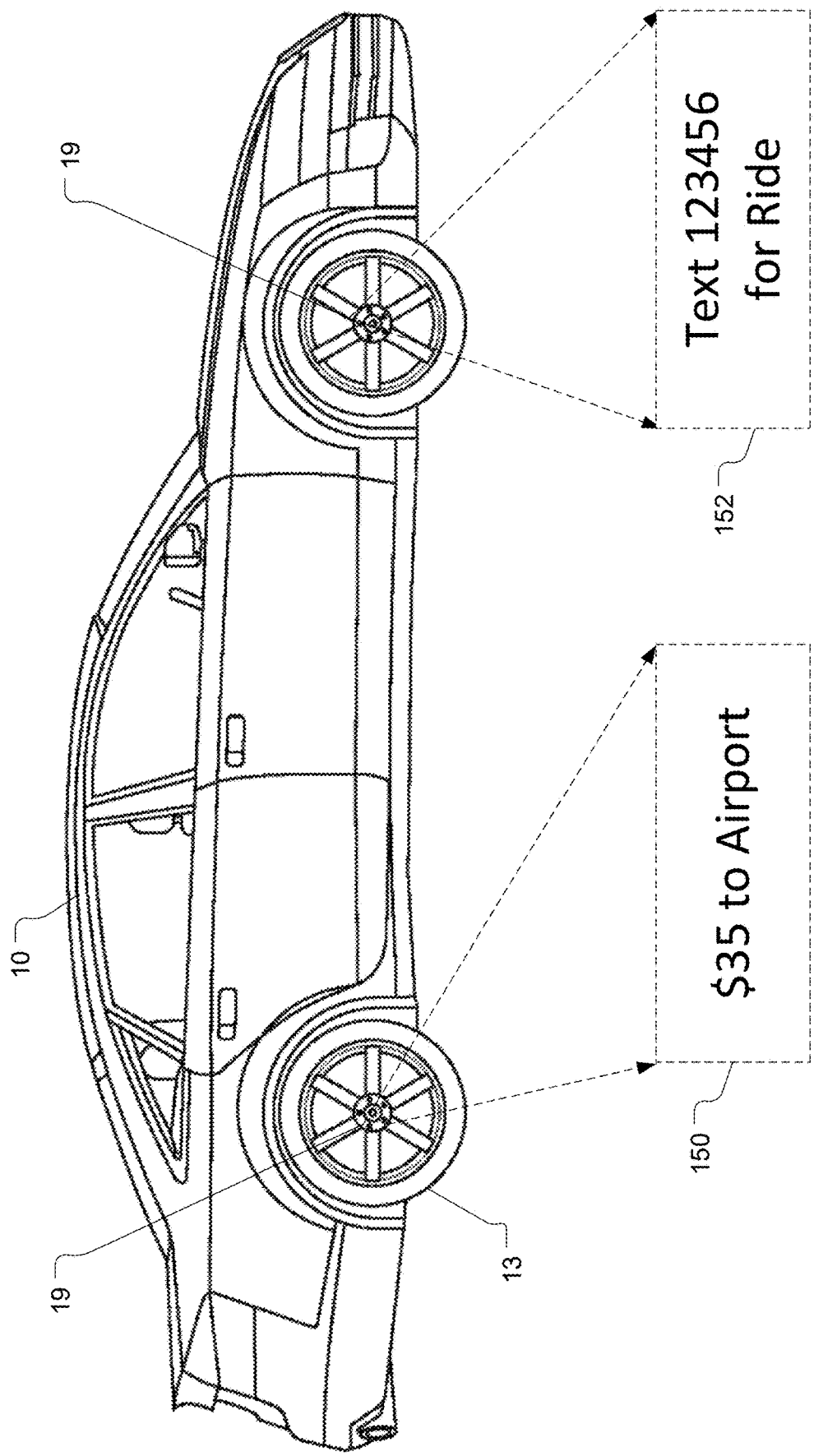
FIG. 34 depicts an autonomous vehicle having wheel hub light projectors for projecting advertising on the road surface.

Further examples of drive information displayed by wheel hub displays 15 are depicted in FIGS. 31-32. As one example, FIG. 31 depicts an autonomous vehicle 10 having wheel hub displays 15 for displaying drive information 17 for the autonomous vehicle 10, wherein the drive information 17 includes an intended vehicle direction and a departure time when the vehicle will begin to move. In the example of FIG. 31, both of the wheel hub displays 15 display the drive information 17 that indicates that the vehicle will drive forward (by the arrow) in 5 seconds. In a variant, the drive information 17 may be displayed on only one of the wheel hub displays 15. In a further variant, the vehicle may have only a front wheel hub display or a rear wheel hub display. As another example, FIG. 32 depicts an autonomous vehicle 10 having wheel hub displays 15 that display only an arrow as the drive information 17 for the vehicle. For example, the drive information 17 in this example indicates that the vehicle will drive forward. In another embodiment, wheel hub projectors 19 project the drive information 17 on the road surface or pavement. In the example of FIG. 33, the front and rear wheel hub projectors 19 project front and rear images 150, 152 on the pavement. The images provide drive information. The drive information may be an arrow pointing in an intended direction of travel. The direction of travel informs a pedestrian or cyclist as to the AV's intention. This enables the pedestrian or cyclist to move safely behind or in front of the AV by knowing which way the AV intends to go. In another embodiment, the wheel hub projectors 19 may project first and second images 150, 152 that contain advertising or other useful commercial or operational information. For example, an AV operating as a ride-sharing vehicle (Uber, Lyft, etc.) or as a taxi or limousine could advertise a price or fare, availability, or other information. In the particular example of FIG. 34, the AV projects a first image with a price of a fare to a destination (e.g. airport in this example). The image 152 projects information to initiate the ride, e.g. a number to send via SMS to initiate the ride to the destination.

Figure 35:
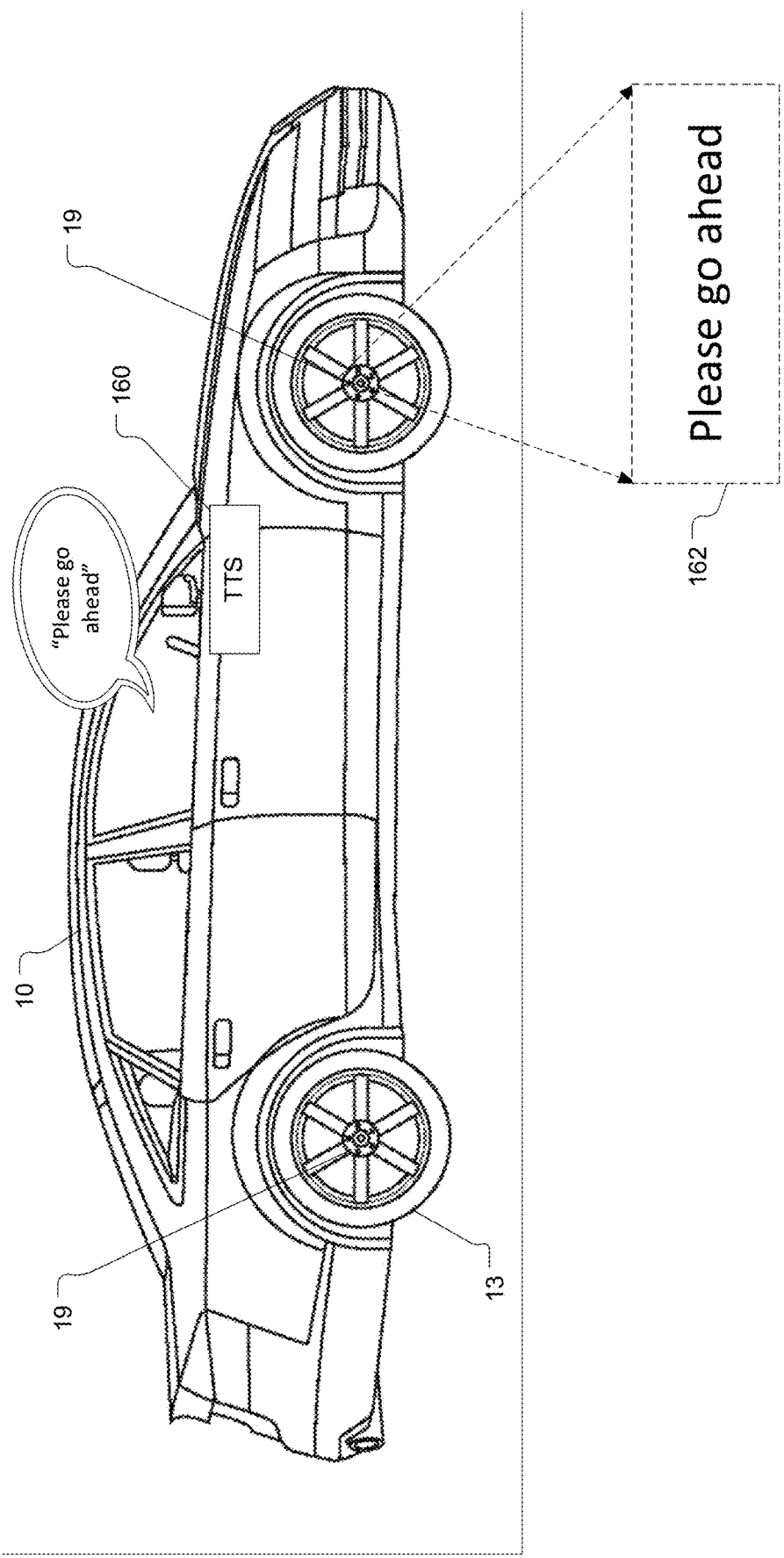
FIG. 35 depicts an autonomous vehicle having a wheel hub light projector for projecting a pedestrian message on the road surface.

In one embodiment, as shown by way of example in FIG. 35, the autonomous vehicle 10 comprises a text-to-speech module 160 to recognize speech from a user (driver or rider) in the autonomous vehicle 10 and to convert the speech into the message 162 to be projected onto the road surface 50. The message is shown projected by the wheel hub projector 19 although it will be appreciated that the message may be projected by any other light projector 20, 22 on the AV. This embodiment enables a driver, rider or other such user to communicate with a pedestrian 30 or cyclist 31 by speaking aloud a message (e.g. "please go ahead") which is then projected onto the road surface for the pedestrian 30 or cyclist 31 to read.

Figure 36:
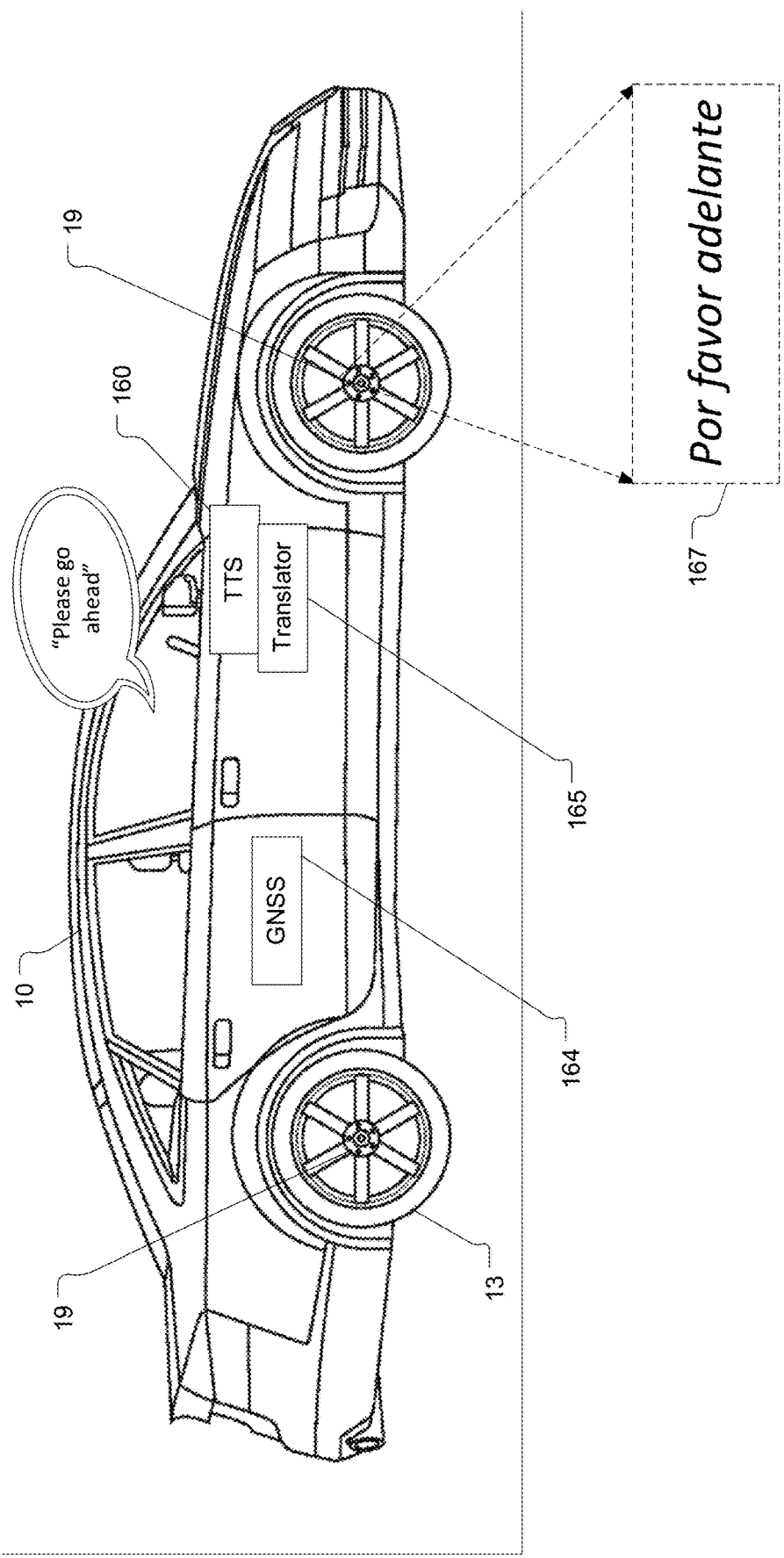
FIG. 36 depicts an autonomous vehicle having a wheel hub light projector for projecting an automatically translated pedestrian message on the road surface or pavement.

In the embodiment depicted in FIG. 36, the autonomous vehicle 10 comprises a global navigation satellite system (GNSS) 164 to determine a current location of the autonomous vehicle 10 to enable the processor to determine a local language based on the current location. In the embodiment of FIG. 36, the AV 10 further includes a translator 165 (e.g. a computerized translation module) to translate the speech in a user language into a translated message 167 in the local language for projecting in the local language to the pedestrian or cyclist. For example, if the rider or driver of the AV 10 speaks aloud "Please go ahead" in English, the AV will detect that it is traveling in Mexico using the GNSS 164 and will translate the English words into Spanish, i.e. the local language, and will project the words as the translated message ("Por favor adelante") onto the road surface.

Figure 37:
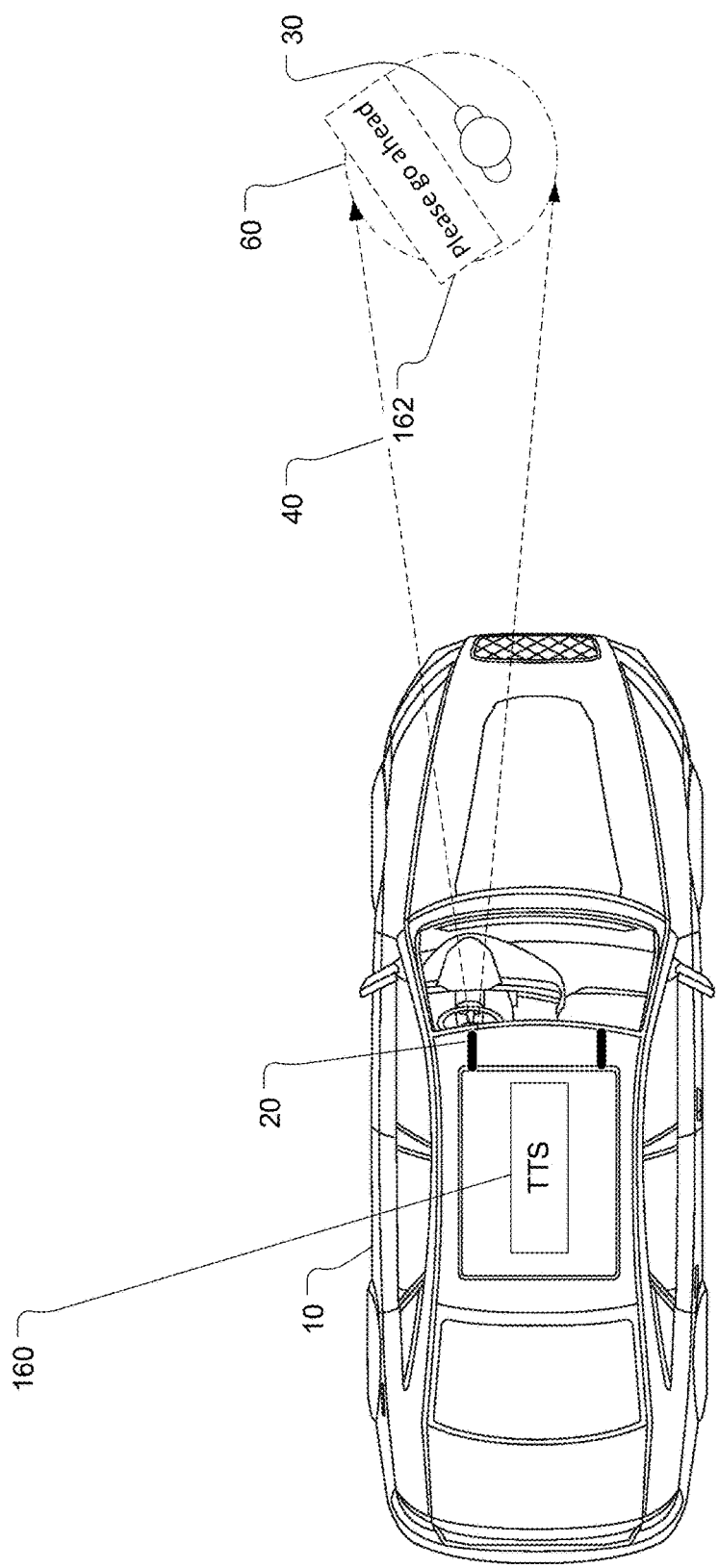
FIG. 37 depicts an autonomous vehicle having a light projector for projecting a pedestrian message on an illuminated circle on the pavement beneath the pedestrian.
Figure 38:
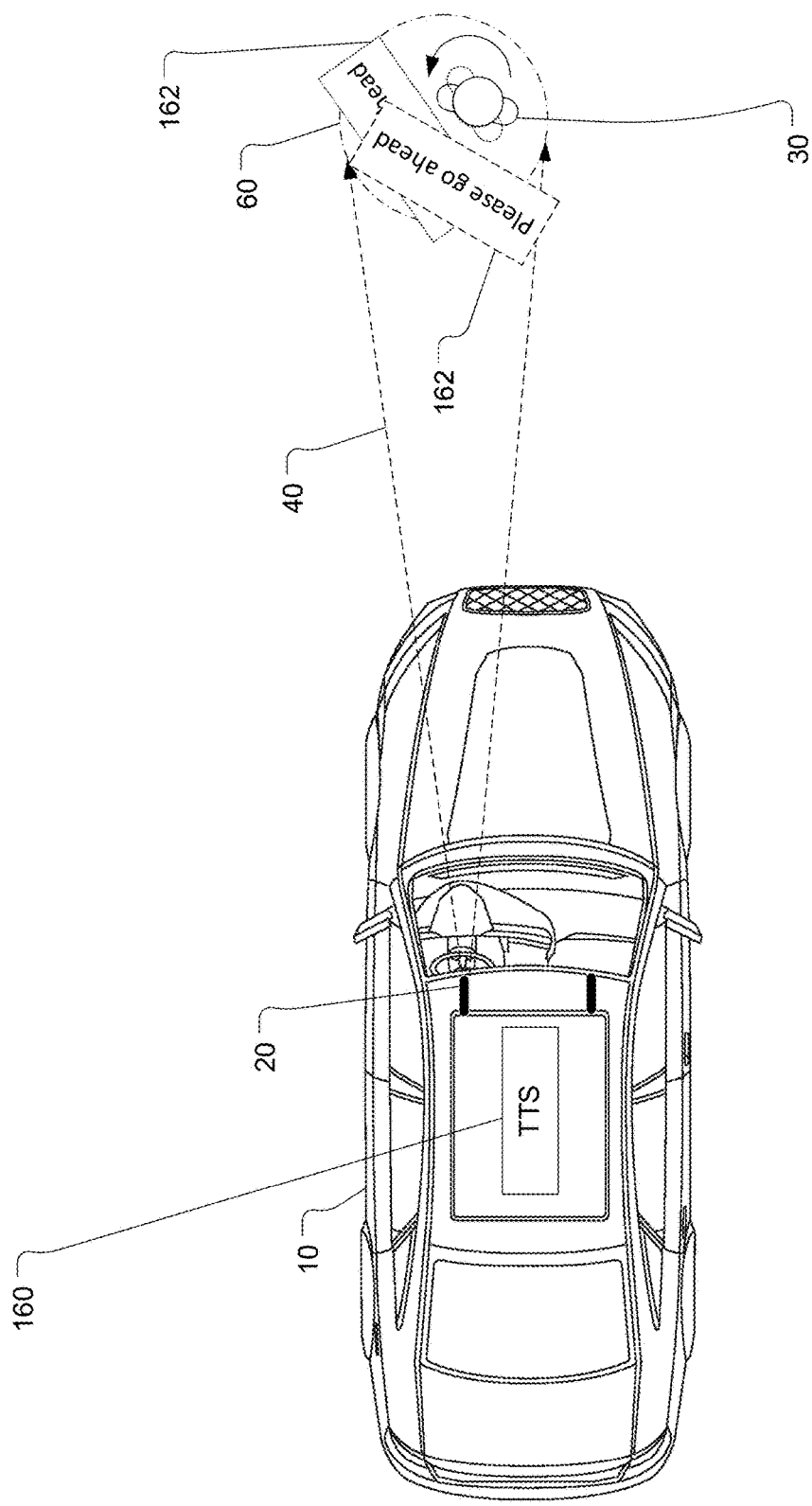
FIG. 38 depicts an autonomous vehicle having a light projector that rotates the pedestrian message as the pedestrian rotates.
Figure 39:
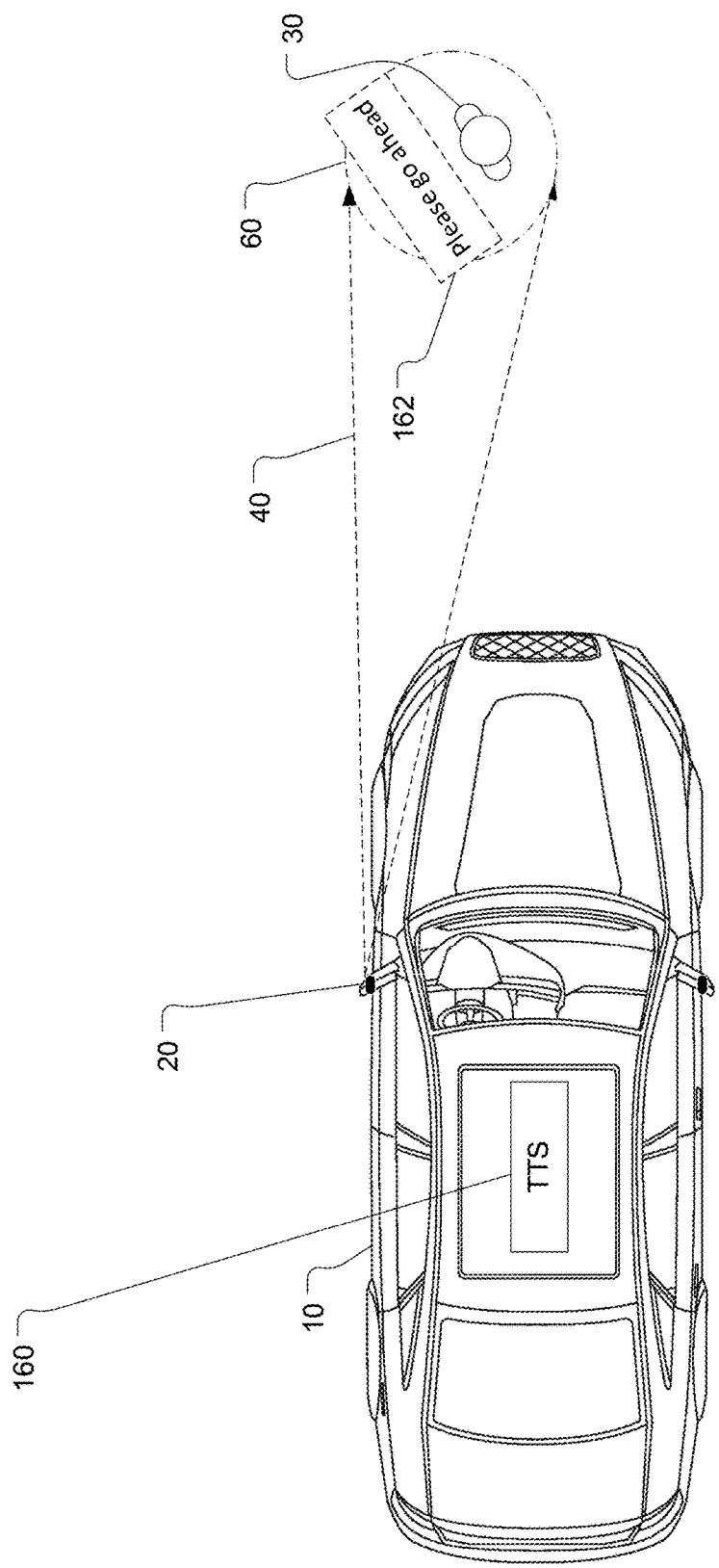
FIG. 39 depicts an autonomous vehicle having mirror-mounted light projectors.

In the embodiment of FIG. 37, the autonomous vehicle 10 uses the light projector to project a pedestrian message 162 on an illuminated shape 60 (e.g. circle) on the pavement 50 beneath the pedestrian 30. The pedestrian message 162 may be part of the illuminated shape 60 or separate from it. Optionally, as shown by way of example in FIG. 37, the pedestrian message is oriented based on the orientation of the pedestrian. Optionally, as depicted by way of example in FIG. 38, the autonomous vehicle 10 has a light projector that rotates the pedestrian message 162 as the pedestrian 30 rotates so that the message is always properly oriented in front of the pedestrian 30. The message 162 may be projected from a roof-mounted projector 20 as shown in FIGS. 37-38. Alternatively, the message 162 may be projected from a mirror-mounted projector 20 as shown in FIG. 39.

Figure 40:
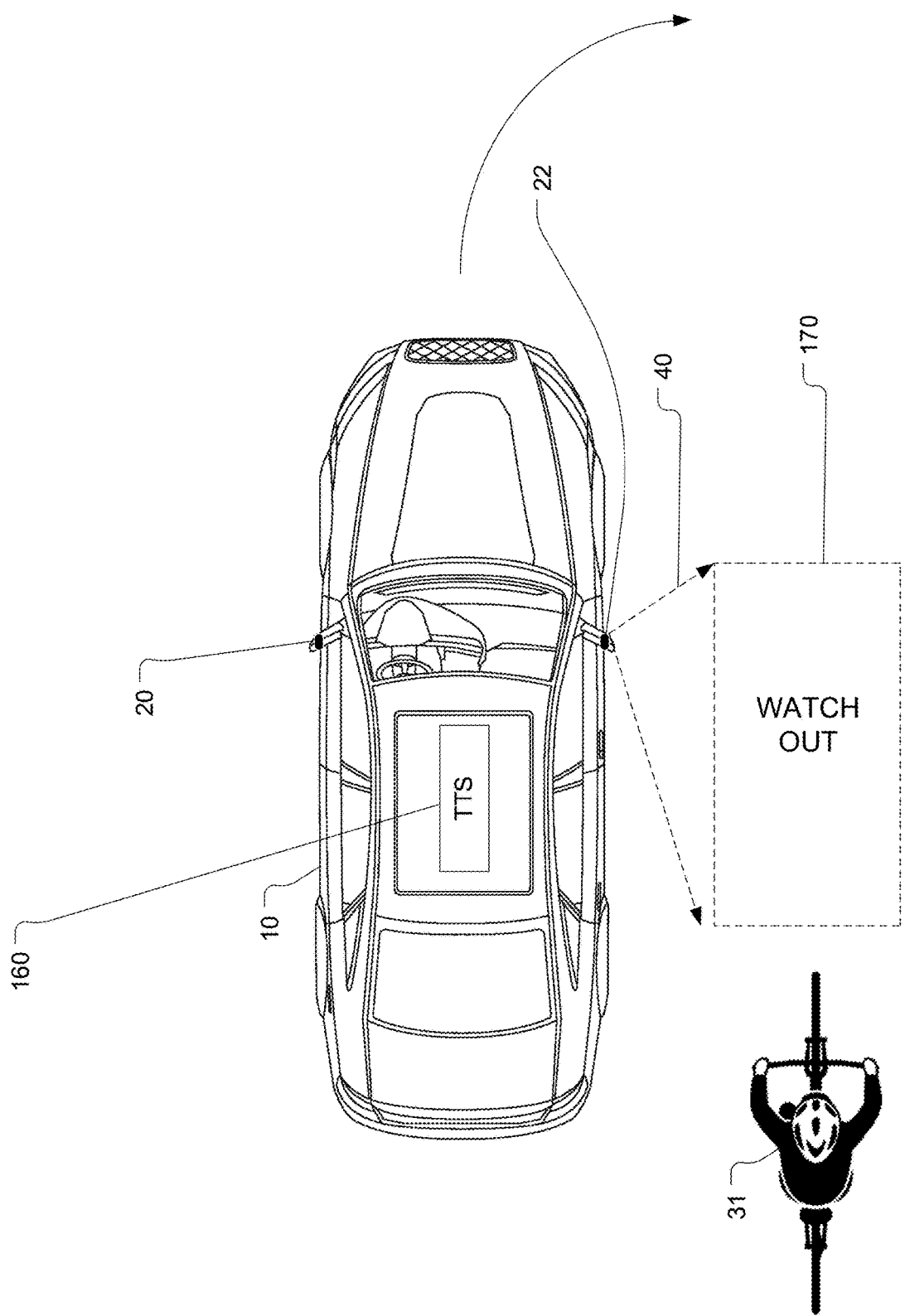
FIG. 40 depicts an autonomous vehicle projecting a vehicle turn warning onto the pavement in response to detecting a cyclist.

FIG. 40 depicts an autonomous vehicle 10 projecting a vehicle turn warning 170 onto the pavement in response to detecting a cyclist 31. In one embodiment, the processor of the AV 10 only projects the warning if a notification criterion is met. The notification criterion may be based on relative position (i.e. close how the cyclist 31 is to the vehicle 10) and/or their relative velocities and directions of travel. In one variant, the AV 10 detects that the cyclist 31 is within a danger zone based on an anticipated right turn of the AV 10. The cyclist 31 meets the notification criterion in this example. The AV 10 then projects the warning 170. The warning may be projected for a predetermined time. The warning may be removed when the notification criterion is no longer met, e.g. when the relative position of the cyclist 31 and vehicle 10 has changed.

Figure 41:
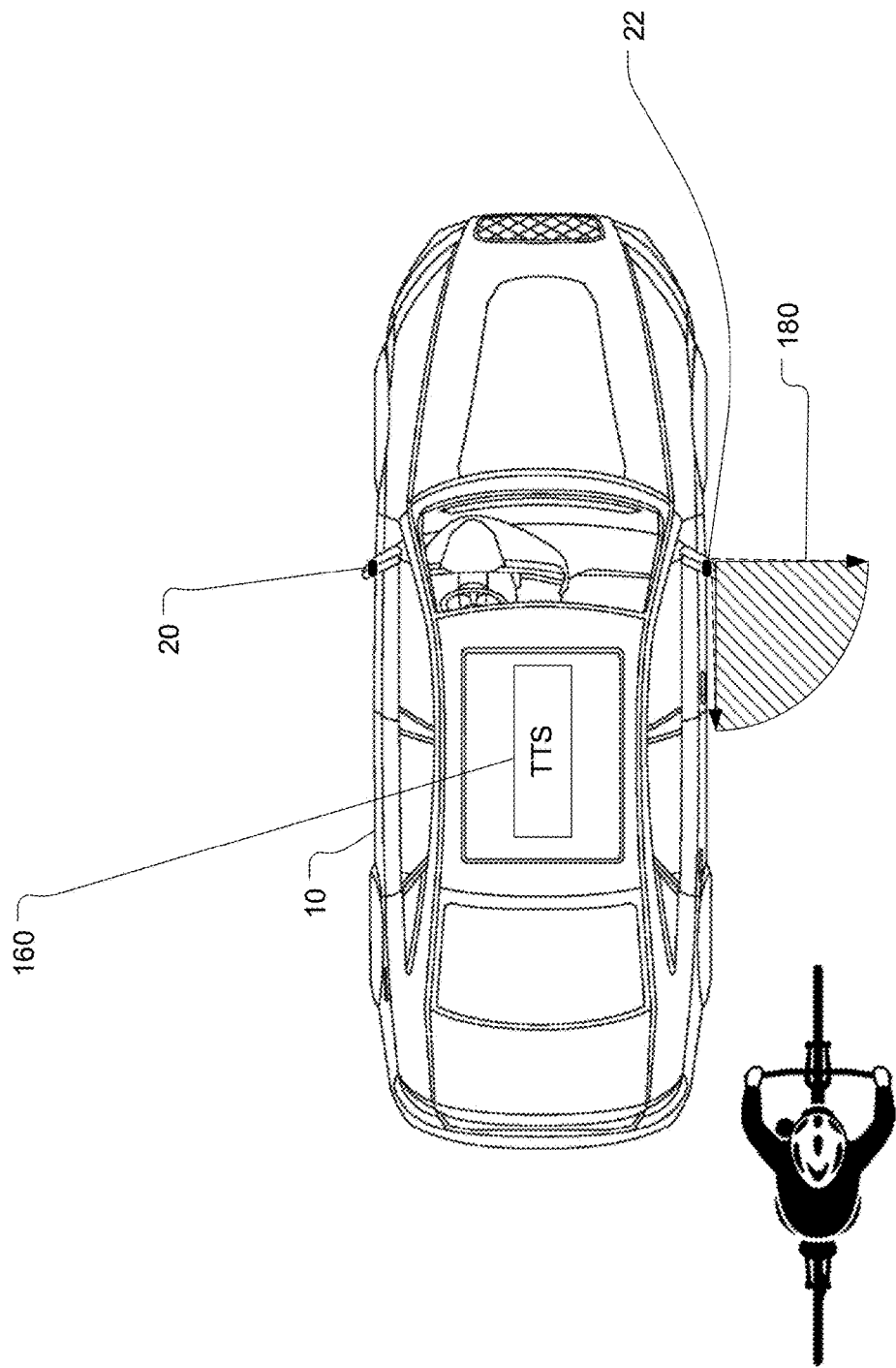
FIG. 41 depicts an autonomous vehicle projecting a door opening warning onto the pavement in response to detecting a cyclist.
Figure 42:
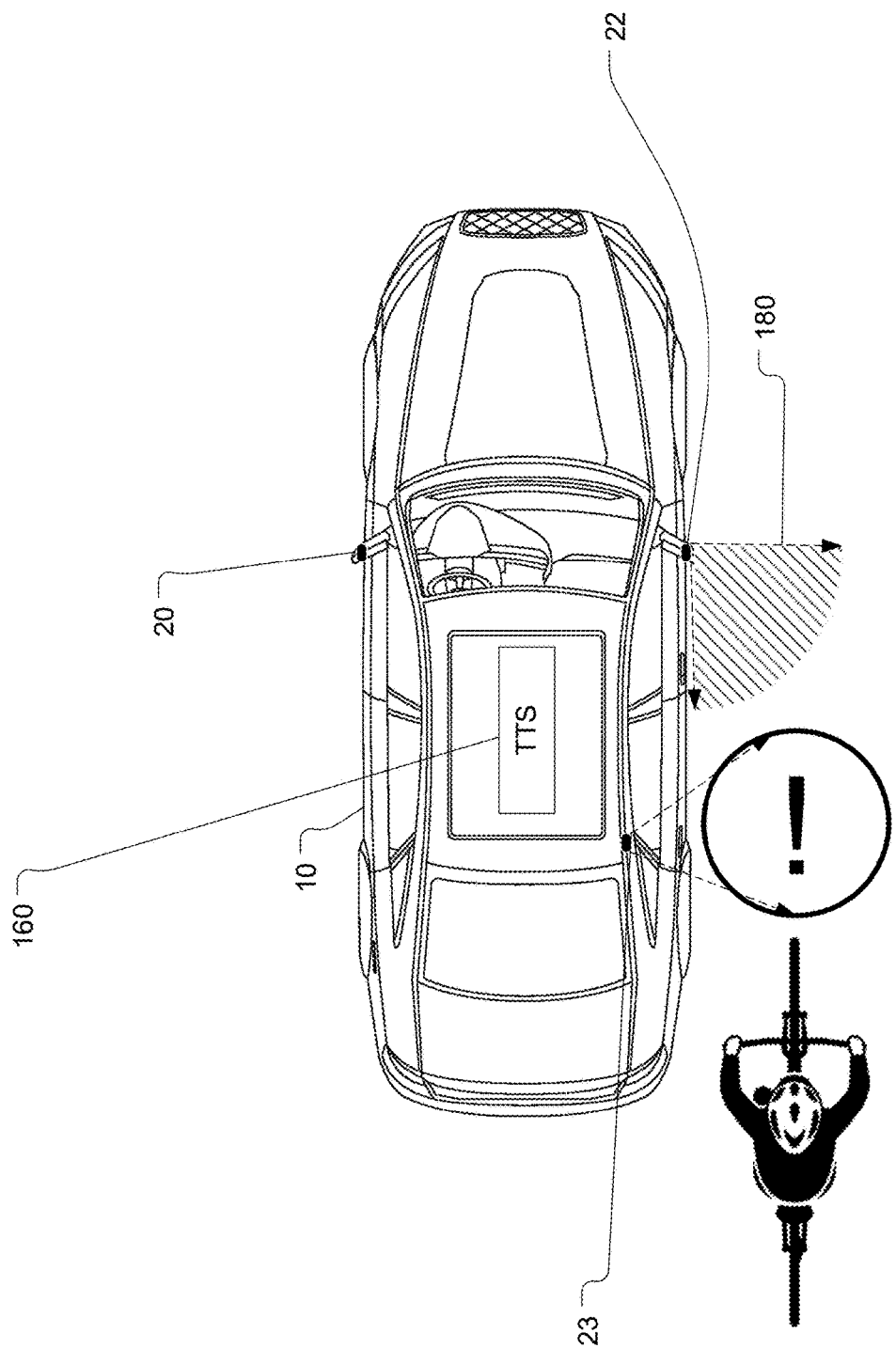
FIG. 42 depicts an autonomous vehicle projecting onto the pavement a first door opening warning from a mirror-mounted projector in response to detecting a cyclist and also projecting a further alert symbol using a body-mounted projector.

FIG. 41 depicts an autonomous vehicle 10 projecting a door opening warning 180 onto the pavement in response to detecting a cyclist 31. The door opening warning 180 presents the actual area over which the door will move when opening. In a further variant, as shown by way of example in FIG. 42, the autonomous vehicle 10 projects onto the pavement a first door opening warning from a mirror-mounted projector in response to detecting a cyclist 31 and also projects a further alert symbol using a body-mounted projector. In one variant, the AV projects the warning 180 only in response to determining that the door is imminently going to be opened. This determination may be based on arrival at a destination coupled with knowledge of where the driver or passenger is sitting. The determination may be made based on a user unlocking the door and/or pulling on an internal door lever to open the door.

Figure 43:
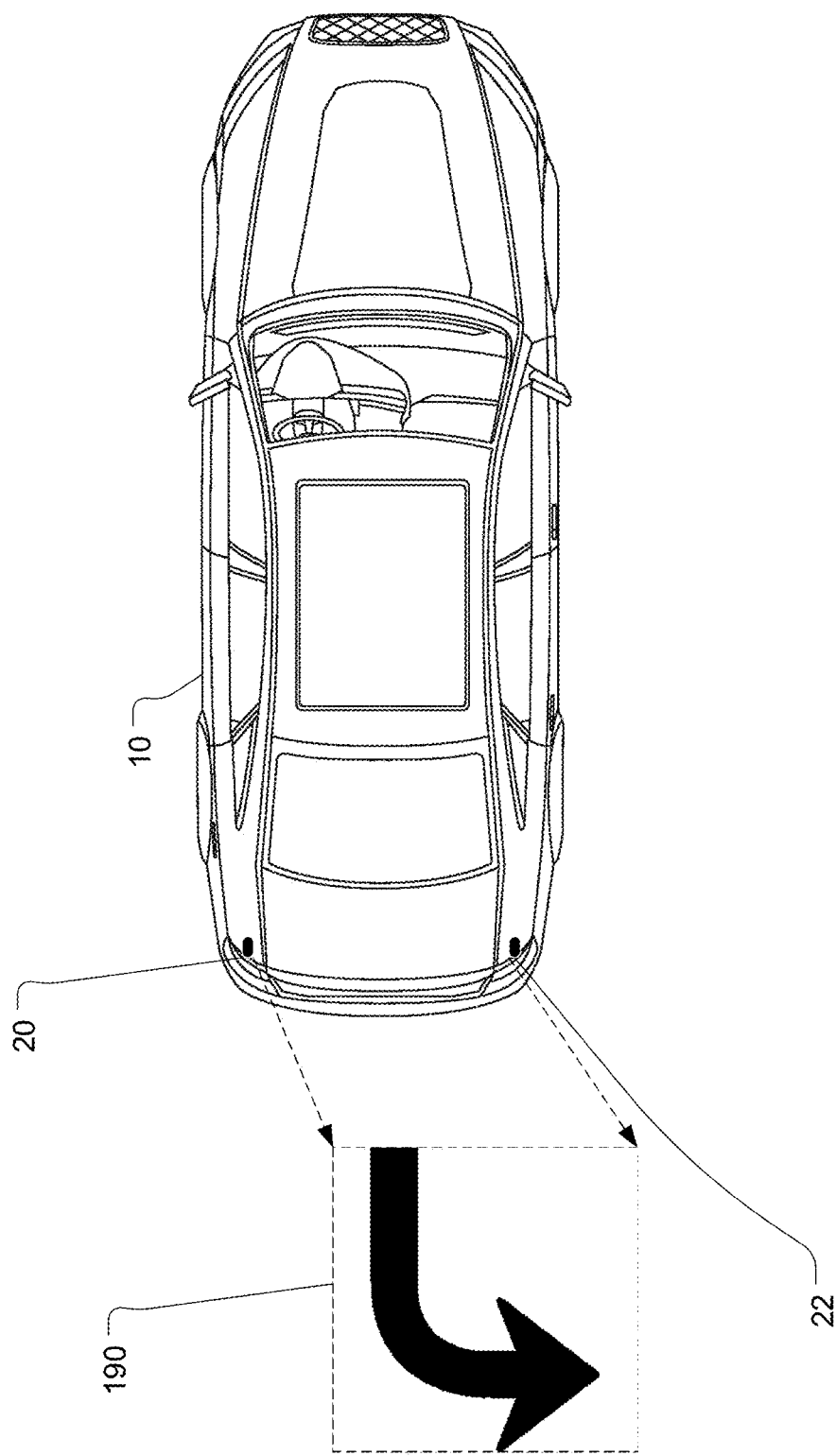
FIG. 43 depicts an autonomous vehicle projecting an intended path behind the vehicle to visually notify any pedestrians or cyclists that the vehicle is intending to back up.

In a scenario where the AV 10 intends to back up, it may be beneficial to project a warning on the pavement to advise pedestrians and/or cyclists. For example, FIG. 43 depicts an autonomous vehicle 10 projecting an intended path 190 behind the vehicle to visually notify any pedestrians or cyclists that the vehicle 10 is intending to back up. In a variant, the processor uses a backup camera to ascertain that no pedestrians, cyclists, vehicles or other obstacles are behind the vehicle 10 before projecting the intended path 190 on the pavement. The intended path 190 may be projected simultaneously with the activation of rear backup lights and/or activation of a signal light. In a variant, the intended path 190 may be projected before or after the activation of the rear backup lights and/or signal light.

Figure 44:
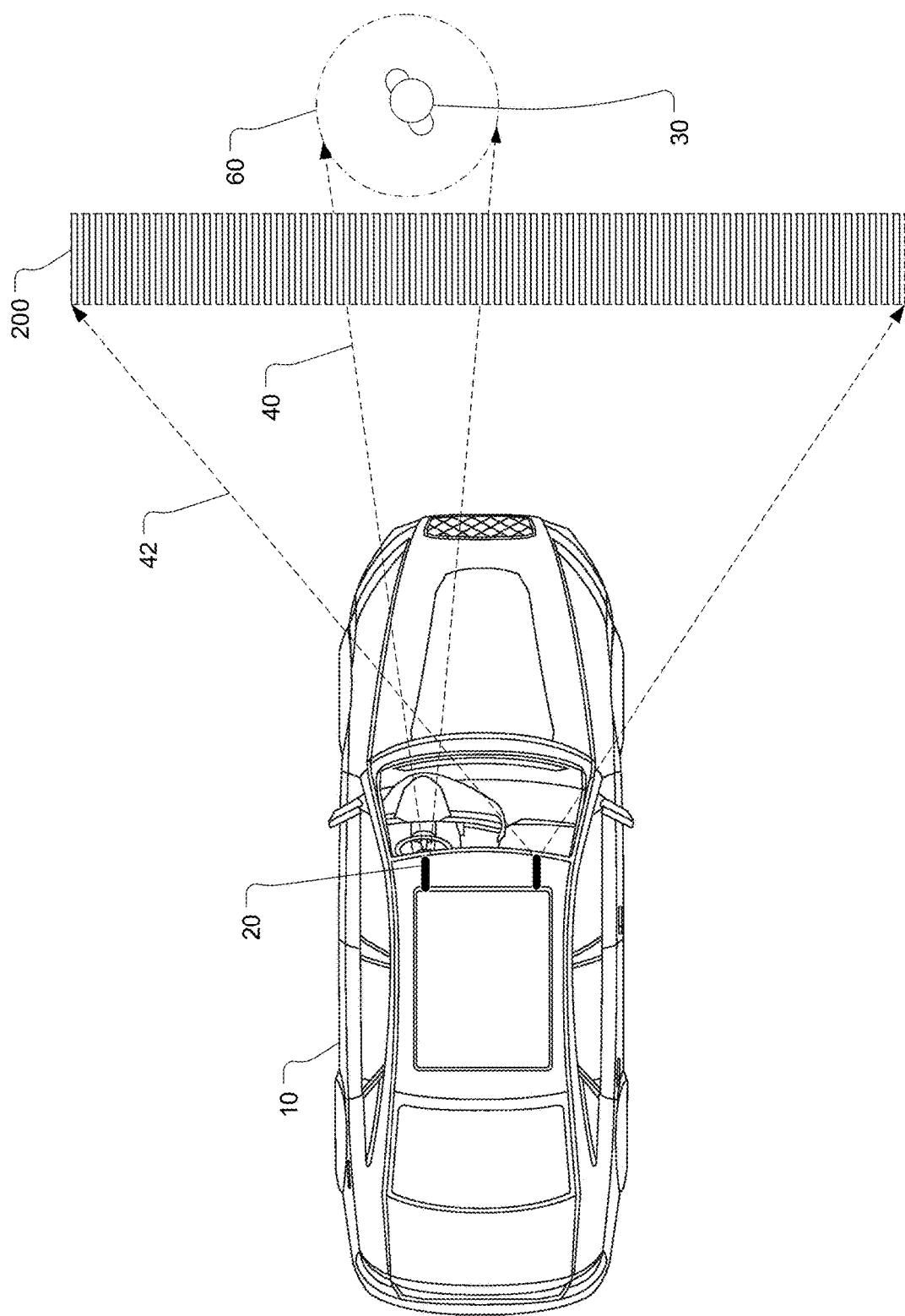
FIG. 44 depicts an autonomous vehicle projecting an intended stop line to visually notify a pedestrian of where the vehicle is intending to stop.

Although the AV 10 is configured to stop at painted road markings such as intersection lines, crosswalks, etc., in some instances, there are no such road markings. In such cases, the pedestrian or cyclist may not know exactly where the AV 10 intends to stop. This is the case, for example, in an unmarked intersection, where painted road markings are absent or partially worn off or covered by snow or in a shopping center parking lot where there are no markings, etc. FIG. 44 depicts an autonomous vehicle 10 projecting an intended stop line 200 to visually notify a pedestrian 30 of where the autonomous vehicle 10 is intending to stop. In the embodiment of FIG. 44, the AV 10 has a first light projector 20 projecting a first beam of light providing an illuminated shape 60 under the pedestrian 30 and also has a second light projector 22 projecting a second beam of light to create the projected stop line 200 on the pavement.

Figure 45:
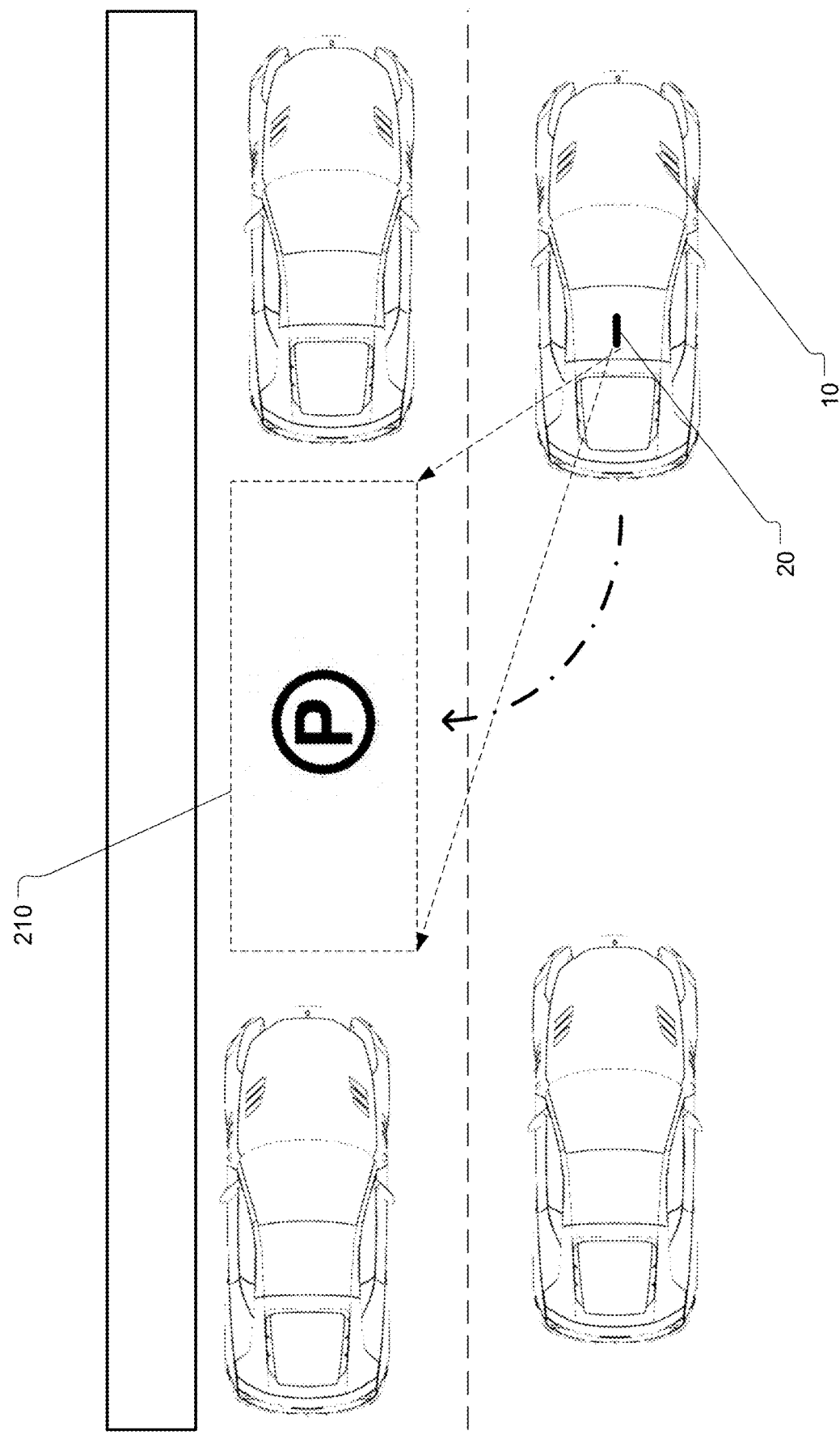
FIG. 45 depicts an autonomous vehicle projecting an intended parking space to visually indicate to other drivers or autonomous vehicles where the vehicle is intending to park.

FIG. 45 depicts an autonomous vehicle 10 using the light projector 20 to project an intended parking space 210 to visually indicate to other drivers or autonomous vehicles where the vehicle is intending to park. In this instance, the AV 10 indicates its intention to parallel park in the free parking spot by projecting a parking logo and a rectangular projection although it will be appreciated that other symbols and/or other shapes may be used. By designating an intended parking space, a driver of a vehicle behind the AV (or another AV) may recognize the AV's intention to parallel park and thus give the AV 10 space to back into the parking space.

Figure 46:
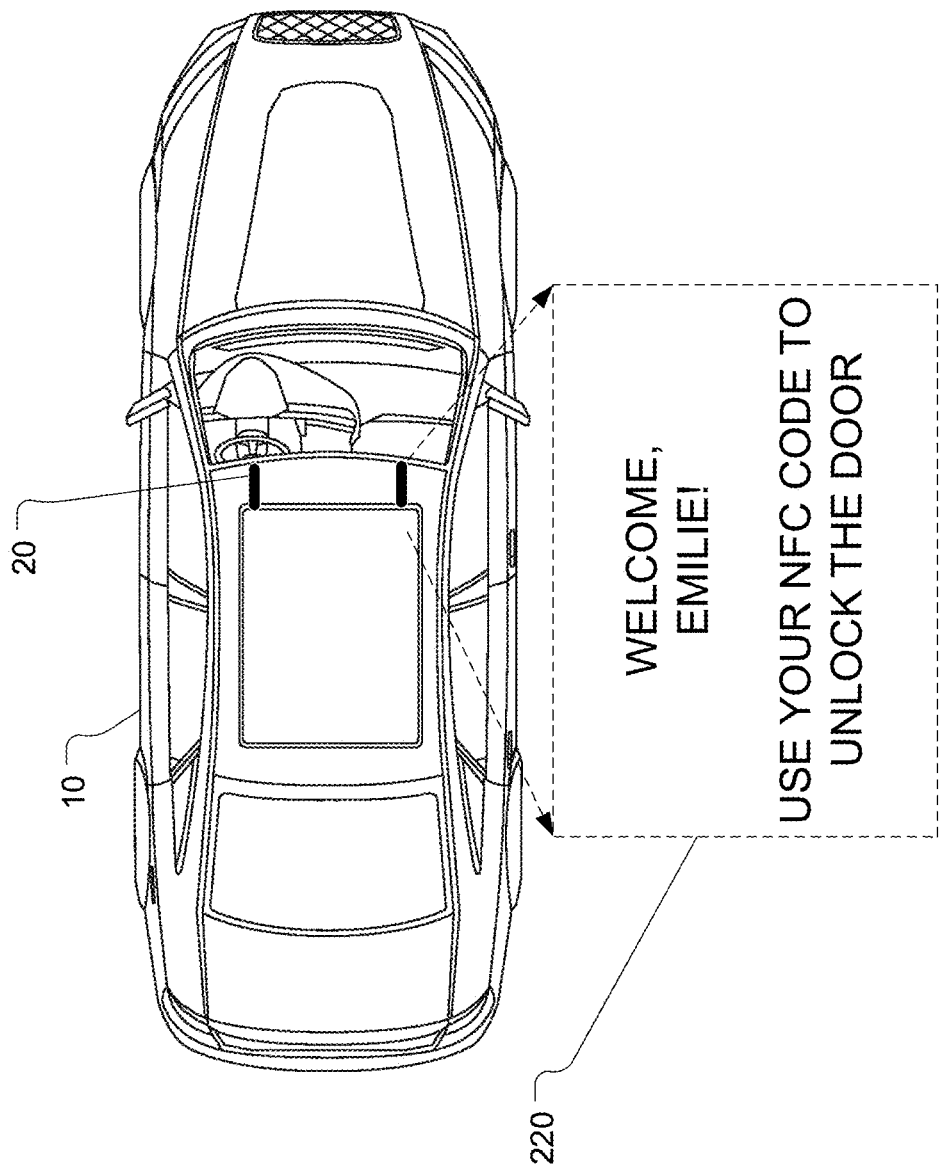
FIG. 46 depicts an autonomous vehicle projecting an instruction to a user how to gain access or unlock the vehicle.

The light projector 20 of the AV 10 may be used to communicate instructions to a user, passenger, rider or driver of the AV 10. FIG. 46 depicts an autonomous vehicle 10 projecting an instruction 220 to a user how to gain access or unlock the vehicle. In this example, the instruction 220 includes a welcome message containing the name of the user ("Welcome, Emilie!") and an instruction to use the near field communication (NFC) chip of her phone to unlock the vehicle. The AV 10 may be configured to recognize a user using facial recognition and to project the instruction only upon recognition of the user. Alternatively, the AV 10 may be configured to project the instruction on detecting the presence of a person within a predetermined range of the vehicle. In another embodiment, the vehicle may project onto a sidewalk, roadway or other ground surface a shape defining a waiting area where the vehicle intends to come to a stop. This may be useful for buses, shuttles, taxis, Ubers, etc. where the prospective rider is not sure where to stand, i.e. where the vehicle will come to a stop. The vehicle can project the exact location for the passenger to stand so that the door will be at the right location for the passenger when the vehicle has come to a stop. The projection may contain information such as the bus number and/or destination. The projection may contain a corporate logo for a hotel, resort, airline, etc.

Figure 47:
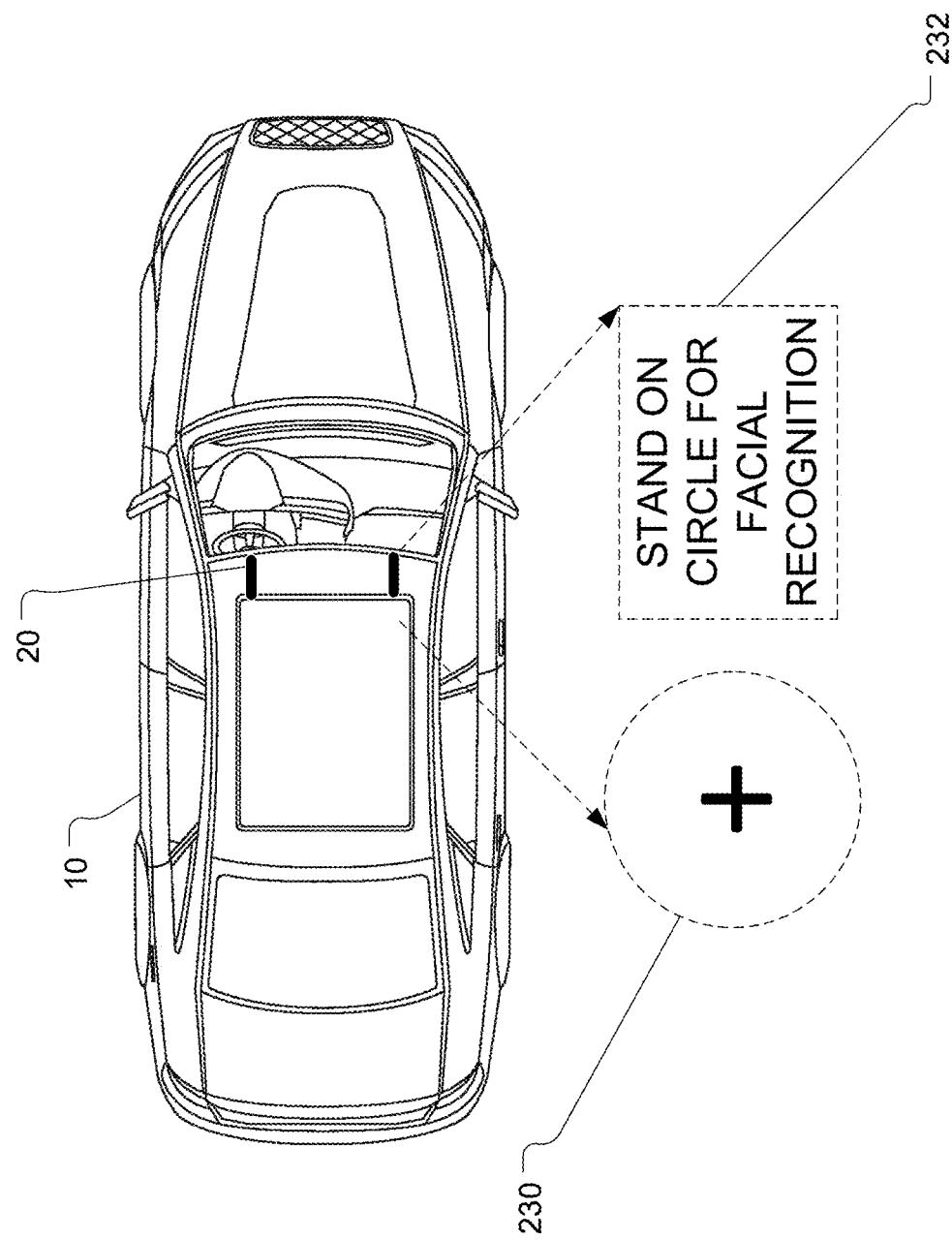
FIG. 47 depicts an autonomous vehicle projecting a spot on the pavement to inform a user where to stand to enable a facial recognition system of the vehicle to obtain an image of the face of the user in order to unlock the vehicle.

FIG. 47 depicts an autonomous vehicle 10 projecting a designated spot 230 on the pavement to inform a user where to stand to enable a facial recognition system of the autonomous vehicle 10 to obtain an image of the face of the user in order to unlock the autonomous vehicle 10. In the embodiment of FIG. 47, the vehicle 10 also projects an instruction 232 indicating that the user should stand on the designated spot 230 to enable facial recognition to operate.

Figure 48:
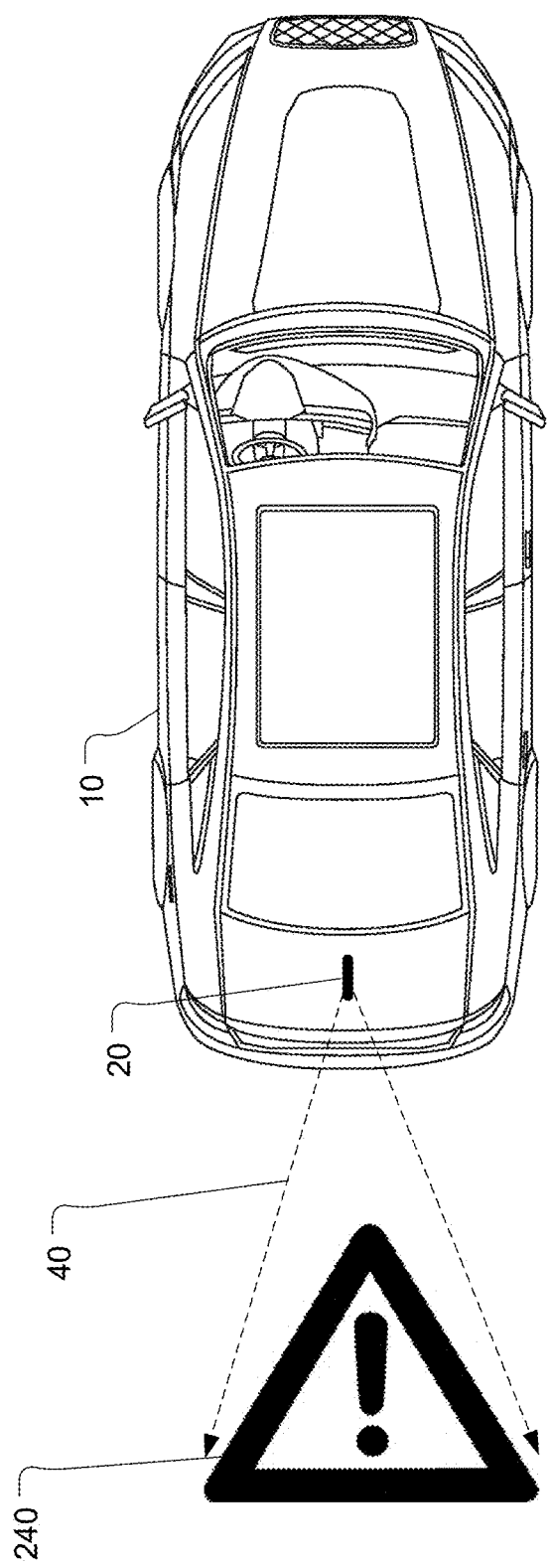
FIG. 48 depicts an autonomous vehicle projecting an emergency warning sign on the pavement behind the vehicle.

The light projector 20 of the AV 10 may also be useful in projecting emergency messages in the case of an emergency. For example, FIG. 48 depicts an autonomous vehicle 10 projecting an emergency warning sign 240 on the pavement behind the autonomous vehicle 10. This emergency warning sign 240 may be projected, for example, if the AV 10 has broken down, run out of battery or fuel, has a flat tire, etc. The emergency warning sign 240 may be made to blink or flash to draw greater attention.

Figure 49:
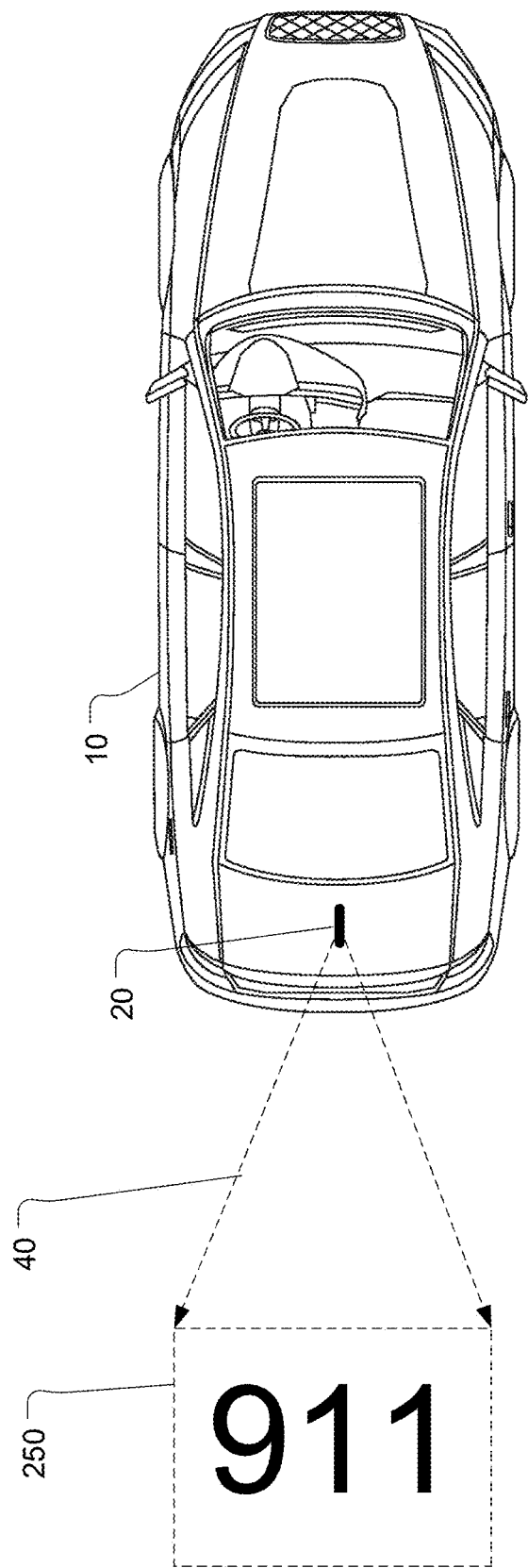
FIG. 49 depicts an autonomous vehicle projecting an image imploring a passerby to call 911.
Figure 50:
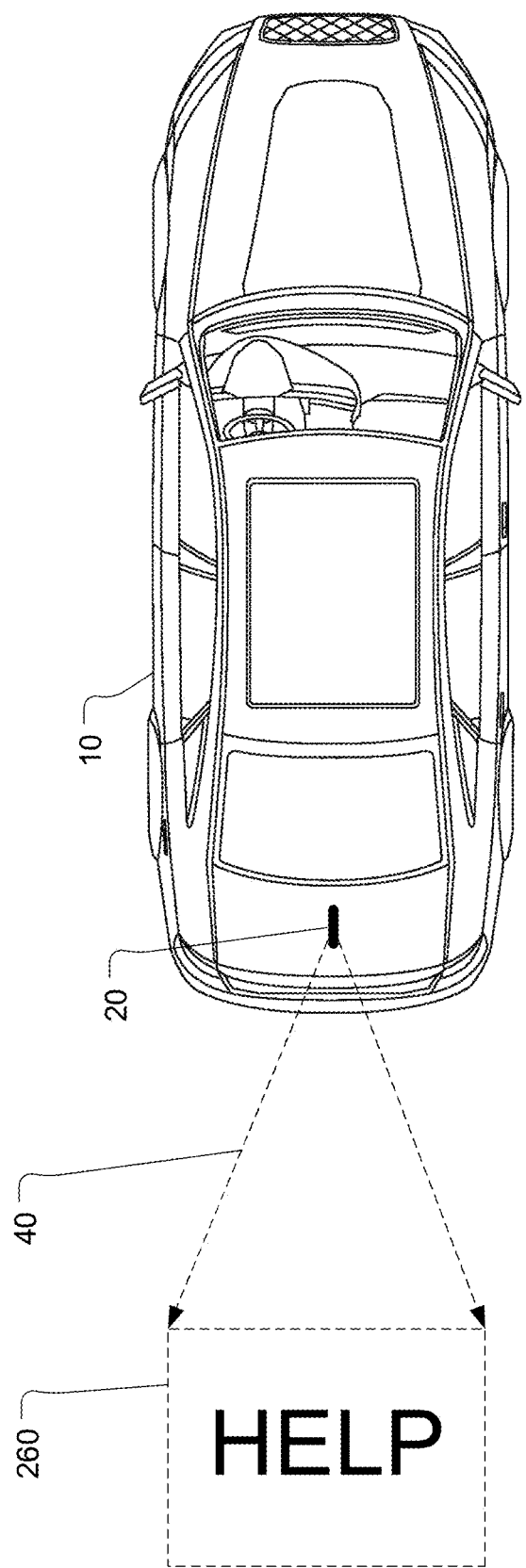
FIG. 50 depicts an autonomous vehicle projecting an image imploring a passerby to help the occupant(s) of the vehicle.
Figure 51:
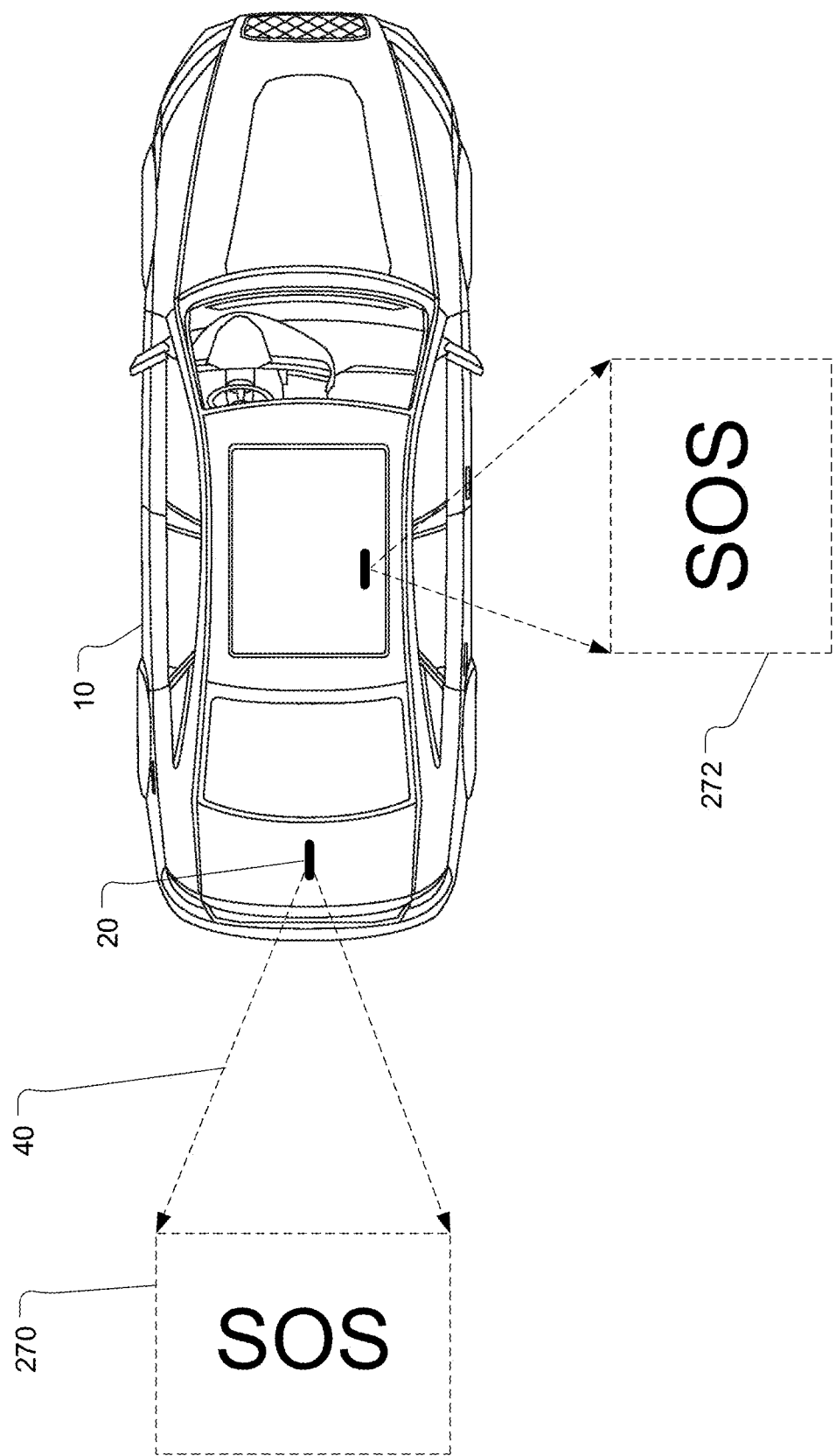
FIG. 51 depicts an autonomous vehicle projecting multiple SOS messages.

In another example, FIG. 49 depicts an autonomous vehicle 10 projecting an image 250 imploring a passerby to call 911. The AV 10 may project this image in respect to user input (driver or passenger input) or automatically. In the case of automatic projection of the image 250, the AV 10 may recognize that there has been an accident (by a crash sensor, accelerometer, airbag deployment, etc.) and/or by virtue of having received no reply from a driver/passenger, suggesting that the passenger/driver is injured or incapacitated. It will be appreciated that the GNSS of the autonomous vehicle 10 may enable the processor 25 of the autonomous vehicle 10 to select an appropriate emergency number based on current location. For example, 911 would be displayed for North America, 999 for UK, 112 for Germany, etc. In another example, FIG. 50 depicts an autonomous vehicle 10 projecting a help image 260 imploring a passerby to help the occupant(s) of the vehicle 10. In a further example, as shown in FIG. 51, the autonomous vehicle 10 projects multiple SOS messages 270, 272. In this example, the first and second SOS messages 270, 272 are projected behind and beside the autonomous vehicle 10.

In other embodiments of the invention, the AV 10 detects the light projections on the pavement that are emitted by another vehicle and then reacts to those light projections to change course and/or display further information via its own light projector(s).

Figure 52:
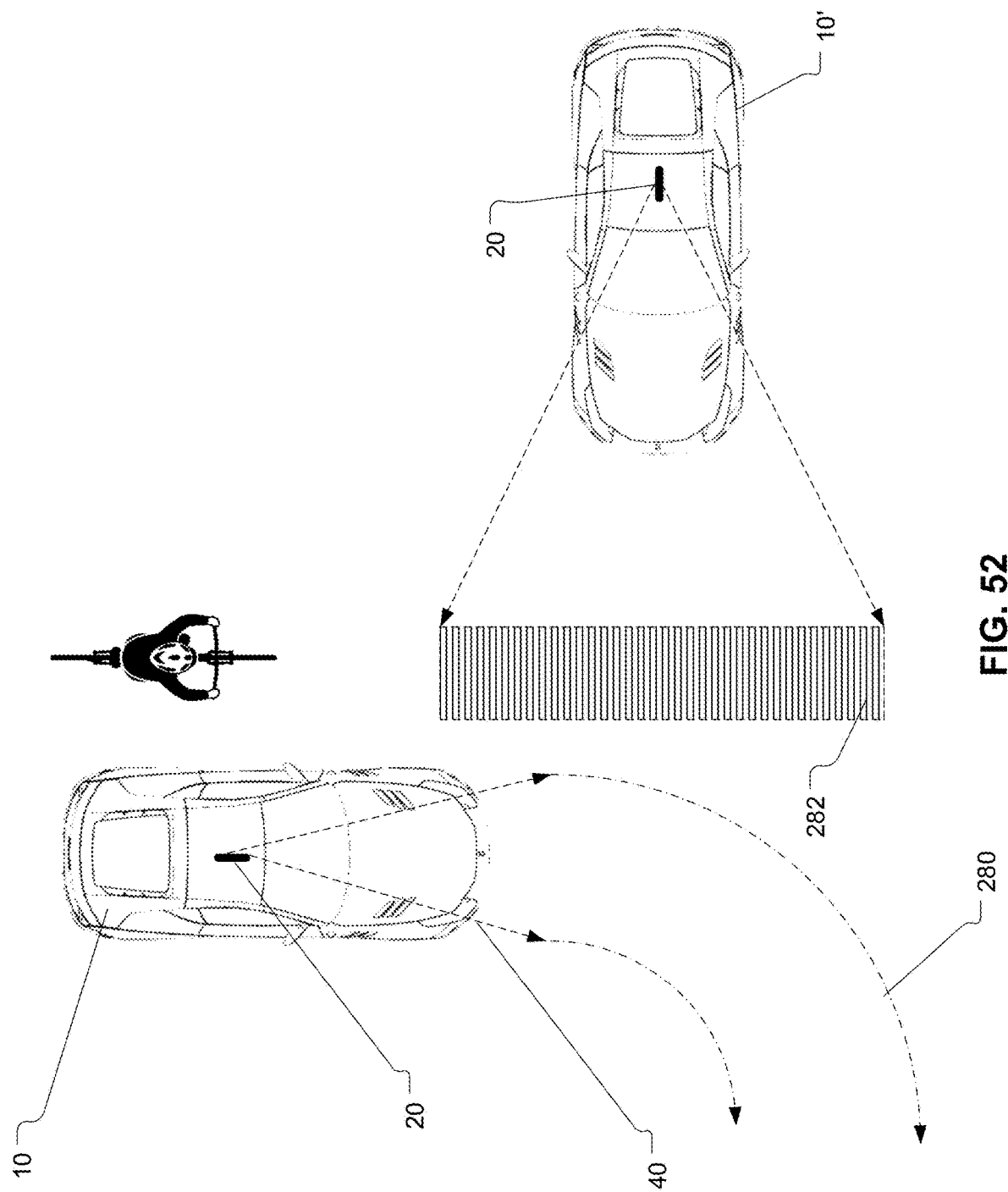
FIG. 52 depicts a first autonomous vehicle projecting a predicted route on the pavement and a second autonomous vehicle reacting to the predicted route by projecting a stop line.

In the embodiment depicted in FIG. 52, a first autonomous vehicle 10 is shown projecting a predicted route 280 on the pavement. In this embodiment, a second autonomous vehicle 10' detects the predicted route projected on the pavement and reacts to the predicted route by projecting a stop line 282. In this case, the stop line projected onto the pavement visually informs the cyclist that the second AV 10' intends to stop and also where the second AV 10' intends to stop. In a variant, the second autonomous vehicle 10' receives a vehicle-to-vehicle (V2V) radiofrequency message from the first autonomous vehicle 10 to notify the second autonomous vehicle 10' of the intended route of the first autonomous vehicle 10. In this variant, the second AV 10' projects the stop line 282 in response to receiving the V2V message.

Figure 53:
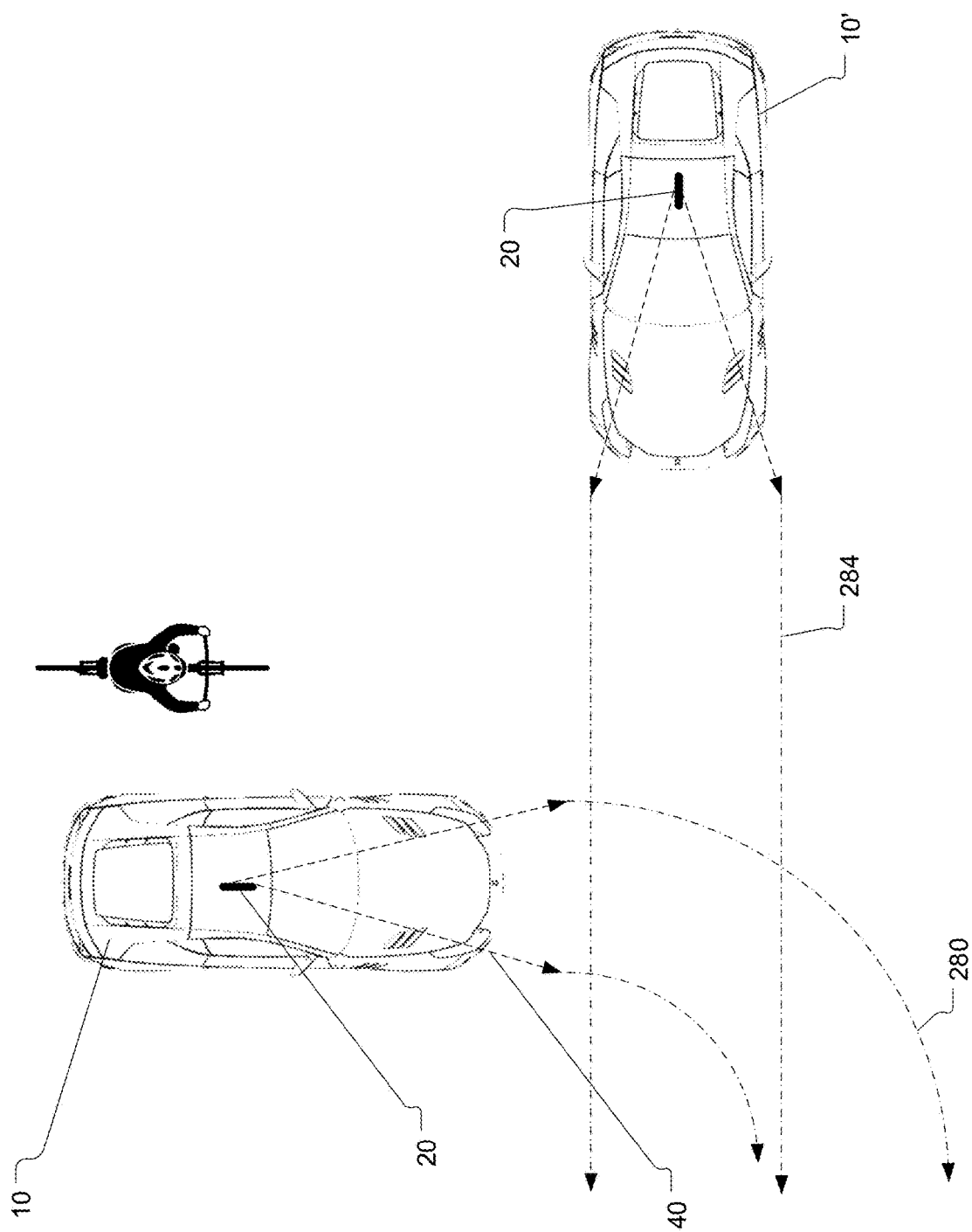
FIG. 53 depicts a first autonomous vehicle projecting a first predicted route on the pavement and a second autonomous vehicle projecting a second predicted route that intersects the first predicted route.

FIG. 53 depicts a first autonomous vehicle 10 projecting a first predicted route 280 on the pavement and a second autonomous vehicle 10' projecting a second predicted route 284 that intersects the first predicted route. In one embodiment, the processor of the first AV 10' selects a first light color for the light to be projected by the light projector in response to detecting that another vehicle (the second AV 10') has already illuminated the pavement using a second light color. In the example of FIG. 53, the paths may be lit in different colors. As another example, the illuminated shapes beneath the pedestrian or cyclist may be different colors. In one variant, the colors used by each vehicle relate to the colors of the bodies of the vehicles, e.g. a blue car uses a blue light and a red car uses a red light.

Figure 54:
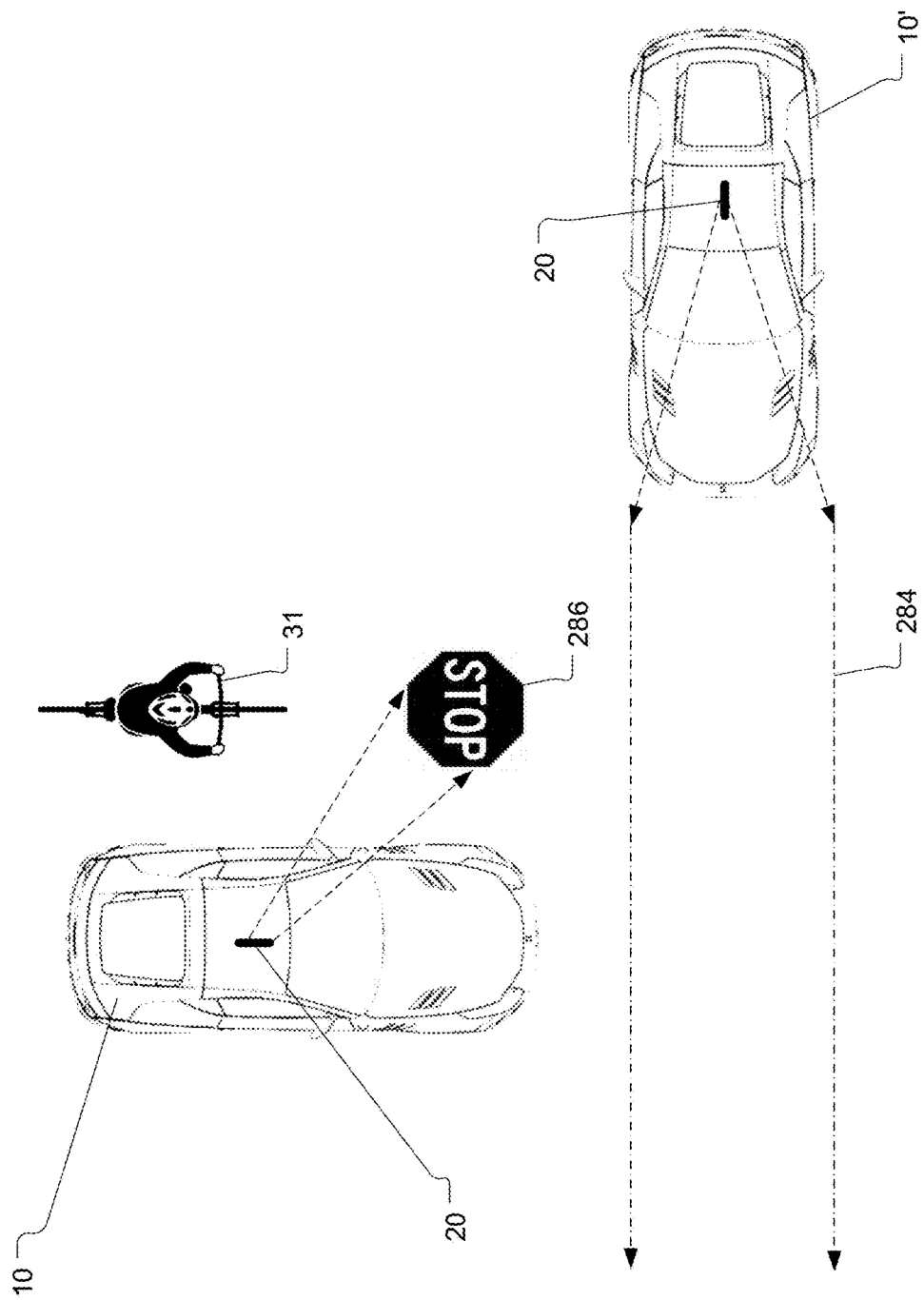
FIG. 54 depicts the first autonomous vehicle of FIG. 53 stopping to yield to the second autonomous vehicle wherein the first autonomous vehicle projects a stop sign to notify the cyclist.
Figure 55:
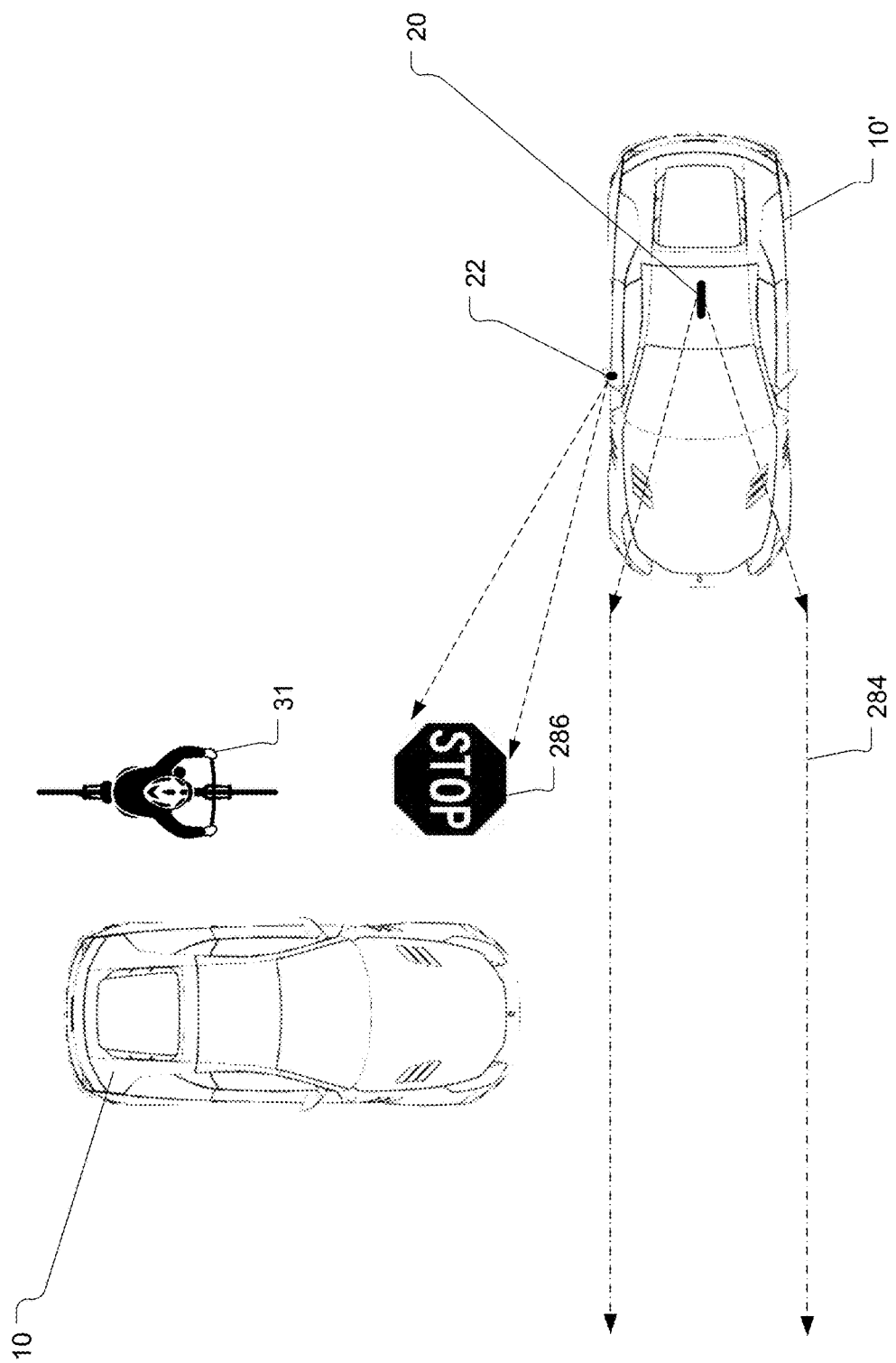
FIG. 55 depicts the first autonomous vehicle of FIG. 53 stopping to yield to the second autonomous vehicle wherein the second autonomous vehicle projects a stop sign to notify the cyclist.

In the scenario depicted in FIG. 53, the first and second vehicles 10, 10' detect that projected paths are intersecting and then negotiate or determine a right of way based on V2V messaging or predetermined rules of the road. In this scenario, the first AV 10 or the second AV 10' yields to the other. The cyclist 31 can also see in this scenario that the intended paths 280, 284 of the first and second AVs 10, 10' intersect and that one or both of the two AVs will need to stop or slow down. As shown by way of example in FIG. 54, the first autonomous vehicle 10 stops to yield to the second autonomous vehicle 10'. In this example, the first autonomous vehicle 10 projects a stop sign 286 on the pavement to notify the cyclist 31 that the first AV 10 intends to stop to allow the second AV 10' to pass. Due to this traffic situation, it becomes necessary or at least prudent to notify the cyclist 31 to also stop to allow the second AV 10' to pass. In a variant, the stop sign 286 is only projected on the pavement if it is calculated that the cyclist 31 will intersect the second AV 10'. If it is calculated that the cyclist 31 is too far away or traveling too slowly to intersect the second AV 10', the stop the processor of the AV 10 may decide not to project the stop sign 286 as being unnecessary. Alternatively, the processor of the AV 10 may decide to project a different sign, e.g. a yield sign, caution sign, a sign advising the cyclist to slow down, etc. Thus, the processor of the AV may decide which one of a plurality of signs to project based on distance and/or speed and/or travel direction of the cyclist or pedestrian. In a variant, the processor 25 of the AV 10 may also use factors such as weather and visibility to determine which sign to project. For example, if the roads are slippery or if visibility is low, the processor 25 of the AV 10 may project more signs advising caution (than if visibility or weather were good) to increase a margin of safety for driving near pedestrians or cyclists. The stop sign 286 is projected by the first autonomous vehicle 10 in the embodiment depicted in FIG. 54. In another embodiment, as depicted in FIG. 55, the stop sign 286 is projected by the second autonomous vehicle 10' instead of by the first autonomous vehicle 10. In other words, in the embodiment depicted in FIG. 55, even though the first autonomous vehicle 10 is stopping to yield to the second autonomous vehicle 10', the second autonomous vehicle 10' projects the stop sign 286 to notify the cyclist 31.

A V2V message may optionally be communicated from one of the AVs to the other to confirm which AV is to project the stop sign 286.

Figure 56:
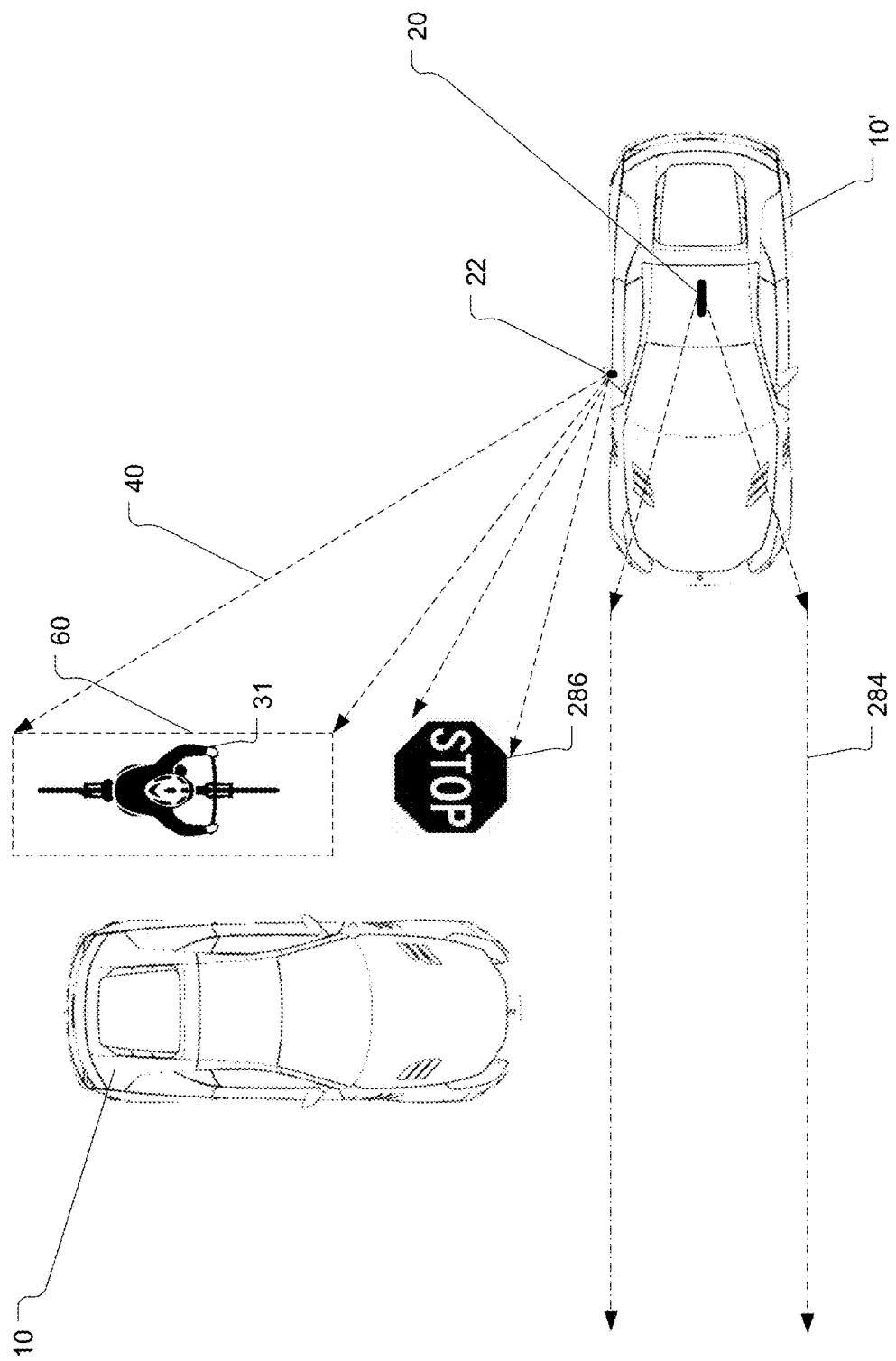
FIG. 56 depicts the first autonomous vehicle of FIG. 53 stopping to yield to the second autonomous vehicle wherein the second autonomous vehicle projects a stop sign to notify the cyclist and further illuminates the pavement beneath the cyclist to indicate that the second autonomous vehicle is tracking the cyclist.

In another embodiment, a shape 60 beneath the cyclist 31 is illuminated in addition to the projected stop sign 286 to further notify the cyclist 31 that the second autonomous vehicle 10' is tracking the cyclist 31. FIG. 56 depicts the first autonomous vehicle 10 stopping to yield to the second autonomous vehicle 10'. In this scenario, the second autonomous vehicle 10' projects the stop sign 286 to notify the cyclist 31 to stop and further illuminates the pavement beneath the cyclist 31 to indicate that the second autonomous vehicle 10' is tracking the cyclist 31. In this example, the shape 60 is a rectangular shape. In other variants, the shape 60 may be another polygon, circle, ellipse, oblong, etc.

Another aspect of the disclosure is a method, performed automatically by an autonomous vehicle, of notifying a pedestrian or cyclist that the autonomous vehicle is tracking the pedestrian or cyclist. The method entails illuminating the ground beneath a pedestrian or cyclist to visually notify the pedestrian or cyclist that the autonomous vehicle is tracking the pedestrian. Alternatively, the method entails using a strobe light to visually notify the pedestrian that the autonomous vehicle is tracking the pedestrian. In one implementation, the method entails illuminating the ground beneath two pedestrians to visually notify both pedestrians that the autonomous vehicle is tracking both pedestrians. In one implementation, the method entails illuminating the ground beneath two pedestrians to visually notify both pedestrians that the autonomous vehicle is tracking both pedestrians and also projecting arrows or other directional indicators indicating the inferred directions of travel for each of the pedestrians. Optionally, the method involves further projecting an intended route of the autonomous vehicle on the pavement or road surface. In one implementation, the method entails projecting concentric circles representing a lateral margin of variation predicted for each pedestrian. In one implementation, the method entails projecting a photo, icon, sign or message in front of a pedestrian/cyclist. The sign may be for example a stop sign, a yield sign, or other traffic sign. The message may be composed of words spoken by a user or passenger or driver in the autonomous vehicle. The message may be an automatically translated pedestrian message.

In one embodiment, the method involves projecting two differently colored light beams (e.g. lasers) to illuminate two differently colored road surfaces.

In one embodiment, the method involves adjusting the headlights of the vehicle automatically to compensate for the light emitted by the light projector.

In one embodiment, the method involves adjusting the projected light in response to recognizing a pedestrian's gesture.

In one embodiment, the method involves projecting a flashing light beneath a pedestrian in response to detecting that the pedestrian is not looking at the vehicle and then switching to a solid light in response to detecting that the pedestrian is looking at the vehicle.

These methods can be implemented in hardware, software, firmware or as any suitable combination thereof. That is, if implemented as software, the computer-readable medium comprises instructions in code which when loaded into memory and executed on a processor of a computing device causes the computing device to perform any of the foregoing method steps. These method steps may be implemented as software, i.e. as coded instructions stored on a computer readable medium which performs the foregoing steps when the computer readable medium is loaded into memory and executed by the microprocessor of the computing device. A computer readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

For the purposes of interpreting this specification, when referring to elements of various embodiments of the present invention, the articles "a", "an", "the" and "said" are intended to mean that there are one or more of the elements. The terms "comprising", "including", "having", "entailing" and "involving", and verb tense variants thereof, are intended to be inclusive and open-ended by which it is meant that there may be additional elements other than the listed elements.

This new technology has been described in terms of specific implementations and configurations which are intended to be exemplary only. Persons of ordinary skill in the art will appreciate that many obvious variations, refinements and modifications may be made without departing from the inventive concepts presented in this application. The scope of the exclusive right sought by the Applicant(s) is therefore intended to be limited solely by the appended claims.

The invention claimed is:

1. An autonomous vehicle comprising:
a chassis;
a plurality of wheels rotationally mounted to the chassis;
a body supported by the chassis;
a sensor supported by the body, the sensor detecting an object in a vicinity of the autonomous vehicle, the sensor generating sensor data for the object;
a processor communicatively coupled to the sensor to receive the sensor data from the sensor, wherein the processor is configured to process the sensor data to recognize that the object is a pedestrian or cyclist and wherein the processor is configured to cooperate with the sensor to track the pedestrian or cyclist, wherein the processor is further configured to determine if a road surface beneath the pedestrian or cyclist is to be illuminated and, upon determining that the road surface beneath the pedestrian or cyclist is to be illuminated, to output an illumination signal;
a light projector supported by the body and coupled to the processor to receive the illumination signal, wherein the light projector, in response to receiving the illumination signal, projects a beam of light onto the road surface beneath the pedestrian or cyclist to visually notify the pedestrian or cyclist that the autonomous vehicle is presently tracking the pedestrian or cyclist; and
a camera for detecting a color of the road surface beneath the pedestrian or cyclist, wherein the processor selects a light color based on the color of the road surface and cooperates with the light projector to project the beam of light using a selected light color that provides contrast when projected on the road surface.

2. The autonomous vehicle of claim 1 wherein the light projector projects a message to the pedestrian or cyclist on the road surface, wherein the message is dynamically oriented based on an instantaneous face direction of the pedestrian or cyclist.

3. The autonomous vehicle of claim 2 comprising a text-to-speech module to recognize speech from a user in the autonomous vehicle and to convert the speech into the message to be projected onto the road surface.

4. The autonomous vehicle of claim 3 comprising:
a global navigation satellite system (GNSS) to determine a current location of the autonomous vehicle to enable the processor to determine a local language based on the current location; and
a translator to translate the speech in a user language into a translated message in the local language for projecting in the local language to the pedestrian or cyclist.

5. The autonomous vehicle of claim 1 wherein the light projector projects a strobing beam of light beneath the pedestrian or cyclist.

6. The autonomous vehicle of claim 5 wherein the processor cooperates with a camera to detect a face direction of the pedestrian or cyclist and wherein the processor uses the face direction to determine whether to project a strobing beam of light or a solid beam of light.

7. The autonomous vehicle of claim 6 wherein the processor causes the light projector to change from the strobing beam of light to the solid beam of light in response to detecting that the face direction has changed to point toward the autonomous vehicle.

8. The autonomous vehicle of claim 6 wherein the processor causes the light projector to change from the strobing beam of light to the solid beam of light in response to detecting that a gesture made by the pedestrian or cyclist.

9. The autonomous vehicle of claim 1 wherein the processor infers a direction of travel of the pedestrian or cyclist and wherein the light projector projects a directional indicator on the road surface indicative of an inferred direction of travel of the pedestrian or cyclist.

10. The autonomous vehicle of claim 1 wherein the beam of light illuminates a lateral margin of variation expected by the autonomous vehicle for the pedestrian or cyclist.

11. An autonomous vehicle comprising:
a chassis;
a plurality of wheels rotationally mounted to the chassis;
a body supported by the chassis;
a sensor supported by the body, the sensor detecting an object in a vicinity of the autonomous vehicle, the sensor generating sensor data for the object; and
a processor communicatively coupled to the sensor to receive the sensor data from the sensor, wherein the processor is configured to process the sensor data to recognize that the object is a pedestrian or cyclist and wherein the processor is configured to cooperate with the sensor to track the pedestrian or cyclist, wherein the processor is further configured to determine if a road surface beneath the pedestrian or cyclist is to be illuminated and, upon determining that the road surface beneath the pedestrian or cyclist is to be illuminated, to output an illumination signal;
wherein the processor selects a first light color for the light to be projected by the light projector in response to detecting that another vehicle has already illuminated the pedestrian or cyclist using a second light color.

12. An autonomous vehicle comprising:
a chassis;
a plurality of wheels rotationally mounted to the chassis;
a body supported by the chassis;
a sensor supported by the body, the sensor detecting an object in a vicinity of the autonomous vehicle, the sensor generating sensor data for the object;
a processor communicatively coupled to the sensor to receive the sensor data from the sensor, wherein the processor is configured to process the sensor data to recognize that the object is a pedestrian or cyclist and wherein the processor is configured to cooperate with the sensor to track the pedestrian or cyclist, wherein the processor is further configured to determine if a road surface beneath the pedestrian or cyclist is to be illuminated and, upon determining that the road surface beneath the pedestrian or cyclist is to be illuminated, to output an illumination signal; and
adjustable headlights that are automatically adjustable in direction and intensity to reduce interference with the beam of light from the light projector.

13. The autonomous vehicle of claim 1 comprising wheel hub displays for displaying drive information.

14. The autonomous vehicle of claim 1 comprising wheel hub projectors for projecting drive information on the road surface.

15. The autonomous vehicle of claim 1 wherein the processor detects a cluster of pedestrians or cyclists and causes the light projector to illuminate a common zone on the road encompassing the cluster of pedestrians or cyclists.

16. The autonomous vehicle of claim 1 wherein the processor causes the light projector to project a pair of parallel lines on the road illuminating an intended path of the autonomous vehicle.

17. The autonomous vehicle of claim 1 wherein the processor selects a light color for the light beam to match an exterior color of the body of the autonomous vehicle.

18. The autonomous vehicle of claim 1 comprising a plurality of light projectors to simultaneously illuminate multiple pedestrians or cyclists.

19. The autonomous vehicle of claim 1 comprising a beam-forming horn to direct a horn sound at the pedestrian or cyclist if the pedestrian or cyclist moves unexpectedly into an intended path of the autonomous vehicle.

20. The autonomous vehicle of claim 11 wherein the first light color matches an exterior color of the body of the autonomous vehicle and the second light color matches the exterior color of the body of the other vehicle.

* * * * *